(12) United States Patent
Maekawa et al.

(10) Patent No.: US 8,386,110 B2
(45) Date of Patent: Feb. 26, 2013

(54) TRAVEL ROUTE GENERATING METHOD FOR UNMANNED VEHICLE

(75) Inventors: Takashi Maekawa, Yokohama (JP);
Tetsuya Noda, Yokohama (JP);
Shigefumi Tamura, Yokohama (JP);
Tomonori Ozaki, Hiratsuka (JP)

(73) Assignees: Komatsu Ltd., Tokyo (JP); Yokohama National University, Yokohama-shi (JP)

( * ) Notice: Subject to any disclaimer, the term of this patent is extended or adjusted under 35 U.S.C. 154(b) by 576 days.

(21) Appl. No.: 12/563,563

(22) Filed: Sep. 21, 2009

(65) Prior Publication Data
US 2010/0076640 A1    Mar. 25, 2010

(30) Foreign Application Priority Data
Sep. 22, 2008  (JP) ................................. 2008-242001

(51) Int. Cl.
*G01C 22/00* (2006.01)
(52) U.S. Cl. ............ 701/23; 701/26; 701/410; 701/425; 180/168
(58) Field of Classification Search ............. 701/23, 701/25, 26, 410, 418, 425, 467, 469; 180/167, 180/168; 318/580, 587
See application file for complete search history.

(56) References Cited

U.S. PATENT DOCUMENTS
6,539,294 B1 * 3/2003 Kageyama ................. 701/23

FOREIGN PATENT DOCUMENTS
| JP | 09-138828 | 5/1997 |
| JP | 11-296229 | 10/1999 |
| JP | 2000-137522 | 5/2000 |
| JP | 2007-257276 | 10/2007 |

OTHER PUBLICATIONS

Refusing Reason Notice issued in counterpart application No. 2008-242001 by the Japanese Patent Office mailed Oct. 30, 2012 with English translation (5 pages).

* cited by examiner

*Primary Examiner* — Gertrude Arthur Jeanglaude
(74) *Attorney, Agent, or Firm* — Kratz, Quintos & Hanson, LLP

(57) ABSTRACT

A travel route generating method for an unmanned vehicle, which includes a condition input step of inputting a vehicle constraint condition including a vehicle width and a minimum turning radius of the unmanned vehicle, and a geometrical constraint condition including a travel route generation range in which the unmanned vehicle is to travel, an obstacle to avoid, and a position and a direction of an entrance point and an exit point; and a travel route generating step of generating a travel route such that the vehicle constraint condition and the geometrical constraint condition are satisfied, and such that a function value of a cost function having at least a magnitude of a curve and/or a rate of change in the curve as a cost element is minimized.

5 Claims, 39 Drawing Sheets

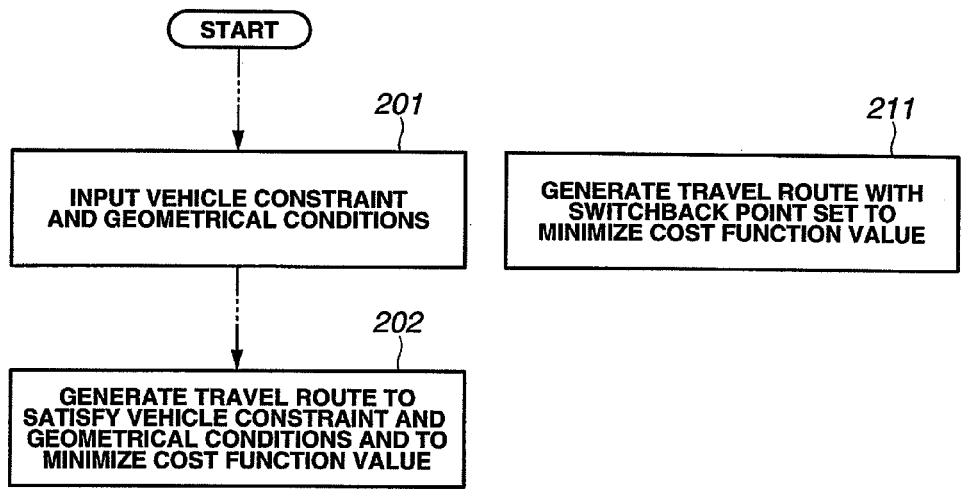
FIG.5A          FIG.5B
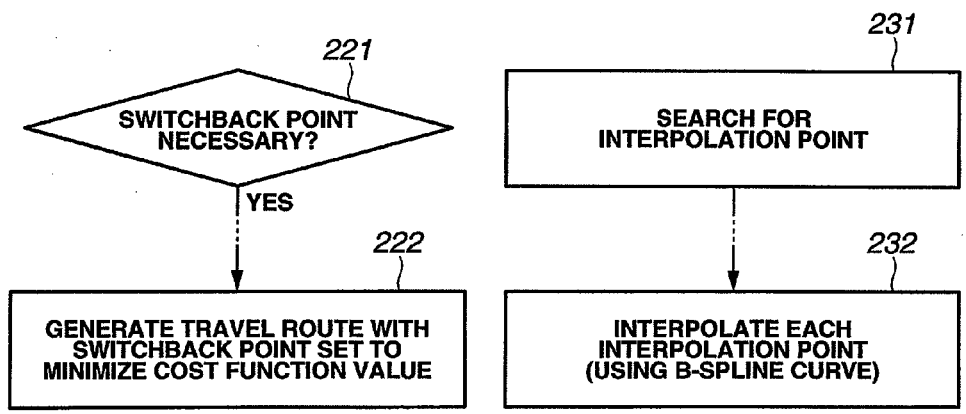
FIG.5C          FIG.5D

CONSTRAINT CONDITIONS FOR VEHICLES

| PARAMETER |
| --- |
| F SIZE |
| R SIZE |
| WIDTH |
| WBL |
| MINIMUM TURNING RADIUS |
| MAXIMUM FORWARD TRAVEL SPEED |
| MAXIMUM REVERSE TRAVEL SPEED |
| MAXIMUM ACCELERATION |
| MAXIMUM DECELERATION |
| MAXIMUM ALLOWABLE REVERSE ACCELERATION |
| AVERAGE MAXIMUM STEERING OPERATION AMOUNT PER UNIT TIME |
| MAXIMUM STEERING OPERATION AMOUNT PER UNIT TIME UNDER ADVERSE CONDITIONS |

FIG.6A

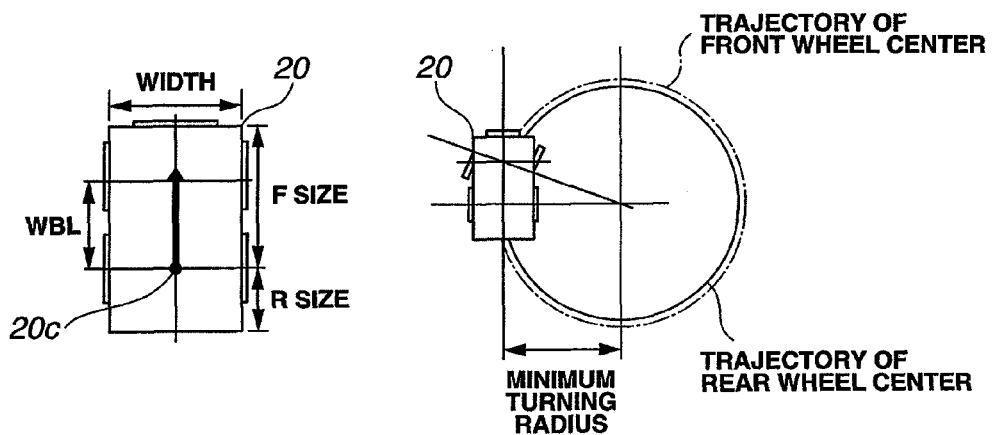

VEHICLE GEOMETRY

FIG.6B

VEHICLE CHARACTERISTICS

FIG.6C

TANGENTIAL LINE DETERMINATION

APPROXIMATION OF CURVATURE AND STEERING OPERATION AMOUNT

CALCULATION METHOD

RESULT OF IMPROVED DIJKSTRA ALGORITHM

B-SPLINE INTERPOLATION

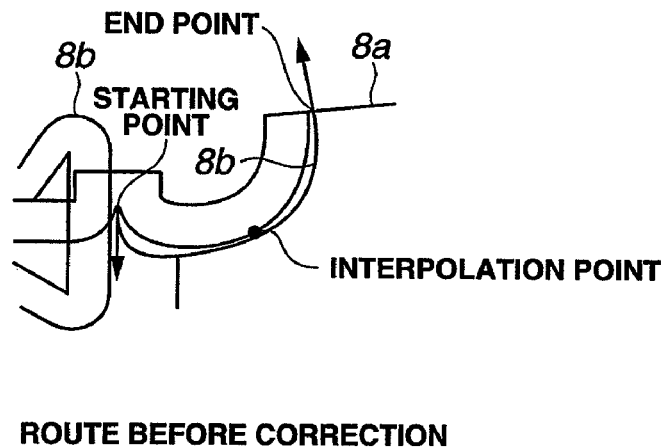
ROUTE BEFORE CORRECTION
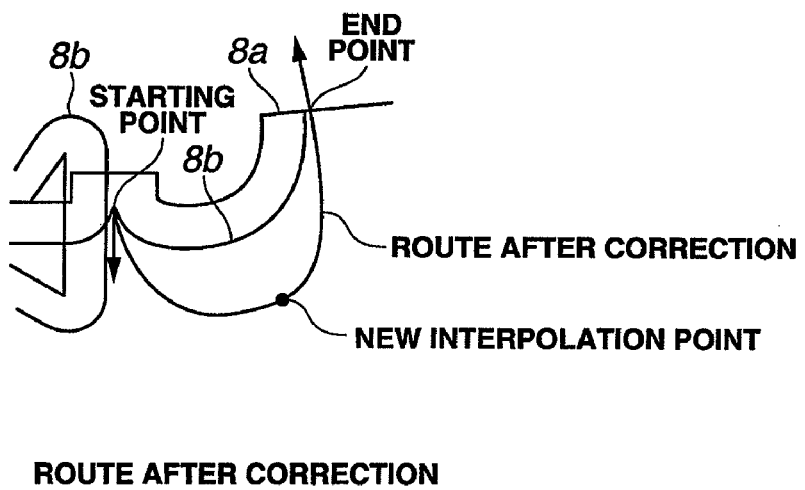
ROUTE AFTER CORRECTION

EFFECT OF α AND β

E1>E2>E3>E4>Emin

STEEPEST DESCENT ALGORITHM

APPROXIMATION WITH QUADRIC CURVE

ENLARGEMENT OF TURNING RADIUS

COOLING SCHEDULE

ROUTE GENERATION EXAMPLE 1

INPUT DATA

CALCULATION RESULT

CURVATURE DISTRIBUTION

THEORETICAL MAXIMUM SPEED

ROUTE GENERATION EXAMPLE 2
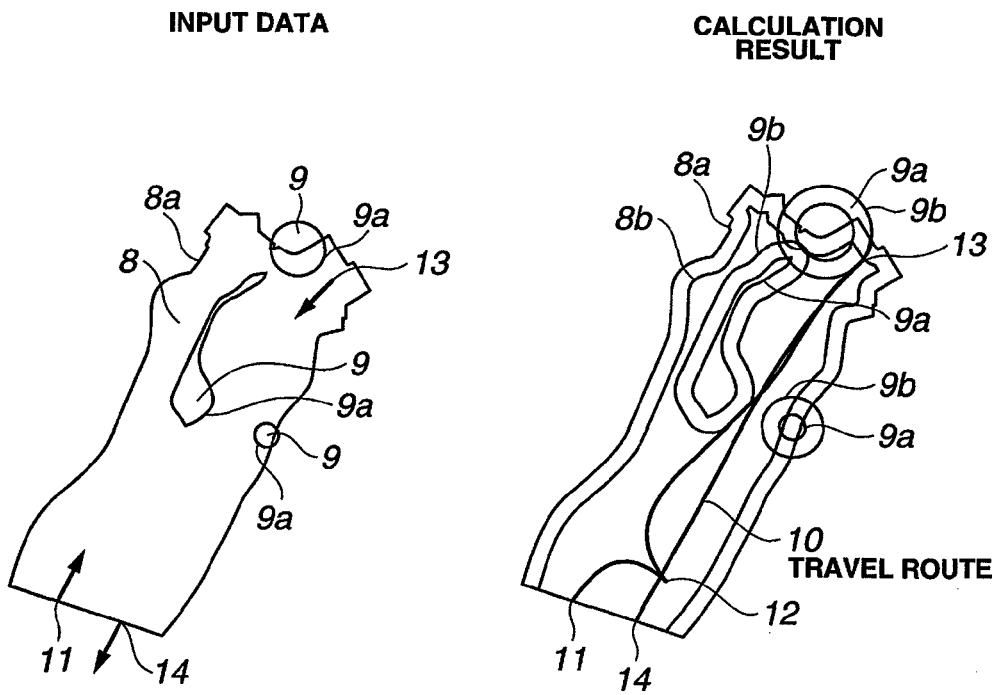
FIG.34A      FIG.34B
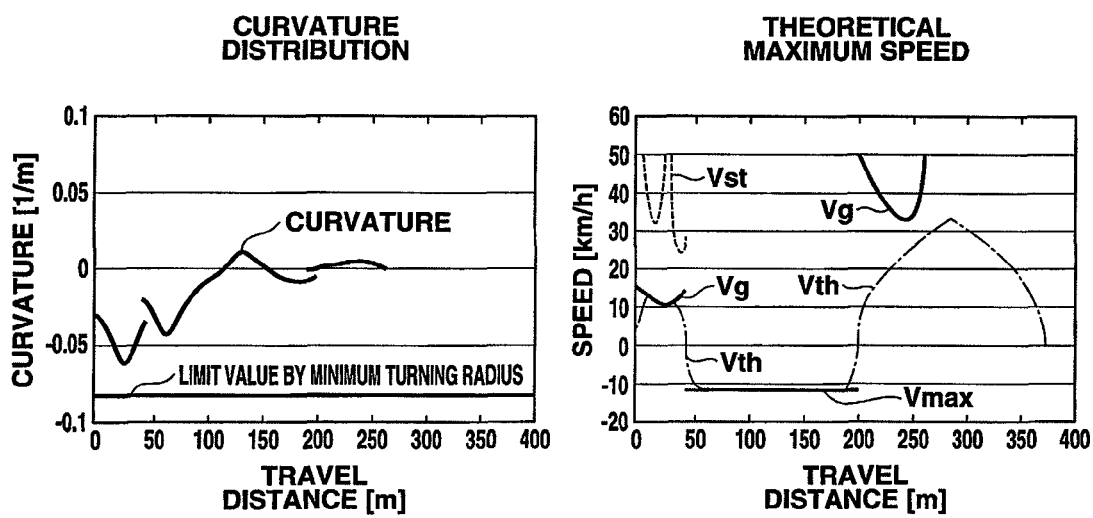
FIG.34C      FIG.34D

ROUTE GENERATION EXAMPLE 3

INPUT DATA

CALCULATION RESULT

CURVATURE DISTRIBUTION

THEORETICAL MAXIMUM SPEED

ROUTE GENERATION EXAMPLE 4

INPUT DATA

CALCULATION RESULT

CURVATURE DISTRIBUTION

THEORETICAL MAXIMUM SPEED

ROUTE GENERATION EXAMPLE 5
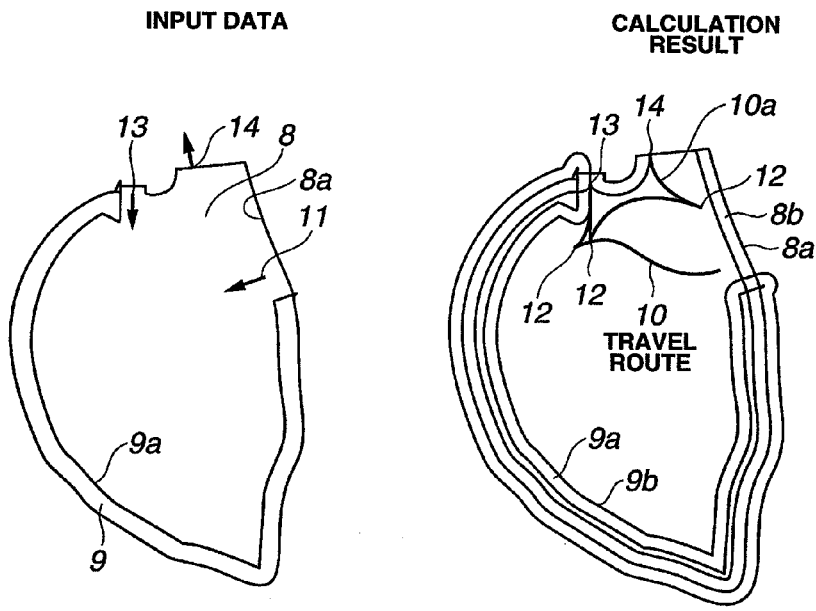
FIG.37A
FIG.37B
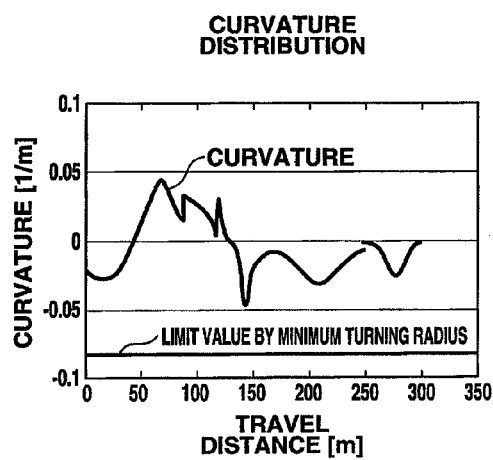
FIG.37C
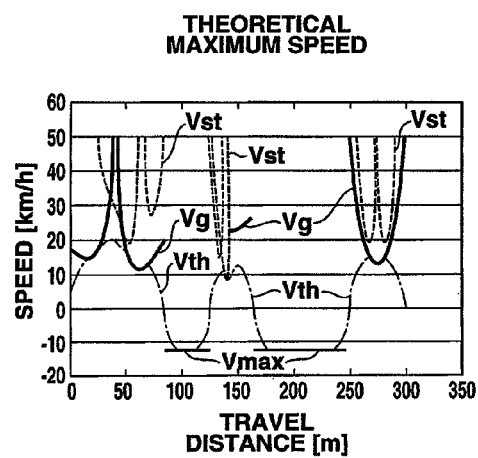
FIG.37D

TRAVEL ROUTE GENERATING METHOD FOR UNMANNED VEHICLE

BACKGROUND OF THE INVENTION

1. Technical Field

This invention relates to a travel route generating method for an unmanned vehicle and, in particular, to a method of generating a travel route capable of minimizing a traveling cost of the unmanned vehicle.

2. Related Art

Unmanned vehicle driving systems are introduced in wide-area working sites such as quarrying sites and mines so that unmanned vehicles, in place of manned vehicles such as manned off-road dump trucks, perform soil transportation works in order to avoid accidents due to worker fatigue, to achieve laborsaving, and to improve productivity by enabling extended working time.

Outlines of unmanned vehicle driving systems will be described below.

A working site includes various areas such as loading sites, dumping sites, filling stations, and parking lots. These areas are interconnected by well-prepared transportation roads called haul roads, and lead-in roads, called access roads, extending from the haul roads to the areas, as well as by intersections.

A loading site is a place where soil is loaded on dump trucks. Specifically, excavation work is performed by excavation vehicles such as wheel loaders (front-end loaders), backhoes, and shovels, and loading work is performed to load soil on dump trucks.

A dumping site is a place where soil loaded on dump trucks is discharged either at a fixed position or at regular positions within the area. When soil is discharged at a fixed position, the soil is discharged into a hopper provided with a rock crushing machine called crusher. In some cases, at a dumping site, discharged soil is leveled out by a dozer. In such cases, the dozer may indicate positions to discharge soil in order to repair damaged road surfaces so that the soil is discharged at the indicated soil discharging positions.

A filling station is provided with a fuel pump. The filling station is often attached to a parking lot. Even if dump trucks are supposed to be fueled from a fuel truck, the filling station may be provided so as not to impede operation of other dump trucks.

A parking lot is a place where when vehicles are manned vehicles used for manned work, the vehicles are parked so that the operators take a meal or are relieved. As for an unmanned vehicle driving system, a parking lot is a place where dump trucks are stored to allow inspectors to step into dump trucks safely for conducting periodic inspections or the like, and to allow operators to perform start operation.

Various methods of generating travel routes for unmanned vehicles have been tried, which will be described below.

[Route Generating Method by Teaching]

When a travel route including haul roads, access roads, intersections and crushers can be fixed, a dump truck is actually driven by an operator before starting work so that travel trajectory data obtained during this run is stored in memory.

[Route Generating Method Based on Drawings]

A travel route is predetermined by previous calculation based on plans of sites such as a mine and so on.

According to the route generating method by teaching described above, however, various data must be obtained by manpower by previously running a vehicle before starting work. Thus, this method requires a lot of time and labor for generating a travel route, impairing the work efficiency as a whole.

Above all, in actual loading sites and dumping sites, loading positions and soil discharging positions will be changed in a complicated manner according to development of the work, and the size and geometry of each loading site also will be changed along the development of the work. Therefore, it is impossible to predetermine a travel route. Specifically, the travel route must be generated from time to time such that a work vehicle such as a dozer can reach a soil discharging position indicated by its operator in the course of work, or such that it can reach a soil discharging position and a loading position which are obtained by calculation based on the area geometry which changes every second according to the development of the work. The route generating method based on drawings described above also suffers from the same problems.

In order to overcome these problems, techniques to generate a route by data simulation have been tried.

The following techniques are known as route generating techniques. These route generating techniques have been studied in the field of robotics.

a) Route generation by combination of circular arcs and straight lines

This is a method to generate a travel route by combining straight lines, circular arcs and so on, using mesh and vector potential. A method using random search is also available.

b) Route generation by Clothoid curve maintaining curvature continuity c) Route generation by polynomial curve The present applicant and others have already conceived an invention and applied for a patent, relating to a method of automatically generating a travel route for an unmanned vehicle when data on a travel route generation range for the an unmanned vehicle are given by means other than teaching, and this method is well known.

Japanese Patent Application Laid-Open No. 11-296229 describes an invention according to which information on an obstacle detected by one unmanned vehicle is shared by several unmanned vehicles as common obstacle information, and a travel route is generated so as to avoid the obstacle.

Japanese Patent Application Laid-Open No. 2000-137522 describes an invention according to which when a soil discharging region is given, a plurality of target soil discharging points are set in the soil discharging region, and a plurality of travel routes are generated to reach these target discharging points.

When the route generating techniques described in (a), (b), and (c) above are applied to travel route generation for unmanned vehicles, the time required for travel route generation will be shortened in comparison with the route generating method by teaching or the like. However, these techniques pose various problems when taking into consideration the controllability of the unmanned vehicles and the productivity.

If these conventionally techniques are directly applied to an unmanned vehicle driving system, even minimum vehicle constraint conditions cannot be satisfied in some cases.

For example, the route generating method using mesh and vector potential as described in (a) above does not take into consideration turning radii of vehicles. Therefore, there will be a chance that an unmanned vehicle cannot turn around in a travel route generated by this method, making it impossible to run the vehicle.

According to another conventional technique using random search, the algorithm depends on random numbers, which makes it difficult to find the cause of trouble when travel route generation becomes impossible.

Furthermore, travel routes generated by these conventional techniques are not necessarily optimal routes in terms of cost.

Specifically, in actual working sites, it is desirable that the frequency of replacing consumable parts and the occurrence of failure should be minimized to reduce the costs caused by running unmanned vehicles so that the unmanned vehicles are enabled to operate for a long period of time with high reliability. In particular, dump truck tires are so expensive that it is imperative to reduce the load on the tires. Further, it is desirable for achieving the cost reduction that the time required for traveling the vehicle should be shortened to reduce the working time and the vehicle's operating time. It is also desirable for achieving the cost reduction that the vehicles are enabled to travel with low fuel consumption.

Therefore, it becomes an important issue how to generate a travel route minimizing the costs caused by travel of unmanned vehicles. Specifically, for example, these unmanned vehicles are desirably capable of reducing the load on tires and vehicle bodies, shortening the time required for the travel, and traveling with low fuel consumption. More specifically, the traveling cost can be reduced if smooth steering operation is possible and the acceleration and deceleration levels on the vehicle bodies are low, and thereby the load on the tires or vehicle bodies can be suppressed. Further, the traveling cost can be reduced if the time required for the travel of the vehicle is shorted and thereby the working time and the vehicle's operating time are reduced. Still further, the traveling cost can be reduced if the vehicle can travel along the travel route with low fuel consumption.

None of the conventional techniques generates an optimal travel route taking into consideration the costs caused by travel of a vehicle as described above. For example, according to the route generating method using combination of circular arcs and straight lines described in (a) above, the curvature becomes discontinuous at connection points between the circular arcs and the straight lines, which may oblige reduction of vehicle speed or forcible steering operation. Therefore, the work efficiency is poor and the productivity is low.

Likewise, according to the route generating method using a Clothoid curve for maintaining curvature continuity described in (b) above and the route generating method using a polynomial curve described in (c) above, although the curvature continuity is ensured to a certain degree for a single curve, discontinuity in curvature or in rate of change of curvature will occur at the joint when a curve is joined to another one. This will also pose a problem of reduced productivity because reduction of vehicle speed or forcible steering operation may be obliged at the joint between the curves.

When an unmanned vehicle changes its traveling direction in a narrow working site, a switchback point must be included in the travel route. However, according to the conventional techniques, the switchback point positions are set in a fixed pattern. This poses a problem in terms of versatility. Specifically, since the switchback points are set uniformly in a fixed pattern, the travel route containing such switchback points is not optimal one that enables reduction the traveling cost.

This invention has been made in view of these circumstances. It is an object of the invention to minimize the vehicle traveling cost by generating an optimal travel route capable of satisfying the minimum constraint conditions for a vehicle to run and yet capable of minimizing the load on the tires and the vehicle body, shortening the time required for the vehicle to travel, and enabling the vehicle to travel with low fuel consumption.

It should be understood that the inventions described in Japanese Patent Application Laid-Open Nos. 11-296229 and 2000-137522 do not take into consideration the costs caused by running vehicles when generating a travel route.

SUMMARY OF THE INVENTION

A first aspect of the invention provides a travel route generating method for an unmanned vehicle, which includes a condition input step of inputting a vehicle constraint condition including a vehicle width and a minimum turning radius of the unmanned vehicle, and a geometrical constraint condition including a travel route generation range in which the unmanned vehicle is to travel, an obstacle to avoid, and positions and directions of an entrance point and an exit point; and a travel route generating step of generating a travel route such that the vehicle constraint condition and the geometrical constraint condition are satisfied, and such that a function value of a cost function having at least a magnitude of a curve and/or a rate of change in the curve as a cost element is minimized.

A second aspect of the invention relates to the first aspect of the invention, wherein the magnitude of the curve is obtained on the basis of curvature of the travel route or a steering angle, and the rate of change in the curve is obtained on the basis of a rate of change in the curvature of the travel route or a steering operation amount.

A third aspect of the invention relates to the first aspect of the invention, wherein the travel route generating step comprises a step of generating a travel route for the unmanned vehicle with a switchback point introduced therein, and the switchback point is determined so as to minimize the function value of the cost function.

A fourth aspect of the invention relates to the first aspect of the invention, wherein the travel route generating step, which includes: a step of determining whether or not the generated travel route satisfies the vehicle constraint condition and/or the geometrical constraint condition, or whether or not the function value of the cost function is reduced by introduction of a switchback point; and a step of, when it is determined that the generated travel route does not satisfy the vehicle constraint condition and/or the geometrical constraint condition, or it is determined that the function value of the cost function is reduced by introduction of the switchback point, generating a travel route for the unmanned vehicle with the switchback point introduced therein, and wherein the switchback point is determined so as to minimize the function value of the cost function.

A fifth aspect of the invention relates to the first aspect of the invention, wherein the travel route generating step, which includes: an interpolation point searching step of searching for an interpolation point of the travel route along which the unmanned vehicle is to travel; and an interpolation step of interpolating the interpolation point in the route passing from the entrance point via the interpolation point to the exit point, and wherein the search in the interpolation point searching step and/or the interpolation in the interpolation step are/is performed so as to minimize the function value of the cost function.

A sixth aspect of the invention relates to the fifth aspect of the invention, wherein the interpolation in the interpolation step is performed by using a B-spline curve.

More specifically, the method of the first aspect of the invention includes the following processing steps as shown in FIG. 5A.

[Condition Input Step]

Vehicle constraint conditions including a vehicle width and a minimum turning radius of an unmanned vehicle 20, and geometrical constraint conditions including a travel route generation range 8 in which the unmanned vehicle 20 is to travel, an obstacle 9 to avoid, and positions and directions of an entrance point 11 and an exit point 14 are input (step 201).

[Travel Route Generation Step]

A travel route 10 is generated such that the vehicle constraint conditions and the geometrical constraint conditions are satisfied, and such that cost function value of cost elements at least including a magnitude of a curve and/or a rate of change of the curve is minimized. More specifically, the magnitude of the curve is obtained based on a curvature of the travel route or a steering angle, and the rate of change of the curve is obtained based on a rate of change of the curvature of the travel route or a steering operation amount (second aspect of the invention). In other words, the travel route 10 is generated such that the vehicle constraint conditions and the geometrical constraint conditions are satisfied, and the cost value of the cost elements at least including the curvature of the travel route 10 or the steering angle, and/or the rate of change of curvature of the travel route 10 or the steering operation amount of the unmanned vehicle 20 is minimized (step 202).

FIG. 5B is a diagram for explaining the method of the second aspect of the invention, and shows a processing step included in the travel route generating step (step 201) in FIG. 5A.

Specifically, the travel route generating step (step 201) includes the following step.

[Step of Generating a Travel Route for the Unmanned Vehicle 20 with a Switchback Point 12 Inserted Therein]

A travel route 10 for the unmanned vehicle 20 is generated while determining a switchback point 12 such that the cost function value is minimized (step 211).

FIG. 5C is a diagram for explaining the method of the third aspect of the invention, and shows processing steps included in the travel route generating step (step 201) in FIG. 5A.

Specifically, the travel route generating step (step 201) includes the following steps.

[Step of Determining Necessity of Switchback Point 12]

It is determined whether or not the generated travel route 10 satisfies the vehicle constraint conditions and/or the geometrical constraint conditions, or whether or not the cost function value is reduced by insertion of a switchback point 12 (step 221).

[Step of Generating a Travel Route for the Unmanned Vehicle 20 with a Switchback Point 12 Inserted Therein]

A travel route 10 for the unmanned vehicle 20 is generated while determining a switchback point 12 such that the cost function value is minimized when it is determined that the generated travel route 10 does not satisfy the vehicle constraint conditions and/or the geometrical constraint conditions, or when it is determined that the cost function value becomes smaller by insertion of the switchback point 12 (YES in step 221) (step 222).

FIG. 5D is a diagram for explaining the method of the fourth aspect of the invention, and shows processing steps included in the travel route generating step (step 202) in FIG. 5A.

The travel route generating step (step 202) includes the following steps.

[Interpolation Point Searching Step]

Interpolation points are searched for in the travel route 10 along which the unmanned vehicle 20 is to travel. An interpolation point means a point connecting sections to be interpolated (step 231).

[Interpolation Step]

Interpolation points of a route passing from the entrance point 11 via the interpolation points to the exit point 14 are interpolated (step 232).

The search in the interpolation point searching step and/or the interpolation in the interpolation step are/is performed so as to minimize the cost function value.

In the fifth aspect of the invention, the interpolation in the interpolation step in the fourth aspect of the invention is performed by using a B-spline curve (step 232).

The first aspect of the invention provides advantageous effects as described below.

a) The travel route 10 is generated so as to satisfy the vehicle constraint conditions and/or the geometrical constraint conditions, whereby the unmanned vehicle 20 is allowed to travel safely without interfering with an obstacle 9 or the like, and without exceeding the turning capacity of the vehicle.

b) The travel route 10 is generated so as to minimize the cost function value, whereby the unmanned vehicle 20 traveling along this travel route 10 is allowed to travel with lower load on its tires and vehicle body, with a reduced period of time required for the travel, and with lower fuel consumption. This minimizes the costs required for operating the unmanned vehicle 20.

The second and third aspects of the invention provide advantageous effects as follows.

c) A switchback point 12 is determined such that the cost function value is minimized, whereby the unmanned vehicle 20 traveling along the travel route 10 including this switchback point 12 is allowed to travel with lower load on its tires and vehicle body, with reduced time required for the travel, and with lower fuel consumption. This minimizes the costs required for operating the unmanned vehicle 20.

The fourth aspect of the invention is an invention specifying the travel route generating step of the first aspect of the invention.

The fifth aspect of the invention is an invention specifying the interpolation step of the fourth aspect of the invention.

The fifth aspect of the invention provides advantageous effects as described below.

d) The interpolation points are mutually interpolated by using a B-spline curve, whereby a travel route 10 having a smooth shape in which a curvature or a rate of change of curvature is continuous. This makes it possible to generate a travel route 10 which allows the unmanned vehicle 20 to follow the route more easily than the related arts. Whereas the related arts have problems of discontinuity in curvature in the route and in the rate of change of curvature, the invention does not suffer from such problems, and thus the unmanned vehicle 20 is not required to reduce the vehicle speed or to do forcible steering on the travel route. Accordingly, the improvement in productivity can be achieved.

BRIEF DESCRIPTION OF THE DRAWINGS

FIGS. 5A to 5D are flowcharts used for explaining methods of this invention;

FIG. 6A is a table indicating constraint conditions defining limiting conditions for size, travel, and control of unmanned vehicles;

FIG. 6B is a top view of an unmanned vehicle indicating dimensions of the unmanned vehicle;

FIG. 6C is a top view showing how an unmanned vehicle 20 makes a turn;

FIGS. 25A and 25B are diagrams showing routes before and after correction of an interpolation point, respectively;

FIGS. 34A to 34D are diagrams used for explaining a route generation example 2;

FIGS. 37A to 37D are diagrams used for explaining a route generation example 5;

DETAILED DESCRIPTION OF THE INVENTION

A travel route generating method for unmanned vehicles according to preferred embodiment of this invention will be described with reference to the accompanying drawings. The description of this embodiment will be made on the assumption that the unmanned vehicle is an off-road dump truck.

Figure 1:
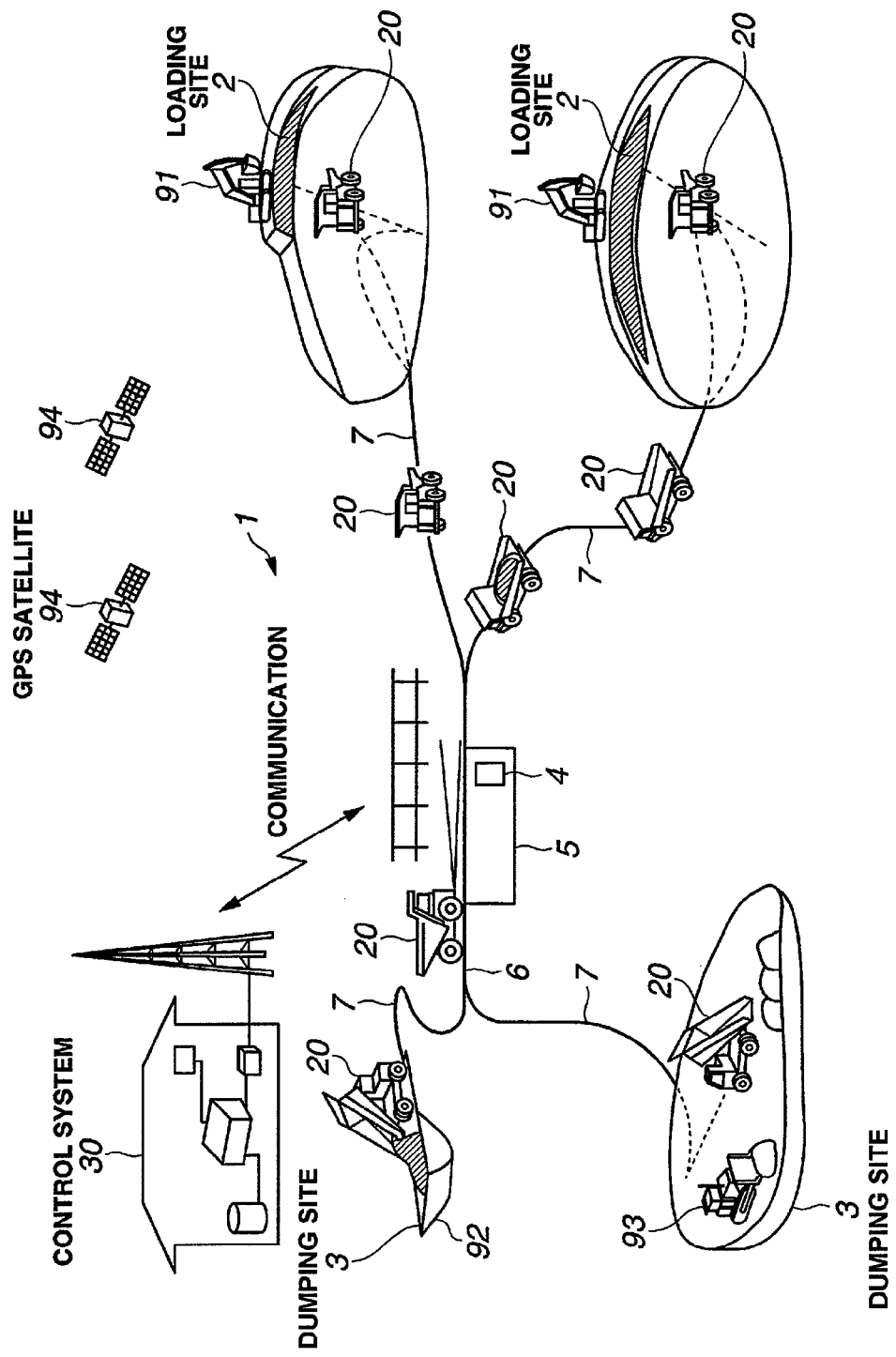
FIG. 1 is a drawing showing overall configuration of an unmanned vehicle driving system and an overall view of a working site.

FIG. 1 shows an overall configuration of an unmanned vehicle driving system, as well as an overall view of a working site.

A working site 1 includes various areas such as a loading site 2, a dumping site 3, a filling station 4, and a parking lot 5. These areas are interconnected by well-prepared transportation roads called haul roads 6, and lead-in roads called access roads 7 extending from the haul roads 6 to the areas, and interconnected by intersections as well.

The loading site 2 is a place where soil is loaded on a dump truck 20. There are performed, in this area, excavation works by an excavation vehicle 91 such as a wheel loader (front-end loader), a backhoe or a shovel, as well as soil loading works on the dump truck 20.

The dumping site 3 is a place where the soil loaded on the dump truck 20 is discharged either at a fixed position or at regular positions within the area. When soil is discharged at a fixed position, the soil is discharged into a hopper 92 provided with a rock crushing machine called crusher. In some cases, at the dumping site 3, discharged soil is leveled out by a dozer 93. In such cases, the dozer 93 may indicate a position for soil discharge in order to repair damaged road surfaces, and the soil is discharged at the indicated position.

The filling station 4 is provided with a fuel pump. The filling station 4 is often located in the parking lot 5. Even if dump trucks are supposed to be fueled from a fuel truck, the filling station may be provided so as not to impede operation of other dump trucks 20.

The parking lot 5 is a place where when vehicles are manned vehicles used for manned work, the vehicles are parked so that the operators take a meal or are relieved. As for an unmanned vehicle driving system, the parking lot 5 is a place where dump trucks are stored to allow inspectors to step into dump trucks safely for conducting periodic inspections or the like, and to allow operators to perform start operation.

Figure 2:
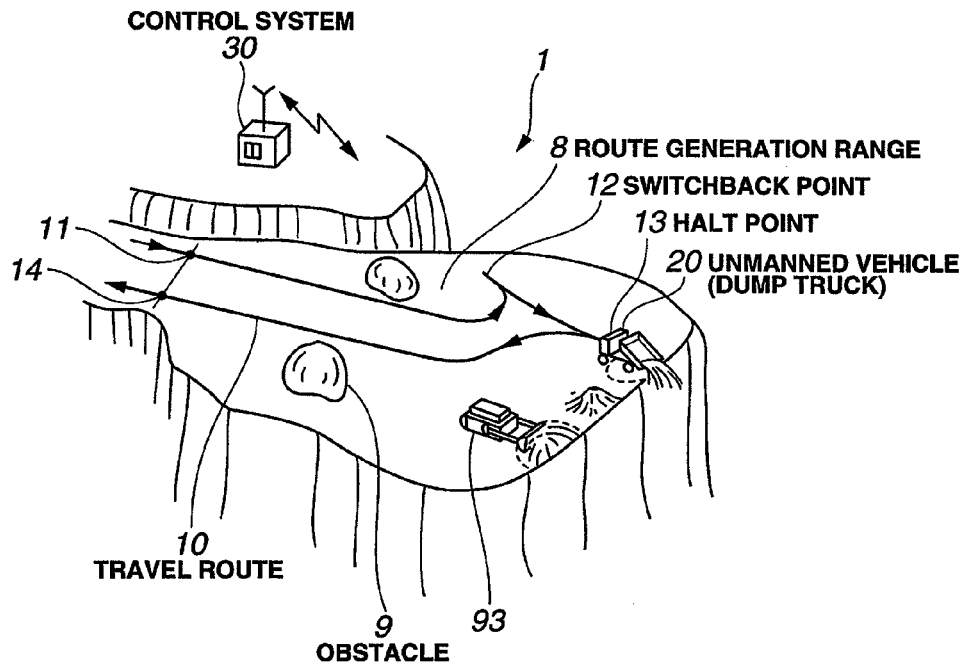
FIG. 2 is a drawing showing an example of appearance of a route generation range where a travel route is generated according to an embodiment of the invention.

FIG. 2 shows an example of appearance of a route generation range 8 in which a travel route 10 is generated according to the embodiment of the present invention. The route generation range 8 is for example the dumping site 3 described above. The description of this embodiment will be made on the assumption of a case in which a dump truck loaded with soil or the like is guided as an unmanned vehicle 20 to travel along the travel route 10 within the route generation range 8. Specifically, for an example, the unmanned vehicle 20 travels along the travel route 10, entering the route generation range 8 from an entrance point 11, heading toward a switchback point 12 to perform a switchback at the switchback point 12, and halting at a halt point (spot point) 13 or a soil discharging point to discharge the soil. The unmanned vehicle 20 then heads toward an exit point 14, and exits the route generation range 8 through the exit point 14. The unmanned vehicle 20 travels along the travel route 10 so as to avoid any obstacles 9 present in the route generation range 8. The term "travel route" as used herein refers to such a route that is generated in the route generation range 8 and along which the unmanned vehicle 20 travels from the entrance point 11 to the exit point 14, avoiding the obstacles 9.

The unmanned vehicle 20 is a front wheel-steering vehicle having front wheels and rear wheels, and provided with a driver seat (cab) mounted at the front of the vehicle body, and with a carrier (vessel or body) at the rear of the vehicle body.

The traveling direction of the unmanned vehicle 20 is changed, before and after the switchback point 12, from the forward direction to the reverse direction, or from the reverse direction to the forward direction.

The unmanned vehicle 20 enters the halt point (spot point; soil discharging point) 13 in its reverse traveling state.

Figure 3:
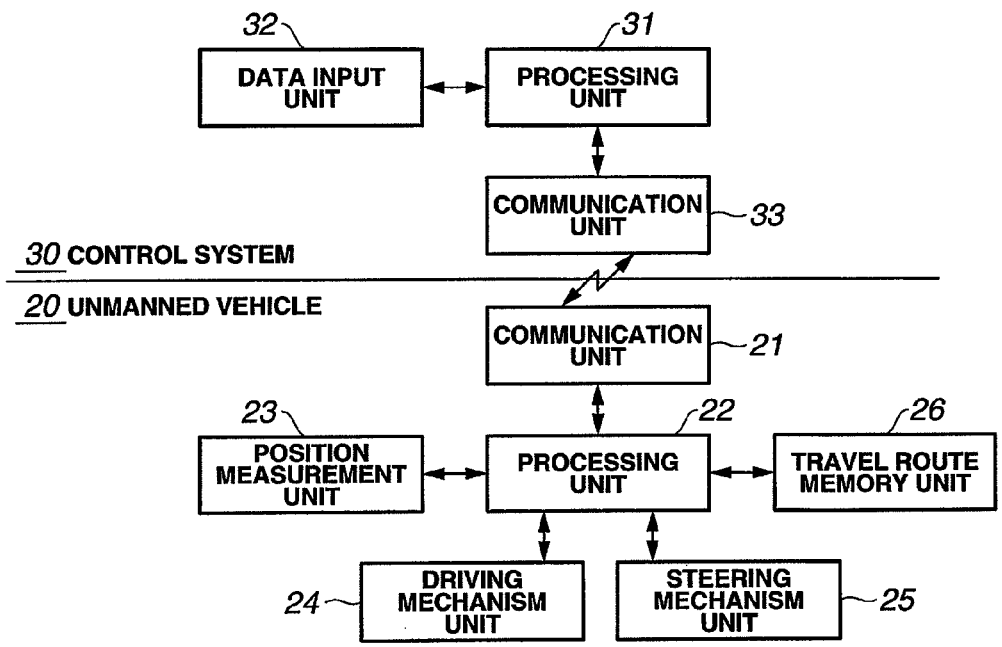
FIG. 3 is a block diagram showing an unmanned vehicle driving system according to an embodiment of the invention.

FIG. 3 is a block diagram showing an unmanned vehicle driving system according to an embodiment of the invention.

The working site 1 is provided with a control system 30 for managing and monitoring a great number of vehicles 20. The control system 30 has a processing unit 31, a data input unit 32, and a communication unit 33. On the other hand, each vehicle 20 has a communication unit 21, a processing unit 22, a position measurement unit 23, a driving mechanism unit 24, a steering mechanism unit 25, and a travel route memory unit 26.

The position measurement unit 23 of each vehicle 20 measures the position of the vehicle. A tire rotation speed sensor and a gyro, for example, mounted on the vehicle 20 are used as means for measuring the position. The vehicle position is measured based on output signals from the tire rotation speed sensor and the gyro. Alternatively, the vehicle position may be measured by receiving a signal transmitted from a GPS satellite 94 (see FIG. 1) with a GPS antenna and detecting it with a GPS sensor.

Position data measured by the vehicle 20 is processed by the processing unit 22 and transmitted to the control system 30 via the communication unit 21. The communication unit 33 of the control system 30 receives position data transmitted from a plurality of the vehicles 20. The received position data is used for managing and monitoring the plurality of the vehicles 20.

The data input unit 32 of the control system 30 receives, as described later, data on vehicle constraint conditions including a vehicle width and a minimum turning radius of an unmanned vehicle 20, as well as data on geometrical constraint conditions including a travel route generation range 8 in which the unmanned vehicle 20 is to travel, obstacles 9 which the vehicle is to avoid, and positions and directions of an entrance point 11 and an exit point 14.

Figure 4A:
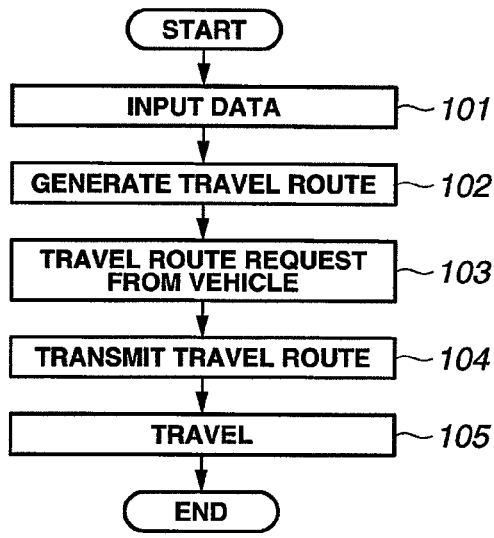
FIGS. 4A to 4C are flowcharts showing sequences of processing steps performed between an unmanned vehicle and a control system.
Figure 4B:
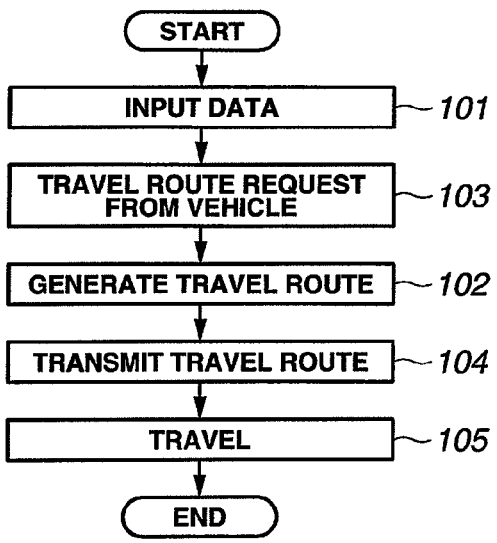
Figure 4C:
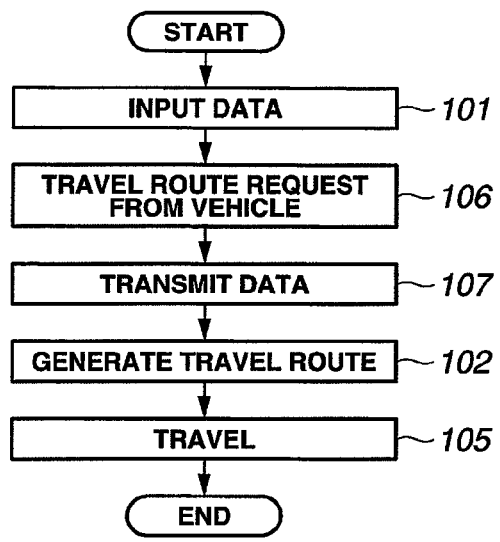

The travel route 10 is either previously generated and stored by the control system 30 before the control system 30 receives a request from an unmanned vehicle 20 (see FIG. 4A), or generated each time the control system 30 receives a request from an unmanned vehicle 20 (see FIGS. 4B and 4C). Even when the travel route 10 is generated each time the control system 30 receives a request from an unmanned vehicle 20, the travel route 10 may be generated by the control system 30 itself (FIG. 4B), or the travel route 10 may be generated by the unmanned vehicle 20 which receives data required for generating the travel route 10 from the control system 30 (FIG. 4C).

Sequences of the processing steps for each of these cases will be described, additionally referring to FIGS. 4A to 4C.

In the case in which a travel route 10 is previously generated, stored, and memorized by the control system 30 before the control system 30 receives a request from an unmanned vehicle 20, as shown in FIG. 4A, once data on vehicle constraint conditions and geometrical constraint conditions are input (step 101), the processing unit 31 performs processing to generate a travel route 10 based on the vehicle constraint conditions and the geometrical constraint conditions, and data on the generated travel route 10 is stored (step 102). When an instruction to request a travel route 10 is transmitted from the communication unit 21 of the unmanned vehicle 20 (step 103), the instruction is received by the communication unit 33. Upon receiving the instruction, the processing unit 31 retrieves stored data on the travel route 10 according to the instruction, and sends it to the communication unit 33, which transmits the data to the communication unit 21 (step 104).

Based on the received data on the travel route 10, the processing unit 22 of the vehicle 20 generates a travel command and a steering command for driving and steering the vehicle 20. The travel command and the steering command are output to the driving mechanism unit 24 and the steering mechanism unit 25, respectively. As a result, the vehicle 20 is driven and steered along the travel route 10 whose data have been transmitted from the control system 30 (step 105).

In the case in which the control system 30 generates a travel route 10 each time the control system 30 receives a request from an unmanned vehicle 20, as shown in FIG. 4B, data on vehicle constraint conditions and geometrical constraint conditions are input in the first step (step 101).

When an instruction to request a travel route 10 is transmitted from the communication unit 21 of an unmanned vehicle 20 (step 103), the instruction is received by the communication unit 33. Upon receiving the instruction, the processing unit 31 performs processing to generate a travel route 10 based on the vehicle constraint conditions and the geometrical constraint conditions (step 102). Data on the travel route 10 is transmitted to the communication unit 33, and the communication unit 33 transmits the data to the communication unit 21 (step 104). The processing unit 22 of the vehicle 20 generates a travel command and a steering command for driving and steering the vehicle 20 based on the received data on the travel route 10. The travel command and the steering command are output to the driving mechanism unit 24 and the steering mechanism unit 25, respectively. As a result, the vehicle 20 is driven and steered along the travel route 10 whose data have been transmitted from the control system 30 (step 105).

In the case in which each time a request is made from an unmanned vehicle 20, the control system 30 sends data for generating a travel route 10 to the unmanned vehicle 20 so that the unmanned vehicle 20 generates the travel route 10, as shown in FIG. 4C, data on vehicle constraint conditions and geometrical constraint conditions are input in the first place (step 101). When an instruction to request data for generating a travel route 10 is transmitted from the communication unit 21 of the unmanned vehicle 20 (step 106), the instruction is received by the communication unit 33. Receiving the instruction, the processing unit 31 transmits data on the vehicle constraint conditions and the geometrical constraint conditions to the communication unit 33, and the communication unit 33 transmits the data to the communication unit 21 (step 107). The processing unit 22 of the vehicle 20 performs processing to generate a travel route 10 based on the received data on the vehicle constraint conditions and the geometrical constraint conditions (step 102). On the basis of the generated data on the travel route 10, the processing unit 22 then generates a travel command and a steering command for driving and steering the vehicle 20. The travel command and the steering command are output to the driving mechanism unit 24 and the steering mechanism unit 25, respectively. As a result, the vehicle 20 is driven and steered along the travel route 10 whose data have been transmitted from the control system 30 (step 105).

Next, referring to FIGS. 5A to 5D, sequences of basic processing steps of a method for generating a travel route 10 according to the embodiment will be described.

FIG. 5A is a partial flowchart showing those steps corresponding to the data input processing in step 101 and the travel route generation processing of step 102 in FIGS. 4A, 4B and 4C described above.

As shown in FIG. 5A, the method of the embodiment includes the following steps.

It should be noted that cost elements used in the following description of the processing steps are those relating to operation of an unmanned vehicle 20. Specifically, the cost elements include length of a rout along which the unmanned vehicle travels, curvature of a curve on the travel route, steering operation amount of the unmanned vehicle, and so on. More specifically, the tires and the brake of a vehicle are worn away every time the vehicle is driven and braked during its travel. Likewise, when the curvature of a curve is small, or the steering operation amount is great (during stationary steering, for example), the load on the tires is increased, which increases the wearing of the tires. Under these conditions, the travel speed will be decreased and hence the productivity will be deteriorated, resulting in adverse effects on the cost elements.

Cost functions are those representing the cost elements described above as functions.

[Condition Inputting Step]

Vehicle constraint conditions including a vehicle width and a minimum turning radius of an unmanned vehicle 20 are input, while geometrical constraint conditions including a travel route generation range 8 in which the unmanned vehicle 20 is to travel, an obstacle 9 to avoid, and positions and direction of the entrance point 11 and the exit point 14 are input (step 201).

[Travel Route Generating Step]

A travel route 10 is generated such that the vehicle constraint conditions and the geometrical constraint conditions are satisfied and the cost function value of the cost elements at least including the magnitude of the curve and/or the rate of change of the curve is minimized. Specifically, the magnitude of the curve is obtained from a curvature of the travel route or a steering angle, and the rate of change of the curve is obtained from a rate of change of curvature of the travel route or a steering operation amount. Thus, a travel route is generated such that the vehicle constraint conditions and the geometrical constraint conditions are satisfied and the cost function value of cost elements at least including the curvature of the travel route or the rate of change of the steering angle and/or the curvature of the travel route, or the steering operation amount of the unmanned vehicle is minimized (step 202).

A cost function E is defined here. The cost function E will be described below.

If route generation is to be performed in consideration of optimality, not only distance but also magnitude of curvature and rate of change of curvature must be taken into consideration. According to this embodiment, route search is performed by using an improved Dijkstra algorithm described later. Before performing the route search, the cost required to reach each vertex is estimated not only based on the distance but also based on an estimated value of a magnitude of curvature and a rate of change of the curvature. Further, the route search is conducted in consideration of the vehicle orientation at the starting point and the end point as described below.

Figure 40:
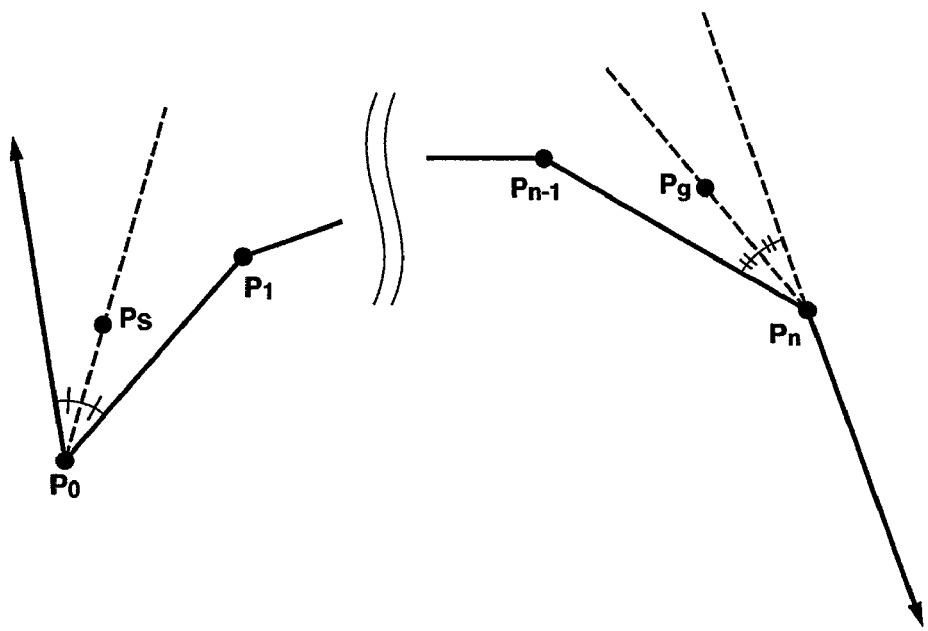
FIG. 40 is a diagram for explaining definition of cost functions.

Consideration of Vehicle Orientation at the Starting Point and End Point:

In order to take into consideration the vehicle orientation at the starting point and the end point, virtual points Ps and Pg are located as shown in FIG. 40, provided that the formula below is satisfied.

[Ex. 1a]

$$\overline{P_0 P_s} = \frac{\overline{P_0 P_1}}{2} \cdot \overline{P_g P_n} = \frac{\overline{P_{n-1} P_n}}{2}$$

Curvature:

Curvature κ of a curve is defined as a coefficient of variation of tangential line slope θ, and is represented by the following formula (1).

$$\kappa = d\theta/ds \quad (1)$$

Figure 41:
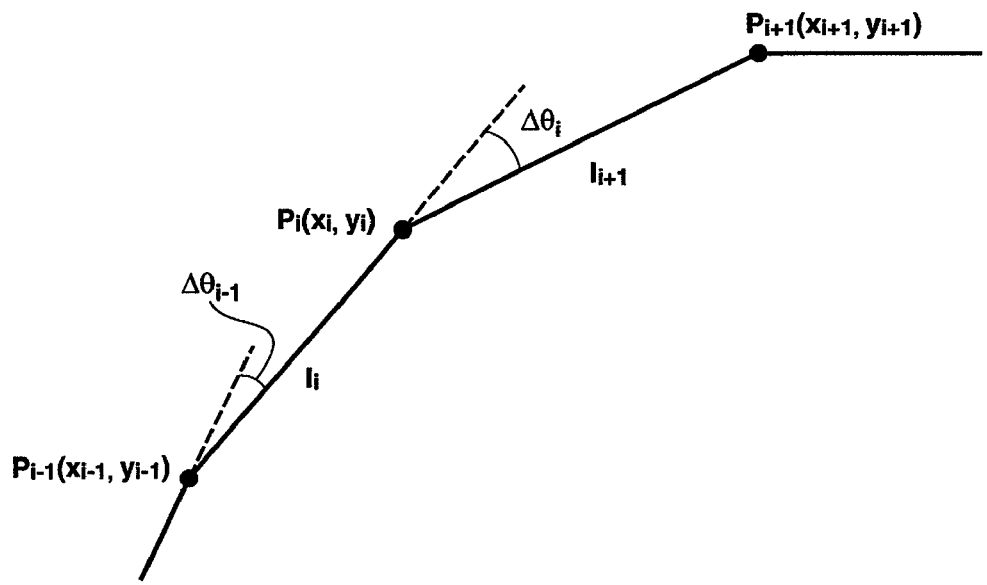
FIG. 41 is also a diagram for explaining definition of cost functions.

As shown in FIG. 41, an estimated value κi of the curvature at a point of junction Pi is estimated by dividing an angular variation Mi of the edge at the point of junction Pi by an average value of lengths of edges located before and after the point of junction Pi, as represented by the following formula (2).

[Ex. 1b]

$$K_i = \frac{\Delta \theta_i}{(l_{i+1} + l_i)/2} \quad (2)$$

Figure 42:
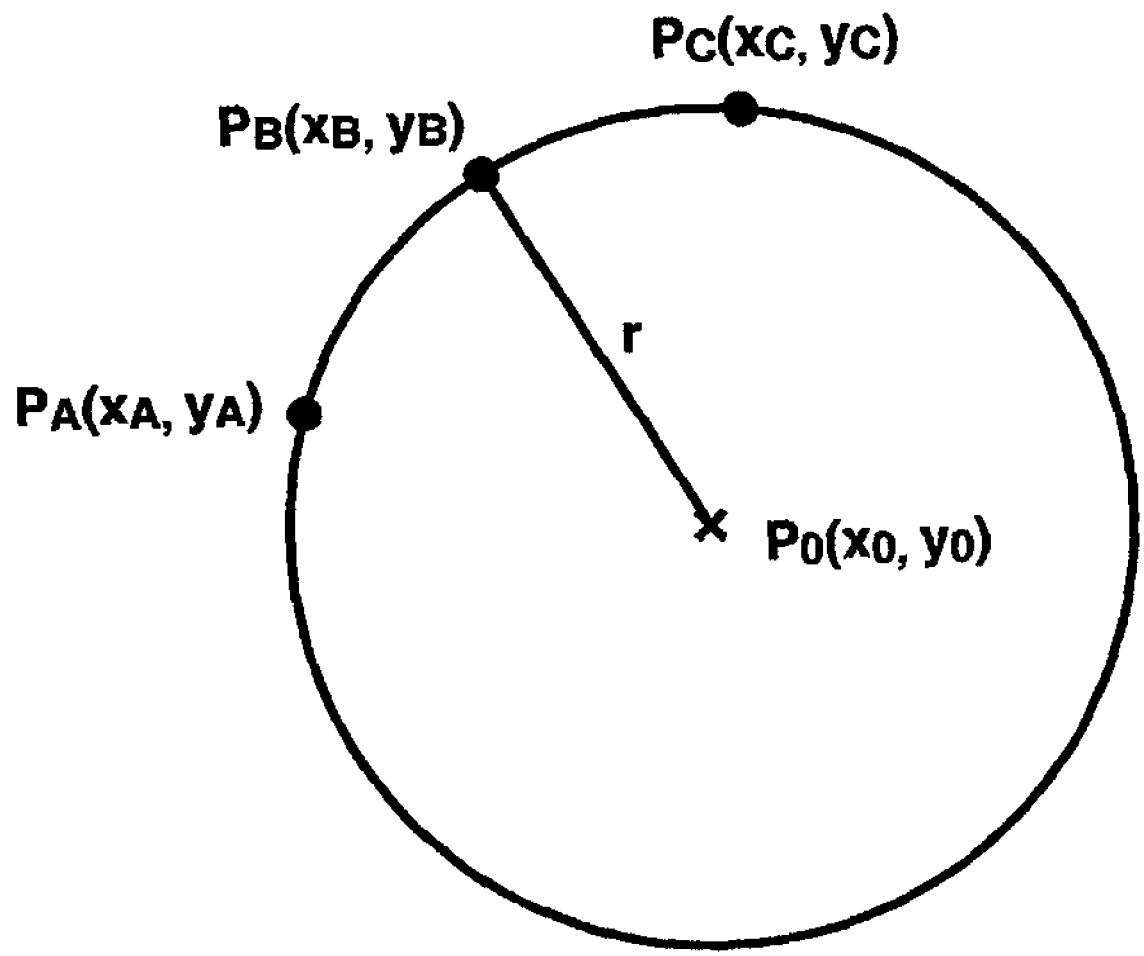
FIG. 42 is also a diagram for explaining definition of cost functions.

Estimated values of curvature κ0 and κn at the start point P0 and the goal point Pn are obtained by approximating a circle passing three points P0, Ps and P1, and a circle passing through three points Pn−1, Pg and Pn by a curvature circle, respectively (see FIG. 40). As shown in FIG. 42, the center P0 (x0, y0) of the circle passing the three points PA, PB and PC can be obtained by formulae (3) and (4) below. Therefore, the radius r can be obtained by a formula (5).

[Ex. 1c]

$$x_0 = \frac{(x_C^2 - x_B^2 + y_C^2 - y_B^2)(y_B - y_A) - (x_B^2 - x_A^2 + y_B^2 - y_A^2)(y_C - y_B)}{2\{(x_C - x_B)(y_B - y_A) - (x_B - x_A)(y_C - y_B)\}} \quad (3)$$

$$y_0 = \frac{(x_B^2 - x_A^2 + y_B^2 - y_A^2)(x_C - x_B) - (x_C^2 - x_B^2 + y_C^2 - y_B^2)(x_B - x_A)}{2\{(x_C - x_B)(y_B - y_A) - (x_B - x_A)(y_C - y_B)\}} \quad (4)$$

$$r = \sqrt{(x_A - x_0)^2 + (y_A - y_0)^2} \quad (5)$$

The curvature κ is estimated as an inverse number of this radius r, as represented by a formula (6) below.

$$\kappa = 1/r \quad (6)$$

Rate of Change of Curvature:

A value of rate of change of curvature at the point of junction Pi of the edges is estimated from a formula (7) below based on the estimated value κ of the curvature obtained as described above. The rate of change of curvature at the starting point P0 is set to zero.

[Ex. 1d]

$$\frac{dk_t}{ds} = \frac{k_t - k_{t-l}}{l_t} \quad (7)$$

Cost Function E:

Thus, the cost function E is defined as a formula (8) below, in consideration of not only the distance but also the magnitude and rate of change of the curvature. The first term of the formula (8) reduces the turning radius of the vehicle by reducing the curvature. The second term reduces the steering operation amount per unit distance by reducing the rate of change of curvature. The third term shortens the travel distance. In the formula (8), α, β and γ denote weighting constants.

[Ex. 1e]

$$E = \alpha \sum |k_t| + \beta \sum \left|\frac{dk_t}{ds}\right| + \gamma \sum l_t \quad (8)$$

In the formula (7) above, "the curvature of the travel route" in the first term may be replaced with "the steering angle of the vehicle". Further, "the rate of change of curvature of the travel route" in the second term may be replaced with "the steering operation amount of the vehicle".

FIG. 5B shows a processing step included in the travel route generating step (step 201) in FIG. 5A.

Specifically, the travel route generating step (step 201) includes the processing step as follows.

[Step to Generate a Travel Route for the Unmanned Vehicle 20 by Inserting a Switchback Point 12]

The travel route 10 for the unmanned vehicle 20 is generated with a switchback point 12 determined so as to minimize the cost function value (step 211).

FIG. 5C shows processing steps included in the travel route generating step (step 201) in FIG. 5A.

Specifically, the travel route generating step (step 201) includes the processing steps as follows.

[Step to Determine Necessity of a Switchback Point 12]

It is determined whether or not the generated travel route 10 satisfies the vehicle constraint conditions and/or geometrical constraint conditions, or whether or not the cost function value is reduced by insertion of a switchback point 12 (step 221).

[Step to Generate a Travel Route for the Unmanned Vehicle 20 by Inserting a Switchback Point 12]

If it is determined that the generated travel route 10 does not satisfy the vehicle constraint conditions and/or geometrical constraint conditions, or that the cost function value is reduced by insertion of a switchback point 12 (YES in step 221), the travel route 10 for the unmanned vehicle 20 is generated with the switchback point 12 that is determined so as to minimize the cost function value (step 222).

FIG. 5D shows processing steps included in the travel route generating step (step 201) in FIG. 5A.

Specifically, the travel route generating step (step 201) includes the processing steps as follows.

[Interpolation Point Searching Step]

Interpolation points in a travel route 10 along which the unmanned vehicle 20 is to travel are searched (step 231).

[Interpolation Step]

The interpolation points are interpolated in a route passing from the entrance point 11 to the exit point 14 via the interpolation points (step 232).

The search in the interpolation point searching step and/or the interpolation in the interpolation step should be performed so as to minimize the cost function value.

The interpolation in the interpolation step is performed by using a B-spline curve.

Particulars of the travel route generating method described above will be described more specifically.

[Vehicle Constraint Conditions]

Figure 7A:
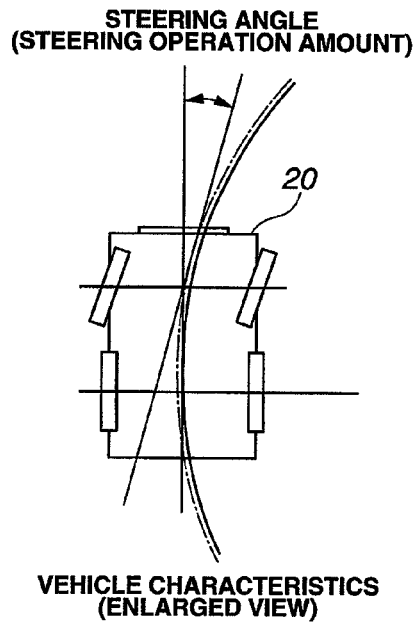
FIG. 7A is a top view showing how an unmanned vehicle steers.

FIG. 6A is a table indicating constraint conditions defining limiting conditions for size, travel, control of the unmanned vehicle 20, etc. FIG. 6B is a top view of the unmanned vehicle 20, showing dimensions of the unmanned vehicle 20. FIG. 6C is a top view showing how the unmanned vehicle 20 makes a turn. FIG. 7A is a top view showing how the unmanned vehicle 20 steers.

The vehicle constraint condition includes distance FSize from a vehicle reference point 20c to the front end of the vehicle body of the unmanned vehicle 20 (see FIGS. 6A and 6B), distance RSize from the vehicle reference point 20c to the rear end of the vehicle body (see FIGS. 6A and 6B), vehicle width Width (see FIGS. 6A and 6B), wheelbase WBL (see FIGS. 6A and 6B), minimum turning radius (see FIGS. 6A and 6C), maximum forward travel speed, maximum reverse travel speed, maximum acceleration, maximum deceleration, maximum allowable reverse acceleration, and average maximum steering operation amount per unit time (see FIGS. 6A and 7A).

[Geometrical Constraint Conditions]

Figure 7B:
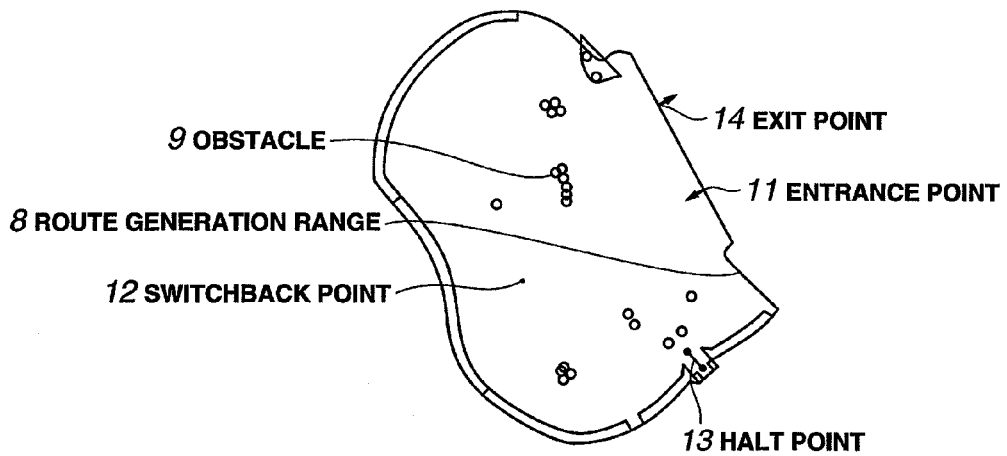
FIG. 7B is a diagram showing geometrical constraint conditions defining constraint conditions of a region in which an unmanned vehicle travels.

FIG. 7B is a diagram showing geometrical constraint conditions defining constraint conditions of a region in which an unmanned vehicle 20 travels. The geometrical constraint conditions includes a travel route generation range 8 in which the unmanned vehicle 20 is to travel, an obstacle 9 to avoid, position and direction of the entrance point 11, position and direction of the exit point 14, position and direction of the halt point 13, and position of the switchback point 12.

[Route Optimality Conditions]

In order to reduce the traveling cost of an unmanned vehicle 20, it is necessary to shorten the time required for the travel of the unmanned vehicle 20, to reduce fuel consumption, and to reduce the load on the tires and vehicle body. In order to reduce fuel consumption, it is necessary to reduce the accelerating/decelerating speed, and to shorten the total distance. In order to reduce the load on the vehicle body and tires, it is necessary to reduce the steering operation amount per unit distance (to reduce the rate of change of curvature), and to enable smooth steering operation (to reduce variation in steering operation amount). An approximated value of variation in steering operation amount can be obtained by using a quadratic differential value of curvature.

According to this embodiment of the invention, a travel route 10 is generated so as to satisfy the above-described route optimality conditions taking various cost elements into consideration, in addition to the vehicle constraint conditions and the geometrical constraint conditions described above.

[Generation of Basic Route]

A method of generating a basic route of a travel route 10 will be described.

Figure 8:
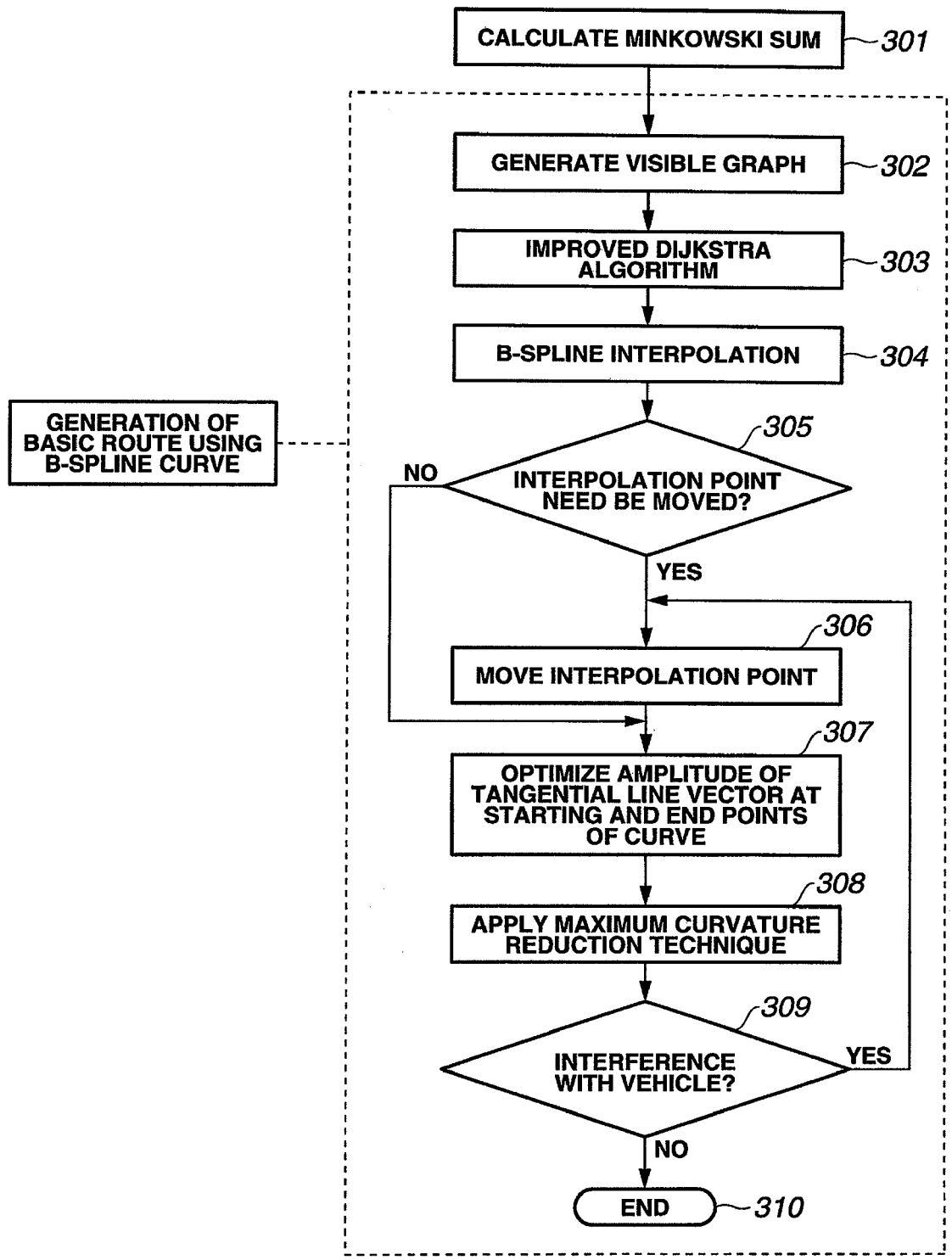
FIG. 8 is a flowchart showing sequences of processing steps of a basic route generating method.

FIG. 8 shows sequences of processing steps of a basic route generating method. Description will be made with reference to FIG. 8.

FIG. 8 is a flowchart showing specific processing steps in the travel route generating step (step 201) shown in FIG. 5.

[Calculation of a Minkowski Sum]

A Minkowski sum calculating technique is applied to the geometrical constraint conditions to expand the route generation range 8 and the obstacle 9. Specifically, a disc with a diameter corresponding to the vehicle width of the unmanned vehicle 20 is moved along the boundary of the route generation range 8 and the boundary of the obstacle 9, and a total sum thus obtained is set as an expanded region. The region in which the unmanned vehicle 20 is allowed to travel is defined by the outlines of the expanded route generation range 8 and obstacle 9, whereby the unmanned vehicle 20 can be prevented from interfering with the route generation range 8 or the obstacle 9.

Figure 16A:
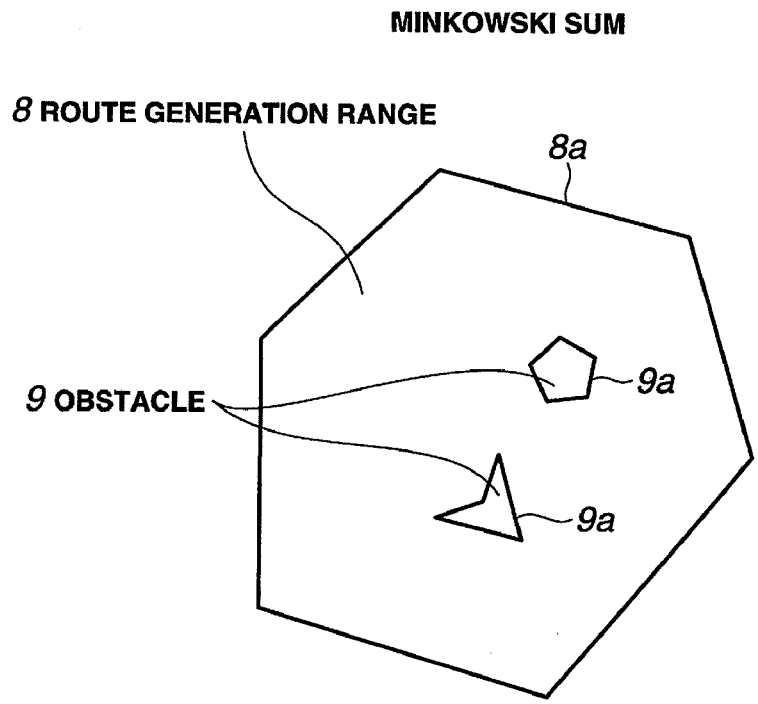
FIGS. 16A and 16B are diagrams for explaining calculation of a Minkowski sum.
Figure 16B:
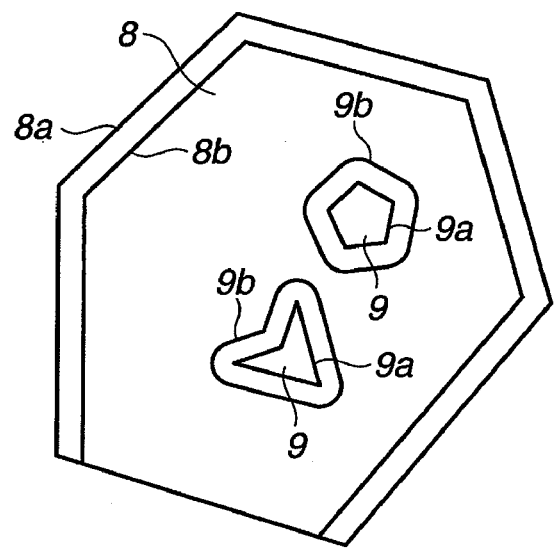

FIGS. 16A and 16B are diagrams for explaining the calculation of the Minkowski sum.

FIG. 16A shows a route generation range 8 and obstacles 9 as input.

The boundary 8a of the route generation range 8, the boundaries 9a of the obstacles 9 and the boundary of the disk for the unmanned vehicle to travel are approximated using polygons, and the calculation of the Minkowski sum is performed. According to this embodiment of the invention, the boundary of the route generation range 8 and the obstacles 9 are expanded by a half width of the unmanned vehicle 20, so that the unmanned vehicle 20 is allowed to move without interfering with the boundary of the route generation range 8 or the obstacles 9. This expansion amount is a minimum amount required to prevent the unmanned vehicle 20 from interfering with the obstacles while traveling. Therefore, this does not necessarily ensure the prevention of interference. The traveling unmanned vehicle 20 is oriented in a variety of directions. This makes it difficult to estimate an adequate expansion amount. Specifically, the Minkowski sum is used in which the sum of sets A and B is defined as follows:

$$A \oplus B = \{x+y | x \in A, y \in B\}$$ [Ex. 1f]

FIG. 16B shows the Minkowski sum of the route generation range 8, the obstacles 9 and the disc. The boundary 8a of the route generation range 8 is expanded to an outline 8b. Likewise, the boundaries 9a of the obstacles 9 are expanded to outlines 9b.

The outlines 8b and 9b of the route generation range 8 and the obstacles 9 estimated by the Minkowski sum are represented by circular arcs and straight lines. In order to draw visibility graphs as described later, outlines of those parts represented by the circular arcs are turned into polygons by connecting several points on the circular arcs.

These are the particulars of the Minkowski sum calculating processing (step 301).

[Generation of Visibility Graphs]

Next, visibility graphs are drawn with respect to the route generation range 8 and the obstacles 9 estimated by the Minkowski sum. The term "visibility graphs" refers to a set of edges obtained by connecting the vertices of the outlines (polygons) of the route generation range 8 and the obstacles 9. In other words, the visibility graphs are a set of edges obtained connecting the vertices of the outlines so as to ensure "visibility" between each pair of vertices without passing through the obstacles 9. The visibility graphs are generally used for obtaining a minimum distance. For obtaining an optimal route here, those visible edges which are not tangential lines at the vertices are previously omitted since they cannot be a shortest route.

Figure 17:
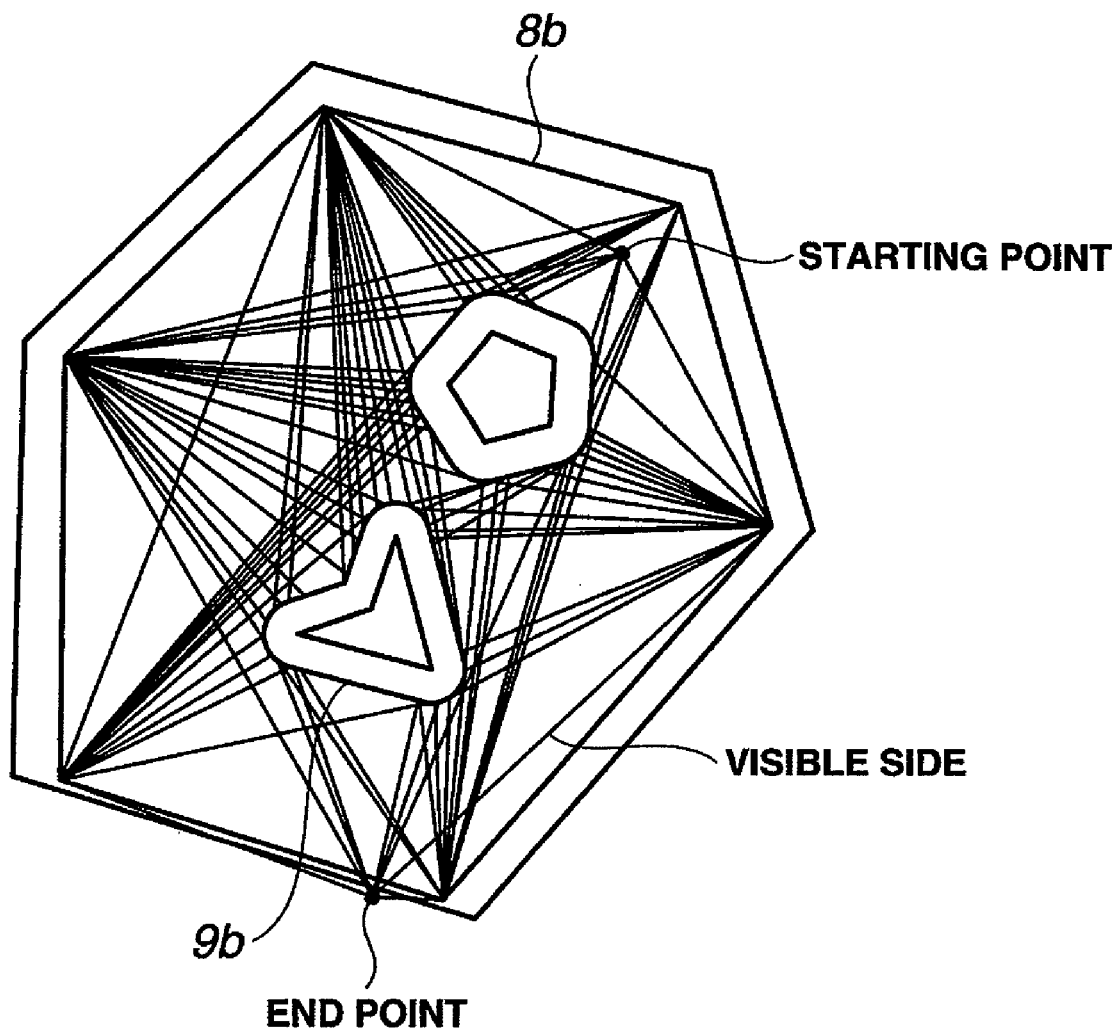
FIG. 17 is a diagram showing an example of visibility graphs drawn with respect to the outlines of the Minkowski-summed route generation range and obstacles.

FIG. 17 shows an example of visibility graphs drawn with respect to the Minkowski-summed outlines 8b and 9b of the route generation range 8 and the obstacles 9. As for the parts of the Minkowski-summed outlines 8b and 9b of the route generation range 8 and the obstacles 9 which assume a circular arc shape, the arc length is divided into five equal lengths by points, and these points are interconnected to form a polygon.

When two vertices are "visible to each other," or when a line segment connecting two vertices intersects none of the Minkowski-summed outlines 8b and 9b of the route generation range 8 and the obstacles 9, these vertices are determined to be mutually visible and interconnected with a line segment (visible edge). Each edge between adjacent vertices on the obstacles 9 is a visible edge.

For obtaining a minimum distance, those visible edges which are not tangential lines at the vertices are previously omitted since they cannot be a shortest route. If the edges form a concave shape, they are not tangential lines.

A method of determining whether or not a line is a tangential line will be described with reference to FIG. 18.

Figure 18:
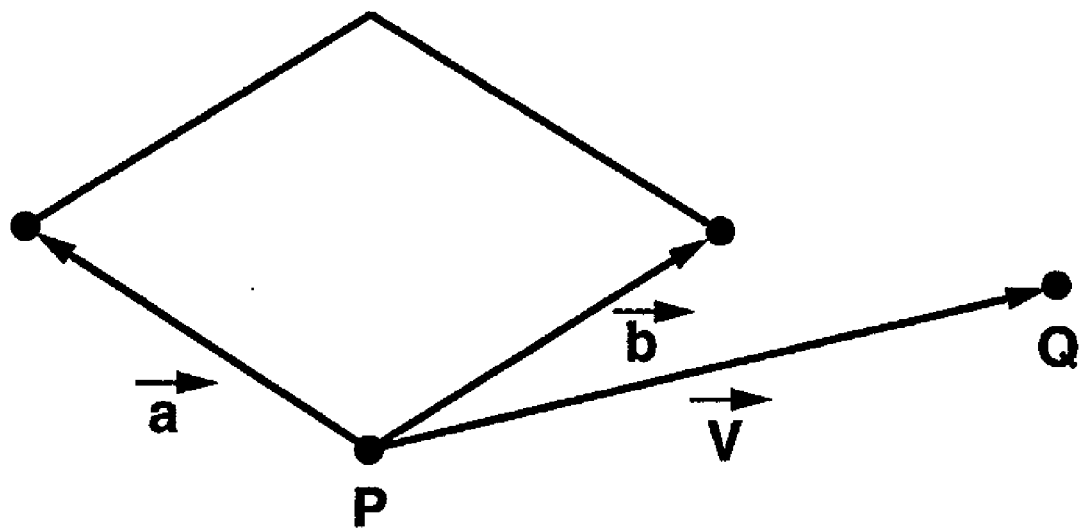
FIG. 18 is a diagram for explaining a method of determining whether or not a line is a tangential line.

As shown in FIG. 18, a vector extending from a vertex P to a point Q located on a visibility graph is denoted by V, while vectors extending from the vertex P to its adjacent vertices are denoted as follows.

$$\vec{a}, \vec{b}$$ [Ex. 2]

In this case, the vector V is represented by the following formula (3.1).

[Ex. 3]

$$\vec{V} + \alpha \vec{a} + \beta \vec{b} \tag{3.1}$$

The coefficient α and β in the equation (3.1) above are found, and it is determined that the line is a tangential line if the relationship of αβ<0 is satisfied between these two coefficients α and β.

Figure 19:
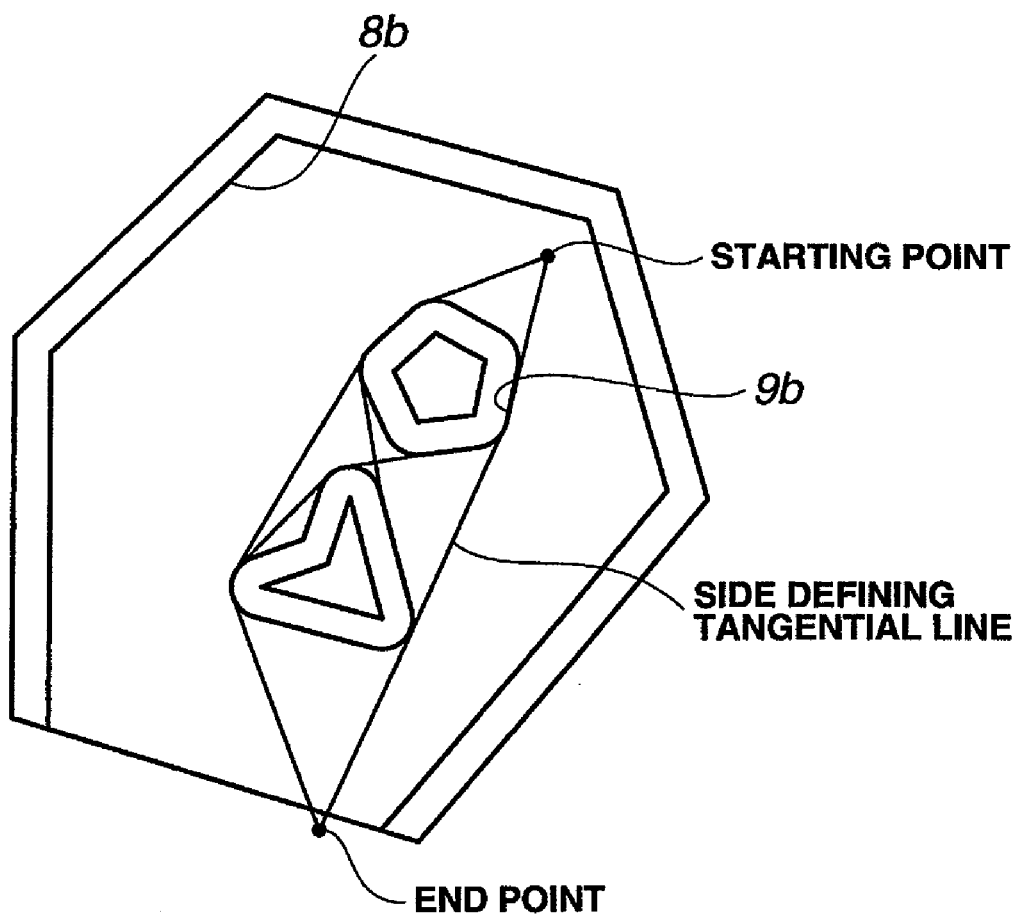
FIG. 19 is a diagram showing graphs obtained after removing lines determined not to be tangential lines from the visibility graphs shown in FIG. 17.

Then, a line segment is drawn only when the conditions are satisfied that the edge between the two vertices is a visible edge and the line is a tangential line. FIG. 19 shows graphs obtained after the edges which are not tangential lines are removed from the visibility graphs shown in FIG. 17.

Figure 10:
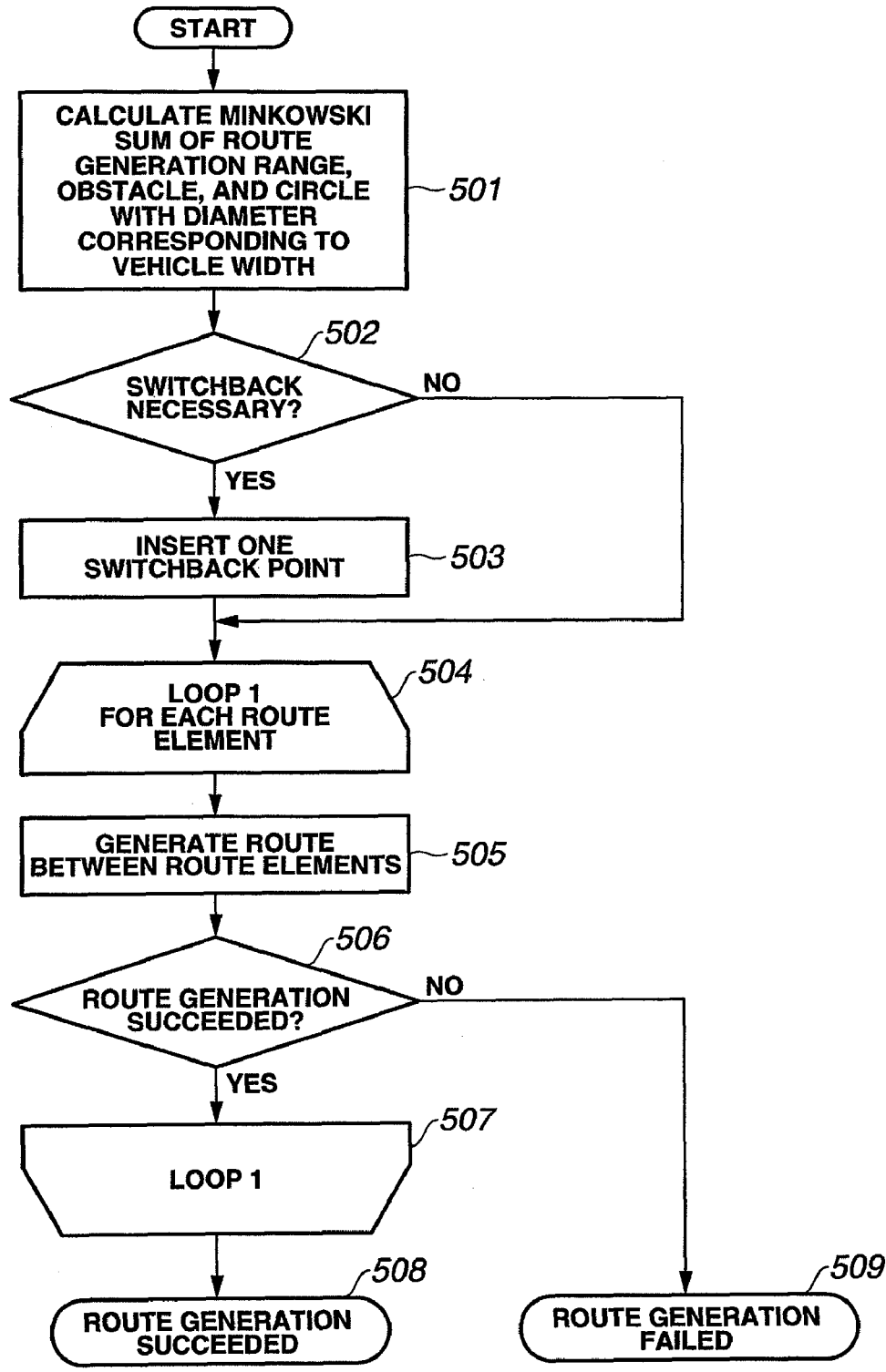
FIG. 10 is a flowchart showing a route generating flow for explaining "a method of fixing a switchback point once generated"

However, the directions of the entrance point 11, the exit point 14, the switchback point 12, and the halt point 13 have not yet been taken into consideration in the visibility graphs shown in FIG. 10.

These are the particulars of the processing to generate visibility graphs (step 302).

[Search for Edges to be Optimum Route Candidates (Interpolation Point Candidates) by Improved Dijkstra Algorithm]

In the next step, edges to be optimum route candidates are searched for by applying improved Dijkstra algorithm.

Common Dijkstra algorithm is a method of obtaining a shortest route from a starting point to an end point in an area including a plurality of polygonal obstacles with the use of graph theory. In the case of route generation for the unmanned vehicle 20, however, consideration has to be given not only to distances but also to magnitudes of curvatures and rates of change of curvature for the purpose of cost reduction. According to this embodiment, therefore, a search method obtained by modifying the common Dijkstra algorithm is employed.

First, the common Dijkstra algorithm using a basic distance as a weight will be described with reference to FIG. 20.

Figure 20:
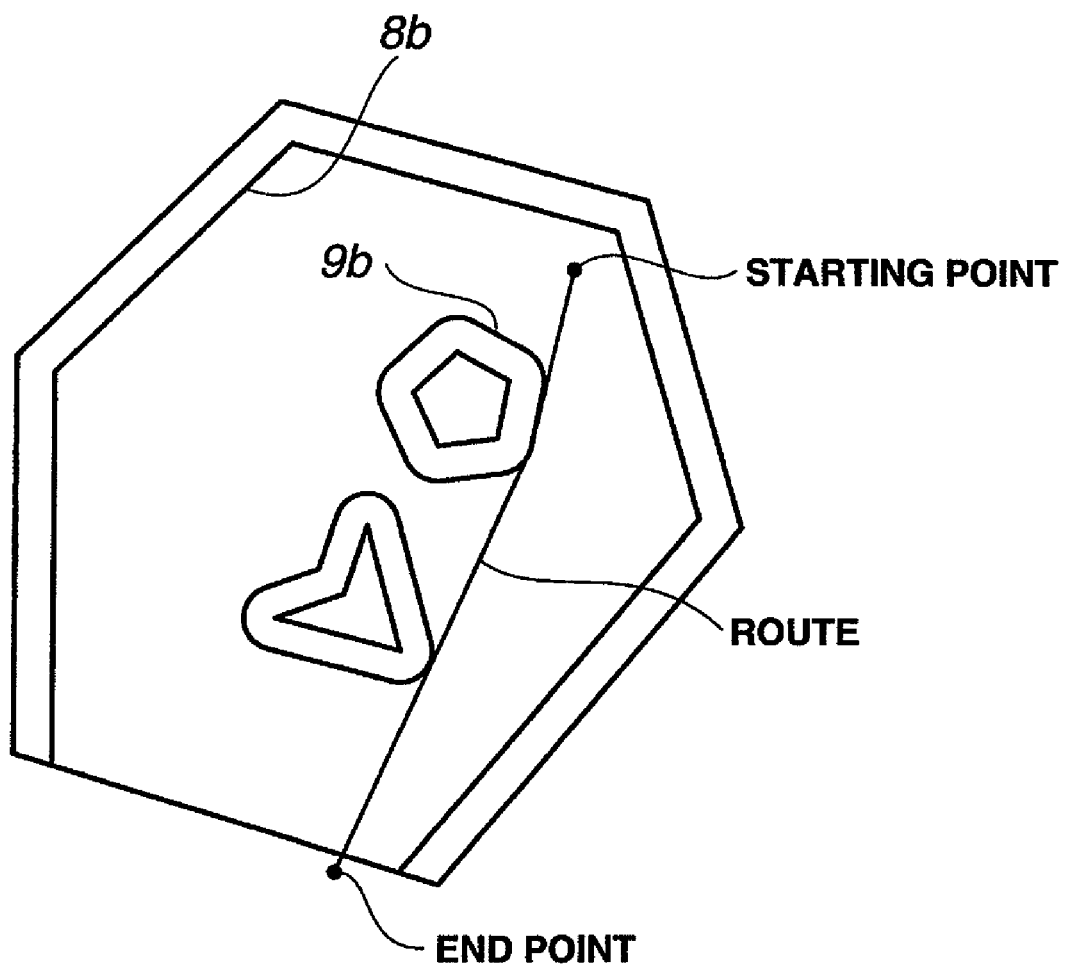
FIG. 20 is a diagram indicating a route having a minimum distance between the starting point and the end point.

FIG. 20 shows a route realizing a minimum distance between the starting point and the end point.

The route shown in FIG. 20 is obtained by the algorithm as schematically described below. A distance between vertices i and j for which an edge has been formed by the visibility graph is calculated and stored as Mij and Mji of a 2D array M of maximum n×n elements. If no edge is formed, sufficiently great values are stored. Searches are conducted such that lines are extended from the starting point to all the edges of the visibility graphs at constant velocity to find a minimum distance from the starting point for each of the vertices. Each of the vertices is thus checked to find a route with a minimum distance until reaching the end point.

In this manner, distance is used as a weight for each edge, so that a combination of edges in which the weights become minimum, in other words, a combination of edges in which the total distance is minimized is searched for.

Thus, a route of a minimum distance is obtained as shown in FIG. 20.

However, the common Dijkstra algorithm does not consider the directions of the entrance point 11, the exit point 14, the switchback point 12, and the halt point 13.

In contrast, this embodiment employs an improved Dijkstra algorithm obtained by improving the common Dijkstra algorithm. According to the improved Dijkstra algorithm, an optimum combination of candidate edges for the unmanned vehicle 20 is searched for by determining a weight for each edge by predicting a magnitude of curvature, a steering operation amount per unit distance and the like in addition to the distance. Specifically, a combination of route candidate edges, that is, a candidate for interpolation point is searched for so as to minimize the cost function values of the cost elements including the curvature of the travel route 10 and steering operation amount (rate of change of curvature) of the unmanned vehicle 20, in addition to travel route length. Naturally, the search is conducted in consideration of the starting point and the direction of the starting point of the route.

A cost function E is defined as the following formula.

[Ex. 4]

$$E \equiv w_1 \int |k| ds + w_2 \int \left|\frac{\partial \theta}{\partial s}\right| ds + w_3 \int ds \quad (3.2)$$

In the formula (3.2) above, κ denotes a curvature, θ denotes a steering operation amount, s denotes a distance from the starting point, and w1, w2 and w3 denote weighting constants. The first term of the formula above is for enlarging a turning radius (inverse number of the curvature κ), the second term is for reducing the steering operation amount per unit distance, and the third term is for shortening the travel distance. If the values of the terms are reduced to reduce the value of the cost function E, the turning radius is enlarged, the steering operation amount per unit distance is decreased, and the travel distance is shortened.

The relationship between the steering angle θ and the curvature κ is represented by the following equation when the wheelbase length is denoted by WBL.

[Ex. 5]

$$\tan(\theta) = kl \quad (3.3)$$

Accordingly, the right side first term is represented by the following formula.

[Ex. 6]

$$\text{Right side first team} = w_1 \int |k| ds = \quad (3.4)$$
$$w_1 \int \frac{|\tan(\theta)|}{l} ds = w_1' \int |\tan(\theta)| ds \approx w_1' \int |\theta| ds \approx w_1' \sum |\Delta \theta i|$$

In the formula above, w'1=w/WBL, and approximation is made on the assumption that the value of θ is small and curvature of each segment is fixed.

Figure 21:
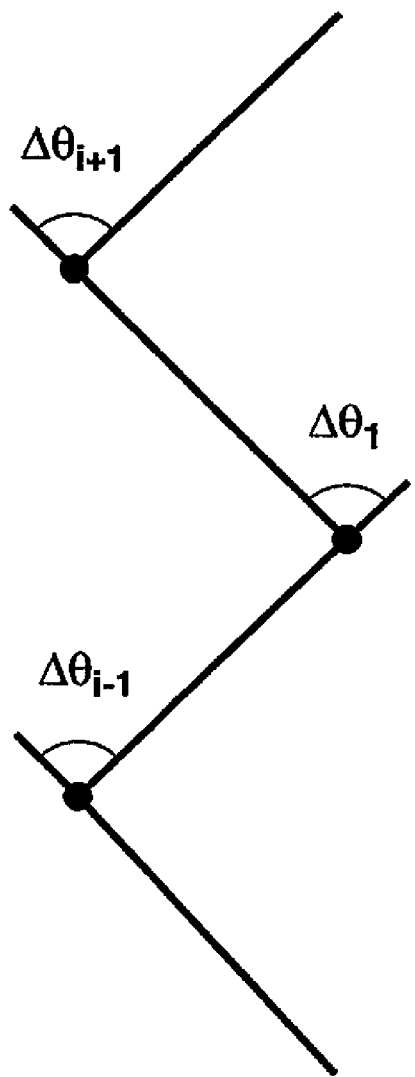
FIG. 21 is a diagram used for explaining cost functions.

Further, as shown in FIG. 21, the right side second term is approximated as a steering operation amount per unit distance by setting a variation angle between two straight lines at a certain vertex as a steering operation amount and dividing it by the distance of that segment. Accordingly, the formula (3.2) above is rewritten as follows.

[Ex. 7]

$$E \approx w_1' \sum |\Delta \theta i| + w_2' \sum \left|\frac{\Delta \theta i}{\Delta si}\right| + w_3 \sum \Delta si \quad (3.5)$$

Correction as described below must be made at the starting point and the end point which are given directions.

Figure 22:
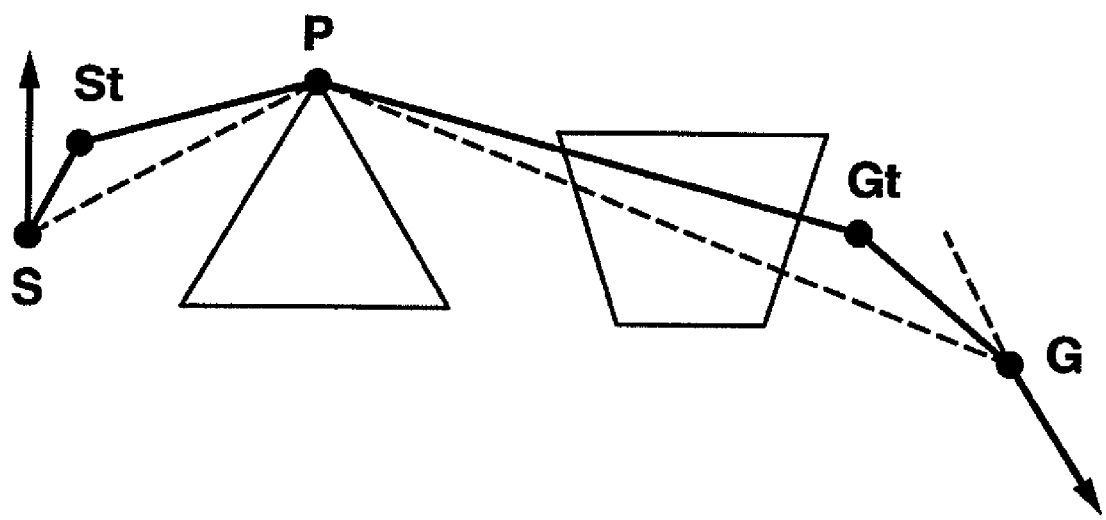
FIG. 22 is also a diagram used for explaining cost functions.
Figure 23:
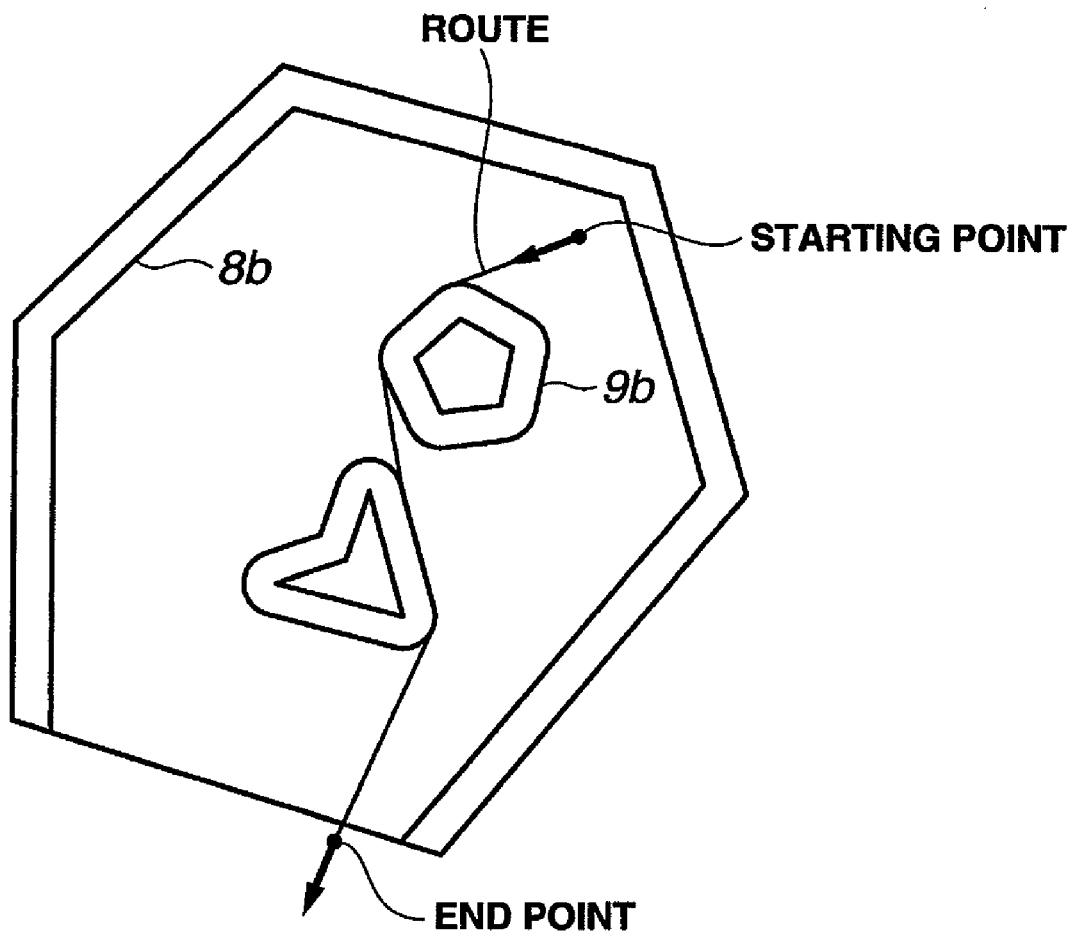
FIG. 23 is a diagram indicating a result obtained by applying the improved Dijkstra algorithm.

In order to obtain a cost at a point P in FIG. 22, a virtual point St is arranged on a straight line which divides into two an angle formed between a direction vector for the starting point and a vector from the starting point to the next point, so that the direction of the starting point is considered. A point Gt is likewise arranged to divide into two an angle between a vector from the point P to the end point and a direction vector for the end point. Thus, a route can be obtained in consideration of the directions of the starting point and end point. The points used for calculation are determined by extracting only feature points using, for example, Douglas-Peucker algorithm. This is because the increased number of points will increase the cost. The calculation algorithm is the same as that of the Dijkstra algorithm. FIG. 23 shows the results obtained by this method. It can be seen that whereas no consideration has been given to the directions of the starting point and end point in the results obtained by employing the common Dijkstra algorithm shown in FIG. 20, the directions of the starting point and end point are taken into consideration in the results obtained by employing the improved Dijkstra algorithm shown in FIG. 23.

These are the particulars of the processing using the improved Dijkstra algorithm (step 303).

[Interpolation with B-Spline Curve]

In the next step, interpolation is performed by using, for example, a 3D B-spline curve while setting, as interpolation points, the vertices connecting the edges obtained by employing the improved Dijkstra algorithm. However, the interpolation may be performed by using any other B-spline curve than the 3D B-spline curve.

Description will be made of a method of finding a B-spline interpolation curve when there are (n+1) interpolation points {Qk} where k=0, . . . , n, and directions are given at the starting point and the end point.

A control point and a knot vector are required to draw a B-spline curve. Therefore, at first, description will be made of how to find a knot vector.

When a sum of the arc lengths is denoted by d, the following equation is established.

[Ex. 8]

$$d = \sum_{k=1}^{n} |Q_k - Q_{k+1}| \qquad (3.6)$$

If conditions are set as represented by the formulae below:

[Ex. 9]

$$\bar{u}_0 = 0 \qquad (3.7)$$
$$\bar{u}_n = 1$$
$$\bar{u}_k = \bar{u}_{k-1} + \frac{|Q_k - Q_{k+1}|}{d}$$
$$k = 1, \ldots, n-1$$

components of the knot vector are obtained as represented by the following formulae if the order is p.

[Ex. 10]

$$u_0 = \ldots = u_p = 0 \; u_{n+p} = \ldots = u_{n+2p}$$

$$u_{i+p} = \bar{u}_j \, j=1, \ldots, n-1 \qquad (3.8)$$

Next, the control points are found for the case in which the order is three.

The control points are denoted by {Pi}. Since directions are given to the starting point and end point, the following formulae:

[Ex. 11]

$$P_0 = Q_0$$

$$P_1 = P_0 + \alpha D_0 \qquad (3.9)$$

$$P_{n+1} = P_{n+2} + \beta D_n$$

$$P_{n+2} = Q_n \qquad (3.10)$$

are established, and P0, P1, Pn+1, and Pn+2 can be obtained directly. In the equations above, Di denotes their respective unit vectors.

Interpolation points in a three-dimensional B-spline curve can be represented by the following equation:

[Ex. 12]

$$Q_k = C(\bar{u}_k) = N_{k,3}(\bar{u}_k)P_k + N_{k+1,3}(\bar{u}_k)P_{k+1} + N_{k+2,3}(\bar{u}_k)P_{k+2} \qquad (3.11)$$

where k=1, . . . , n−1.

When assignment is made as represented by the following formulae:

[Ex. 13]

$$a_k = N_{k,3}(\bar{u}_k) \; b_k = N_{k+1,3}(\bar{u}_k) \; c_k = N_{k+2,3}(\bar{u}_k) \qquad (3.12)$$

the control points {Pi} can be obtained by solving the following diagonal system:

[Ex. 14]

$$\begin{bmatrix} Q_1 -_{a1} P_1 \\ Q_2 \\ \vdots \\ Q_{n-2} \\ Q_{n-1} -_{en-1} P_{n+1} \end{bmatrix} = \begin{bmatrix} b_1 & c_1 & 0 & \ldots & 0 & 0 & 0 \\ a_2 & b_2 & c_2 & \ldots & 0 & 0 & 0 \\ \vdots & \vdots & \vdots & \ddots & \vdots & \vdots & \vdots \\ 0 & 0 & 0 & \ldots & a_{n-2} & b_{n-2} & c_{n-2} \\ 0 & 0 & 0 & \ldots & 0 & a_{n-1} & b_{n-1} \end{bmatrix} \begin{bmatrix} P_2 \\ P_3 \\ \vdots \\ P_{n-1} \\ P_n \end{bmatrix} \qquad (3.13)$$

Figure 24:
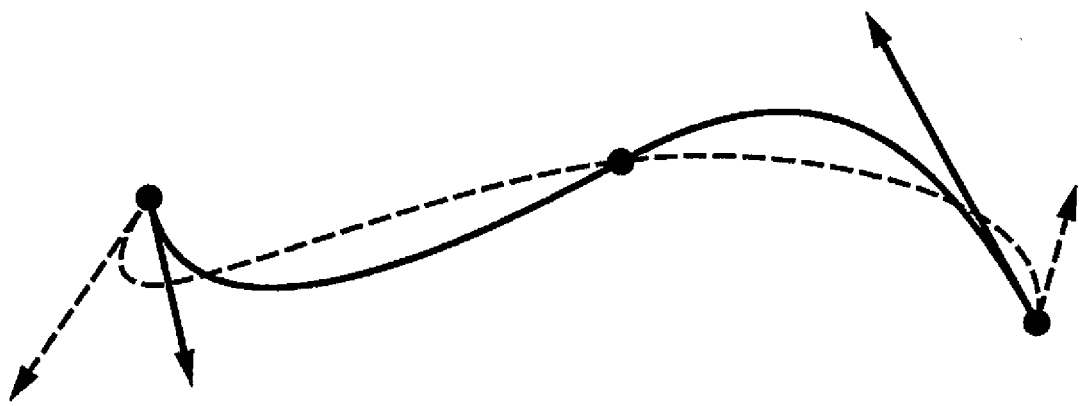
FIG. 24 is a diagram showing an example of an interpolated B-spline curve.

This system is a linear system having (n−1) unknowns. FIG. 24 shows an example of an interpolated B-spline curve.

These are the particulars of the interpolation processing using a B-spline curve (step 304).

Some of the interpolation point candidates obtained by the improved Dijkstra algorithm may be located on the Minkowski-summed obstacles 9 or the like. Therefore, a curve obtained based on such interpolation point candidates does not necessarily define an optimal route, for example because it does not satisfy the turning limit of the unmanned vehicle 20. Therefore, it is determined whether or not an interpolation point must be moved by determining whether or not the interpolation point candidates satisfy the vehicle constraint conditions including the minimum turning radius of the unmanned vehicle 20 (step 305).

[Optimization of the Interpolation Point]

If the interpolation point must be moved (YES in step 305), the interpolation point is moved to optimize the interpolation point. This is performed by setting an arbitrary lattice near the interpolation point obtained by the improved Dijkstra algorithm, finding a point, from among the lattice points, where the cost function value of the cost elements including curvature and steering operation amount becomes minimum, and determining this point as a new interpolation point.

Specifically, the interpolation point obtained by the procedures described so far is located on the Minkowski-summed obstacle. Thus, the curve drawn to pass the interpolation point does not satisfy, for example, the minimum turning radius unmanned vehicle 20, as shown in FIG. 25A as the route before correction, and thus the curve does not necessarily define a suitable route. Accordingly, the interpolation point is optimized by moving, as required, the interpolation point on the basis of the interpolation point having been obtained so far.

A cost function (object function energy) E for optimizing the interpolation point is defined by the following formula:

[Ex. 15]

$$E \equiv w_4 \int |k| ds + w_5 \int \left|\frac{\partial \theta}{\partial s}\right| ds \qquad (3.14)$$

and the function value is minimized. In the formula (3.14) above, w4 and w5 denote weighting constants. Approximation is made in the same manner as in the formula (3.5) above, whereby the following formula is obtained:

[Ex. 16]

$$E \approx w'_4 \sum \Delta\theta_i + w'_5 \sum \frac{\Delta\theta_i}{\Delta s_i} \qquad (3.15)$$

A lattice having half a width of the vehicle width Width is formed near the interpolation point, and a lattice point at which the value of the cost function E becomes minimum is selected as a new interpolation point, from among the lattice points.

FIG. 25B shows the new interpolation point and a corrected route drawn to pass this new interpolation point (step 306).

[Optimum Interpolation]

Even if the interpolation point is the same, the cost for the unmanned vehicle 20 differs depending on the shapes of curves passing the interpolation point. Therefore, a shape of a curve passing each interpolation point is found such that the cost function value of the cost elements including curvature and steering operation amount become minimum. Specifically, this is performed by optimizing the magnitudes of tangential line vectors α and β at the starting point and the end point of the curve. The tangential line vectors α and β at the starting point and the end point are normally unit vectors and no magnitude is given to them. The curvature or the like of the curve connecting between interpolation points varies according to the magnitudes of the direction vectors α and β. Therefore, the curvature of the curve connecting the interpolation points is optimized by adjusting the magnitudes of the direction vectors α and β so as to minimize the cost value.

This will be described more specifically.

Figure 26:
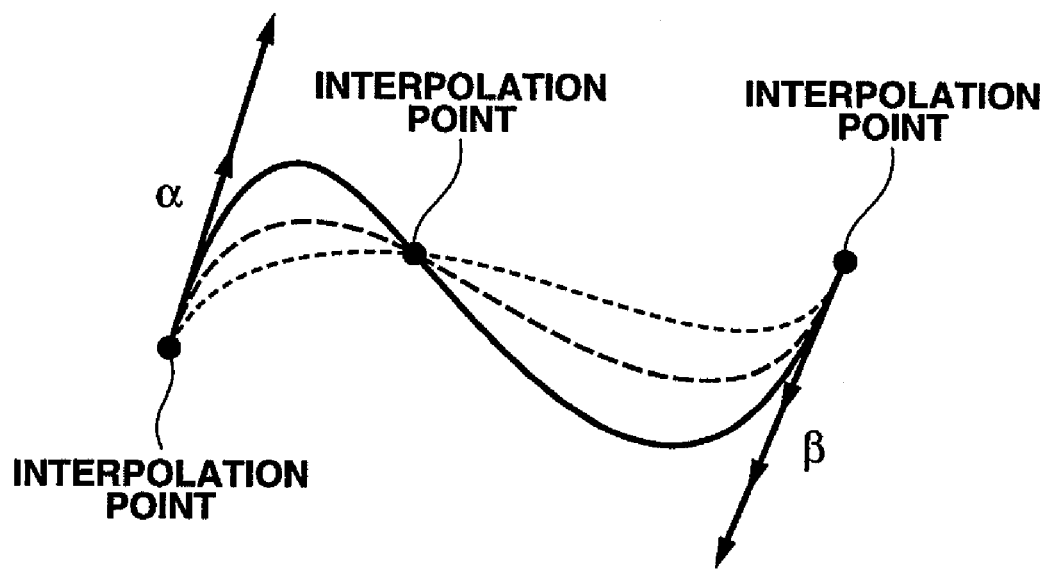
FIG. 26 is a diagram showing how the shape of a curve connecting between interpolation points varies.

FIG. 26 shows how the shape of a curve connecting interpolation points varies according to values of the coefficient α in the formula (3.9) above and the coefficient β in the formula (3.10) above.

The coefficients α and β are determined such that the cost function value (object function energy) represented by the following formula (3.16) becomes minimum:

[Ex. 17]

$$E \equiv \int k^2 ds + \int \left(\frac{\partial k}{\partial s}\right)^2 ds \qquad (3.16)$$

The right side first term of the formula (3.16) above is a term for reducing the absolute value of curvature. The right side second term is a term for reducing the steering operation amount per unit distance.

By solving the formula (3.13) above, the control points can be represented by the following formula:

[Ex. 18]

$$\begin{bmatrix} P_0 \\ P_1 \\ \vdots \\ P_{n+2} \end{bmatrix} \begin{bmatrix} A_0 & B_0 & C_0 \\ A_1 & B_1 & C_1 \\ \vdots & \vdots & \vdots \\ A_{n+2} & B_{n+2} & C_{n+2} \end{bmatrix} = \begin{bmatrix} 1 \\ \alpha \\ \beta \end{bmatrix} \qquad (3.17)$$

Thus, on the basis of the following definitional equation of a B-spline curve:

[Ex. 19]

$$C(t) = \sum N_{i,p}(t) P_i \qquad (3.18)$$

the following formula:

[Ex. 20]

$$C(t) = A + B\alpha + C\beta \qquad (3.19)$$

is obtained. In this formula (3.19), the following formulae are (3.20) established:

[Ex. 21]

$$A = \Sigma(N_i A_i)$$

$$B = \Sigma(N_i B_i \alpha)$$

$$C = \Sigma(N_i C_i \beta) \qquad (3.20)$$

Likewise, the following formulae (3.21) are established:

[Ex. 22]

$$C'(t) = A' + B'\alpha + C'\beta$$

$$A' = \Sigma(N'_i A_i)$$

$$B' = \Sigma(N'_i B_i \alpha)$$

$$C' = \Sigma(N'_i C_i \beta)$$

$$C''(t) = A'' + B''\alpha + C''\beta$$

$$A'' = \Sigma(N''_i A_i)$$

$$B'' = \Sigma(N''_i B_i \alpha)$$

$$C'' = \Sigma(N''_i C_i \beta) \qquad (3.21)$$

The cost function E can be obtained by applying these formulae to the formula (3.16) above. In order to minimize the value of this cost function E, the Steepest Descent algorithm, for example, is used to perform optimization.

Figure 27:
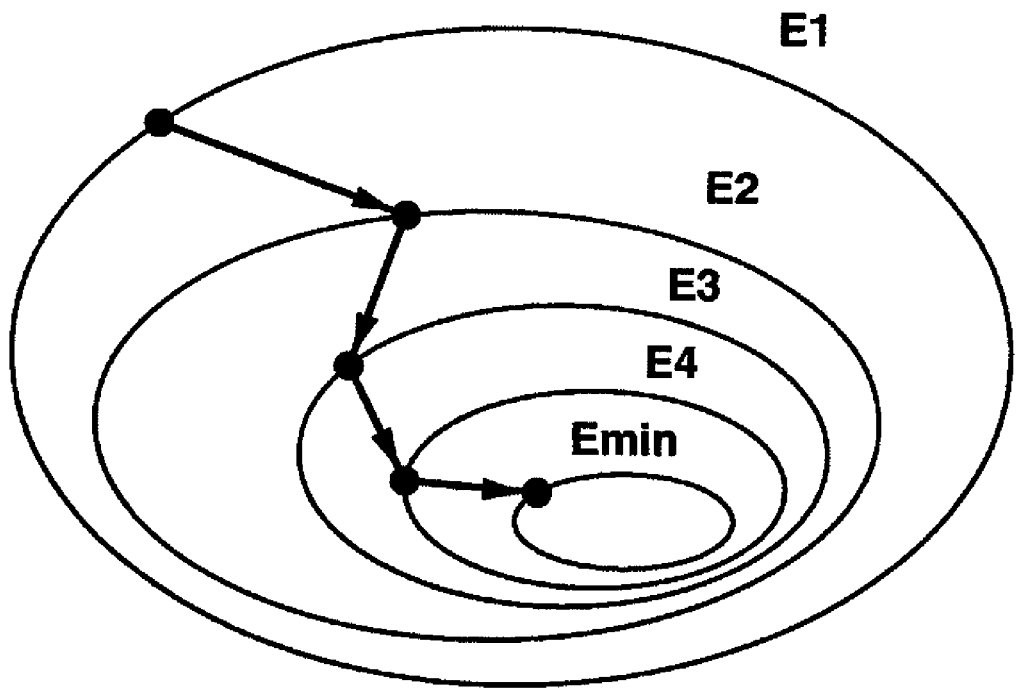
FIG. 27 is a diagram used for explaining an optimum interpolation technique.

The Steepest Descent algorithm is a technique used for an optimization problem. According to this technique, as shown in FIG. 27, update is repeated from tilt of the potential surface (first-order differential) to the direction where the system energy becomes lower to thereby sequentially search for function values E1, E2, E3, and E4, which become smaller and smaller, and to finally search for a minimum value Emin. The calculation is performed in the steps as follows.

1. At first, an initial value

[Ex. 23]

$$x^{(0)} = (\alpha_0, \beta_0)^T$$

is input.

2. When the state x is x(k), the value of the state x is updated as represented by the following formula (3.22):

[Ex. 24]

$$x^{(k+1)} = x^{(k)} - \lambda \left(\frac{\partial E(x^{(k)})}{\partial \alpha}, \frac{\partial E(x^{(k)})}{\partial \beta}\right)^T \qquad (3.22)$$

In the formula (3.22) above, λ is a parameter for determining a rate of a value to be updated by one update, and λ normally assumes a small positive value.

3. The update of the state x is repeated until the following formula is obtained:

$$E(x^{(k)})-E(x^{(k+1)})<\omega) \quad [\text{Ex. 25}]$$

where ω is a threshold value, or the following formula is obtained.

$$E(x^{(k+1)})>E(x^{(k)}) \quad [\text{Ex. 26}]$$

The updating rate λ of the state x will be described here.

The updating rate λ is a positive value, and the following relationship must be satisfied.

$$E(x^k)>E(x^{k+1}) \quad [\text{Ex. 27}]$$

Figure 28:
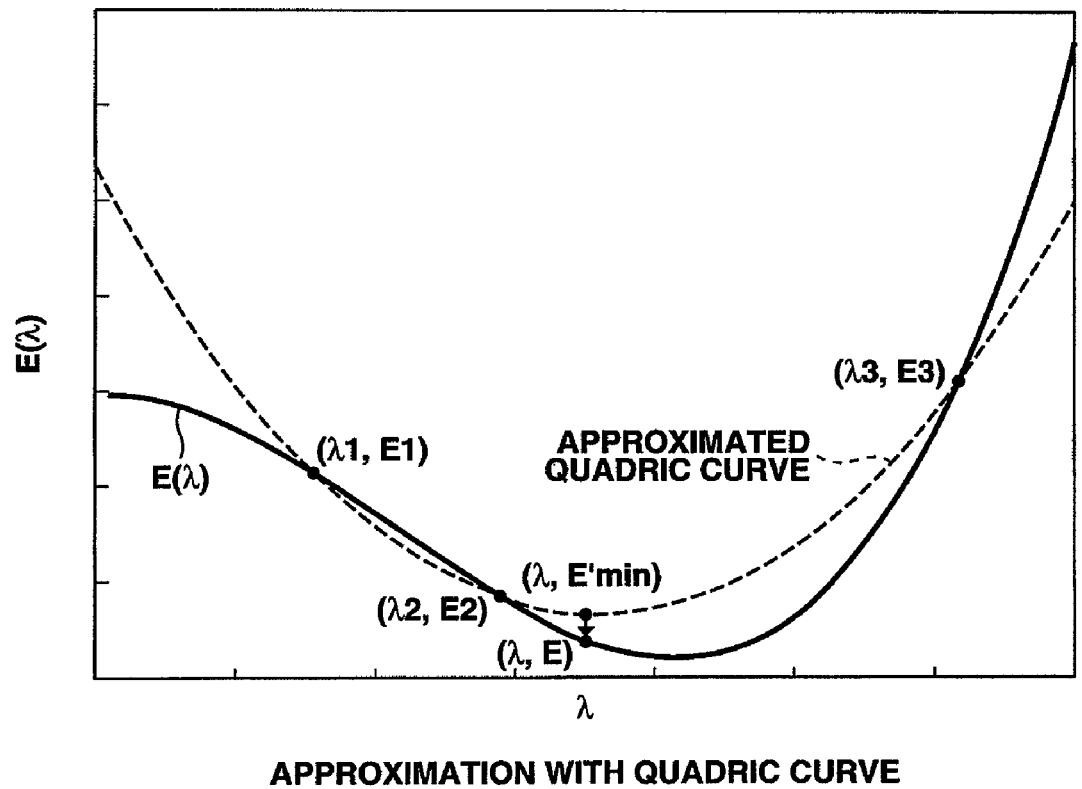
FIG. 28 is a diagram used for explaining a method of efficiently performing calculation of optimum interpolation.

It is desirable that λ assumes an extremely small value in order to ensure highly accurate optimization, but it will increase the number of updates and the time required for calculation. Therefore, as shown in FIG. 28, the cost function (objective function) E(λ) using λ as the parameter is approximated by suitably giving it three points so that approximation is enabled on a downward convex quadratic curve. A value of λ assuming a minimum value of the approximated quadratic function is determined as the updating rate of the state x. This technique enables efficient calculation (step 307).

[Application of a Maximum Curvature Reduction Technique]

A cubic B-spline curve, having curvature continuity, is a suitable curve for a route. However, if a route has a radius smaller than the minimum turning radius of the unmanned vehicle 20, the unmanned vehicle 20 is physically inhibited from traveling along the route. Therefore, the minimum radius of the route is increased. In other words, the route generation is made easier by applying a method of reducing the maximum curvature.

On a B-spline curve, control points, which have an effect at the time of obtaining points on the curve, can be changed by changing the interval of knot vectors. Therefore, by enlarging the knot interval in a place where the curvature is large, the area where the control point in the vicinity of the enlarged knot interval exercises effects is increased. This makes the shape of the curve a shallower slope than the original curve. A method of changing the knot vectors will be described below.

A B-spline curve is formed by sequence of Bezier curves connected at knot intervals. Therefore, the following equation (3.23) is solved for each knot.

[Ex. 28]

$$\int k\,ds = \Delta\theta \quad (3.23)$$

In this calculation, a maximum curvature value $C_{max}$ is assigned to the curvature κ, and a knot interval, $\Delta u = u_{i+1} - u_i$ is used as ds. Maximum curvatures of the respective curves are denoted by:

$$C_{max}^{1}, C_{max}^{2}, \ldots, C_{max}^{i}, \ldots, \quad [\text{Ex. 29}]$$

and knot intervals are denoted by $\Delta u_1, \Delta u_2, \Delta u_i, \ldots$. In order to change the knot intervals, a new interval ratio is set as the following formula:

[Ex. 30]

$$\Delta u'_1 : \Delta u'_2 : \ldots : \Delta u'_i : \ldots = C_{max}^{1}\Delta u_1 : C_{max}^{2}\Delta u_2 : \ldots : C_{max}^{i}\Delta u_i : \ldots \quad (3.24)$$

wherein $\Delta u'_i$ denotes a new knot interval ratio. This operation is repeated until the maximum curvature is satisfied, or for a certain number of times (step 308).

[Check for Interference with the Unmanned Vehicle 20]

It is then checked whether or not obstacles 8 or the like interfere with the unmanned vehicle 20 (step 309).

If it is determined that there is something interfering with the unmanned vehicle 20 (YES in step 309), the processing returns to step 306 where the interpolation point is moved again.

If it is determined that there is nothing interfering with the unmanned vehicle 20 (NO in step 309), the processing is terminated (step 310).

These are the particulars of the basic route generating method.

When the unmanned vehicle 20 performs soil discharging (or loading) work at the halt point 13, the unmanned vehicle 20 is required to proceed to the halt point 13 in its reverse traveling state. In this case, a single switchback point 12 must be provided in the route generation range 8 so that the vehicle body of the unmanned vehicle 20 turns its traveling direction. When the minimum turning radius of the unmanned vehicle 20 is satisfied by the curve obtained by the basic route generating method described above, two switchback points 12 must be provided to allow the unmanned vehicle 20 to turn its traveling direction.

Each switchback point contains three unknowns, position (x, y) and orientation (θ). A resulting travel route 10 will differ depending on the position (x, y) of the switchback point 12 and the orientation (θ) of the unmanned vehicle 20 at the switchback point 12. Load applied to the unmanned vehicle 20 will also differ significantly depending on these values.

Therefore, cost functions are defined also for determining the switchback point 12, and calculation is performed to minimize the cost function value to thereby optimize the travel route 10. Cost elements, functions of which are used for determining the switchback point 12, comprise curvature, steering operation amount, route length, and stationary steering operation amount, as described later.

When performing processing to optimize the switchback point 12, there are countless points which can be candidates of the switchback point 12 in the route generation range 8. There are also many local optimal solutions. Therefore, it is undesirable to use the local search algorithm. Therefore, optimization of the switchback point 12 is performed by using the simulated annealing algorithm as a global search algorithm.

[Determination of Necessity of Switchback]

It is determined that switchback is necessary based on the criteria as listed below.

a) The moving direction when starting from the starting point is reverse and the moving direction when reaching the end point is forward.

b) The moving direction when starting from the starting point is forward and the moving direction when reaching the end point is reverse.

c) The generated route does not satisfy the vehicle constraint conditions, for example, does not satisfy the minimum turning radius.

d) The generated route does not satisfy the geometrical constraint conditions. For example, the route interferes with the obstacle 9. However, if there is no route on the visibility graphs, this problem is not solved by increasing the number of switchback points, and hence it is determined that the route generation has been failed.

e) The cost function value is reduced by insertion of a switchback point. Specifically, comparison is made between when a switchback point is inserted for optimization and when not inserted, and it is determined that switchback is necessary if the cost function value is reduced by inserting the switchback point.

Figure 29A:
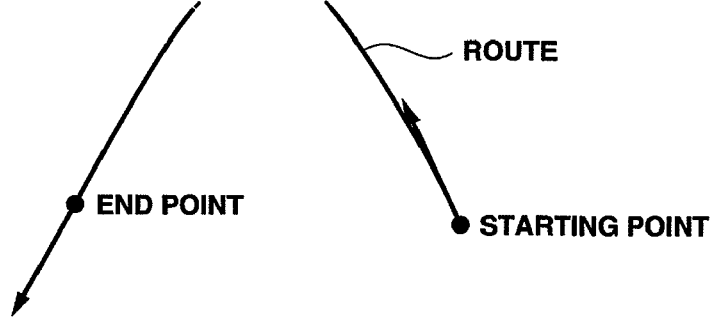
FIGS. 29A and 29B are diagrams for explaining a case in which switchback points are inserted when a minimum turning radius for an unmanned vehicle is not satisfied.
Figure 29B:
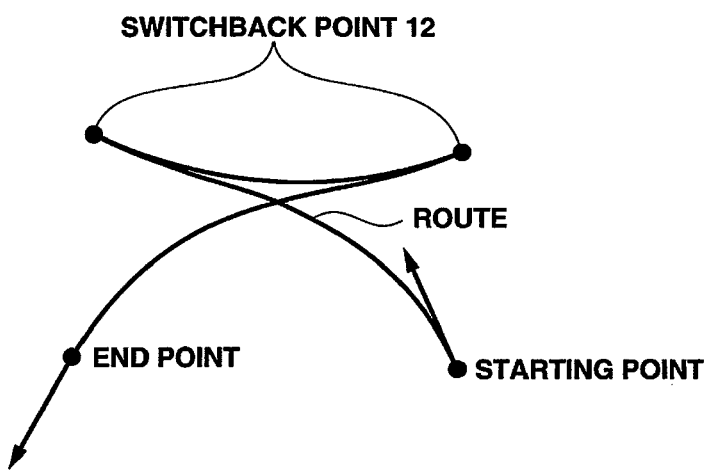

FIGS. 29A and 29B show an example of a case in which a switchback point is inserted when the minimum turning radius of the unmanned vehicle 20 is not satisfied.

It is assumed that, as shown in FIG. 29A, a route has been generated without inserting any switchback point from the starting point to the end point. However, this route does not satisfy the minimum turning radius of the unmanned vehicle 20. Therefore, as shown in FIG. 29B, a route is generated with two switchback points 12 being provided on the route, so that the unmanned vehicle 20 can travel with a turning radius which is greater than the minimum turning radius.

Description will be made on the cost function used for optimizing the switchback points 12.

The cost function E for the route including the switchback points 12 is formed by the cost elements as described below.

$$\text{Cost function } E = \quad (3.25)$$
$$A \times \text{turning radius cost} + B \times \text{steering operation amount cost} +$$
$$C \times \text{steering smoothness cost} + D \times \text{route length cost} +$$
$$Ee \times \text{stationary steering at switchback point}$$

In the formula (3.25) above, A, B, C, D, and Ee denote weighting constants for specifying which cost elements the emphasis should be placed on. The cost elements, namely, the turning radius cost, the steering operation amount cost, the steering smoothness cost, the route length cost, and the stationary steering cost at the switchback point are defined as described below.

[Turning Radius Cost]

Turning radius cost is obtained by wholly integrating, along the route, the momentary cost obtained based on the curvature. For example, it is assumed that the vehicle cannot reach its maximum speed $V_{max}(s)$ at a position which has been s-moved along the route when the curvature $\kappa(s)$ at that position is greater than the threshold value $\kappa_0(s)$, which is represented by the following formula:

$$k_0(s) = \frac{\text{Maximum allowable centripetal acceleration}}{V_{max}(s)^2} \quad [\text{Ex. 31}]$$

Therefore, the momentary cost $E_\rho(s)$ which is obtained based on the curvature using $\kappa_0(s)$ is defined as follows.

$$E_\rho(s) = \max(0, |k(s)| - k_0(s)) \quad [\text{Ex. 32}]$$

In this case, the turning radius cost is represented as follows.

$$\text{Turning radius cost} = \int E_\rho(s) ds \quad [\text{Ex. 33}]$$

On the basis of the relationship between curvature $\kappa$ and steering angle $\theta$, represented by the equation:

$$\tan(\theta) = \text{wheelbase length} \times \kappa$$

the steering angle $\theta(s)$ corresponding to the curvature $\kappa(s)$, and the steering angle $\theta_0(s)$ corresponding to the threshold value $\kappa_0(s)$ are obtained, and the momentary turning radius cost $E_\theta(s)$ and the turning radius cost may be obtained by the following formulae:

$$\text{Momentary turning radius cost: } E_\theta(s) = \max(0, \theta(s) - \theta_0(s))$$

$$\text{Turning radius cost} = \int \theta E_\theta(s) ds \quad [\text{Ex. 34}]$$

[Steering Operation Amount Cost]

Steering operation amount cost is obtained by line integrating, along the route, the momentary cost obtained from the steering operation amount. For example, it is assumed that the vehicle cannot reach its maximum speed $V_{max}(s)$ at a position which has been s-moved along the route, if the steering operation amount $d\theta(s)$ per unit distance at that position is greater than $d\theta_0(s)$ which is represented as the following formula:

$$d\theta_0(s) = \frac{\text{Maximum steering operation amount per unit time}}{V_{max}(s)} \quad [\text{Ex. 35}]$$

Therefore, the momentary cost $E_{d\theta}(s)$ obtained based on the steering operation amount is defined as follows, using $d0(\theta)$.

$$E_{d\theta}(s) = \max(\eta |d\theta(s)|, |d\theta(s)| - d\theta_0(s)) \quad [\text{Ex. 36}]$$

The steering operation amount cost is represented as the following formula.

$$\text{Steering operation amount cost} = \int E_{d\theta}(s) ds \quad [\text{Ex. 37}]$$

The term $\eta |d\theta(s)|$ is a term for improving the effect of preventing wobble at low speed, and $\eta$ denotes a weighting constant.

If the equation of $d\theta_0(s)$ is solved using the curvature $\kappa(s)$, the variation $d\kappa_0(s)$ of the corresponding curvature is represented by the following formula.

$$dk_0(s) = \frac{1 + (\text{Wheelbase length} \times k(s))^2}{\text{Wheelbase length}} d\theta_0(s) \quad [\text{Ex. 38}]$$

Thus, the momentary cost $Ed\kappa(s)$ and the steering operation amount cost may be obtained as follows.

$$Edk(s) = \max(\eta |dk(s)|, |dk(s)| - dk0(s)) \quad [\text{Ex. 39}]$$

$$\text{Steering operation amount cost} = \int Edk(s) ds$$

Thus, the steering operation amount cost is obtained as a curvilinear integral along the route of the curvature variation.

[Steering Smoothness Cost]

Steering smoothness cost is obtained by line integrating, along the route, the momentary cost obtained from the variation of steering operation amount. For example, the momentary cost and the steering smoothness cost can be represented as the following formulae.

$$E_{d^2\theta}(s) = |d^2\theta(s)|$$

$$\text{Steering smoothness cost} = \int E_{d^2\theta}(s) ds \quad [\text{Ex. 40}]$$

The steering smoothness cost may be obtained so as to be a curvilinear integrate along the route of a quadratic differential value of the curvature. In this case, the momentary cost and the steering smoothness cost are represented by the following formulae.

$$E_{d^2k}(s) = |d^2k(s)|$$

$$\text{Steering smoothness cost} = \int E_{d^2k}(s) ds \quad [\text{Ex. 41}]$$

[Route Length Cost]

Route length cost can be obtained by an equation:

$$\text{Route length cost} = \text{route length}.$$

However, in a case in which mobility performance of the vehicle significantly differs between forward travel and reverse travel, for example, the route length cost may be obtained by weighting according to characteristics of the route as follows:

Route length cost=forward travel cost×forward travel route length+reverse travel cost×reverse travel route length.

[Stationary Steering Cost at Switchback Point]

Stationary steering will occur if the route is generated such that steering is performed at a switchback point and near the switchback point pole. Therefore, the stationary steering cost at the switchback point can be calculated by line integrating the steering operation amount $d\theta(s)$ per unit distance exclusively for a short section before and after the switchback point.

Specifically, when it is assumed that the n-th switchback point is located at a position which has been $s_n$-moved along the route, the stationary steering cost at the switchback point can be defined as follows, using a short distance constant L.

Stationary steering cost at switchback point = [Ex. 42a]

$$\sum_n \int_{S_n-L}^{S_n+L} |d\theta(s)| ds$$

Alternatively, the stationary steering cost at the switchback point may be obtained by the following equation so as to be curvilinear integral of the rate of change of curvature.

Stationary steering cost at switchback point = [Ex. 42b]

$$\sum_n \int_{S_n-L}^{S_n+L} |dk(s)| ds$$

These are the particulars of the cost function E used for determining the switchback point 12.

Figure 9:
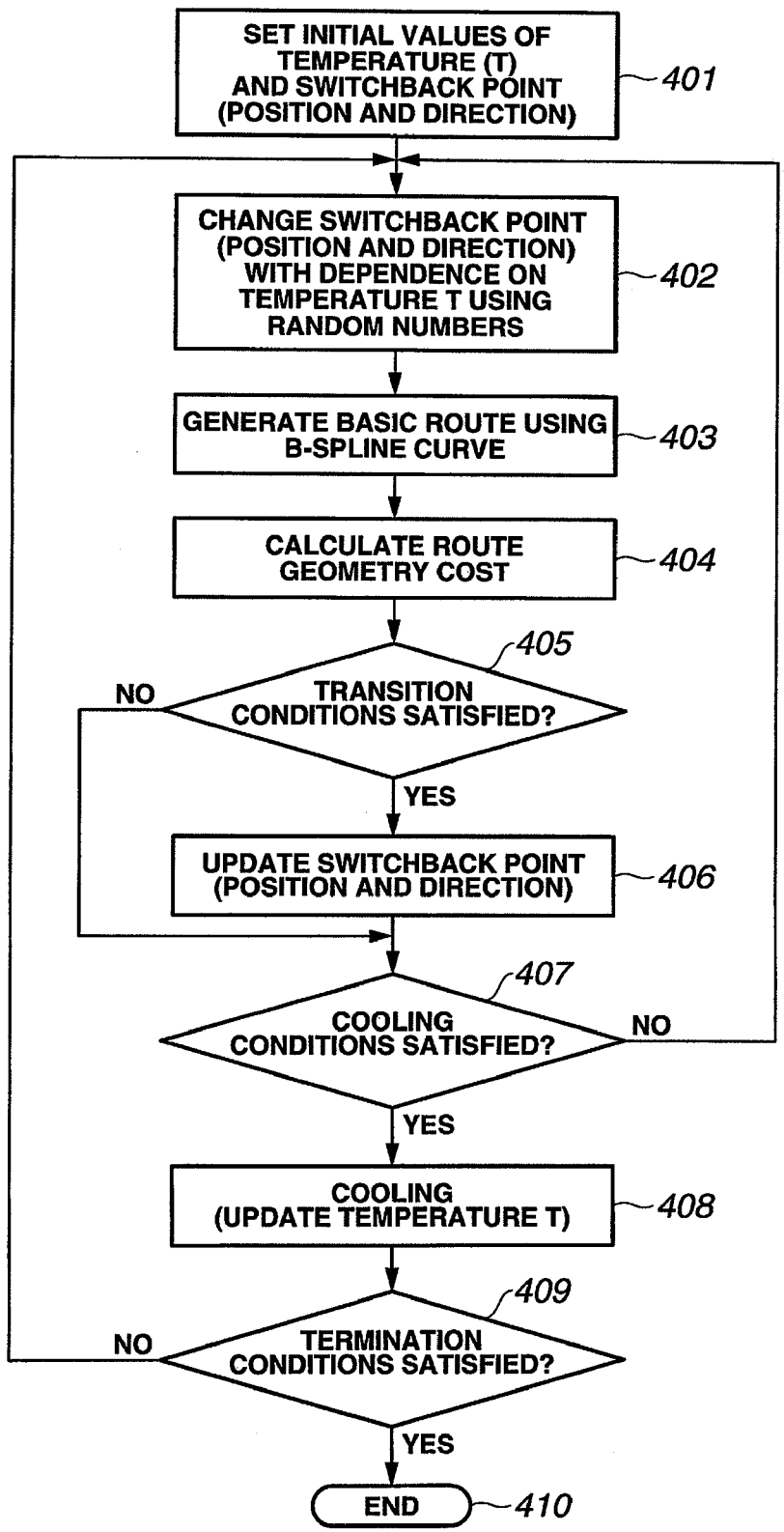
FIG. 9 is a flowchart showing an algorithm for optimizing a switchback point using the simulated annealing (SA) method.

FIG. 9 shows an algorithm for optimizing the switchback point 12 using the simulated annealing (hereinafter, abbreviated as SA) algorithm.

The simulated annealing (SA) algorithm is an optimization technique similar to the Monte Carlo method. It is named after the term "annealing" used in metallurgical engineering. Annealing is a process in which a metal material is heated and then cooled slowly so that crystals are allowed to grow and to decrease the defects thereof. The heat treatment causes the atoms to be separated from the state in which the initial internal energy is locally extremely small and to transit to a higher energy state. The slow cooling of the metal material increases the probability that the atoms assume a state in which the internal energy becomes even smaller than the initial state. The SA algorithm simulates this annealing method in terms of calculation. It is required in the local search algorithm to consider how to escape from a local optimal solution. In contrast, the SA algorithm is free from such concern. In the SA algorithm, the points "s" in the search space correspond to the "states" described above, and the objective function E(s) to be minimized corresponds to the internal energy. The following description will be made on the calculation processes of the SA algorithm having three parameters (x, y, θ) for each switchback point.

Firstly, initial values of annealing temperature T, and position and direction of the switchback point 12 are set.

The initial setting for the state s, that is, the setting of the initial values of the switchback point 12 differs between when a single switchback point 12 is provided and when two switchback points 12 are provided.

[When Single Switchback Point is Set]

Figure 30:
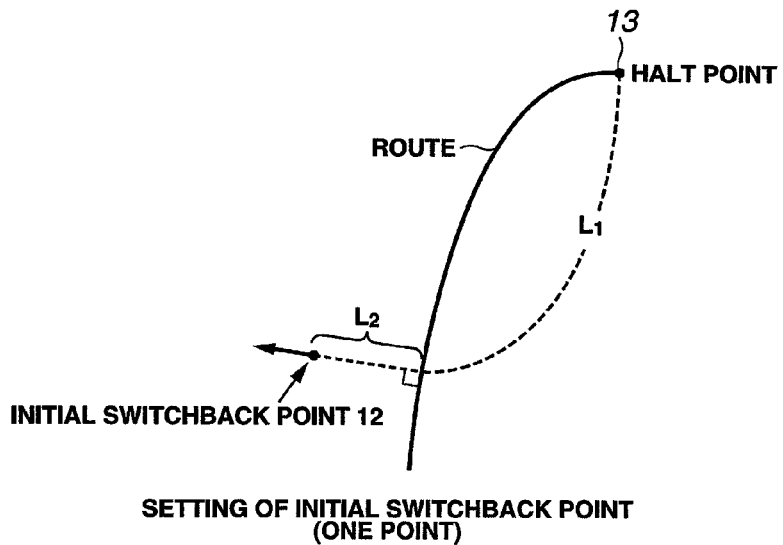
FIG. 30 is diagram for explaining an initial setting method when a single switchback point is provided.

As shown in FIG. 30, an initial switchback point 12 is set at a point spaced by a distance corresponding to a certain distance L2 from a point spaced by a distance L1 from the halt point 13 on a curved route (if the curve length is less than L1, a middle point of the curve in terms of the parameter) to a direction of the normal on the convex side of the curve. The direction of the normal is designated as orientation θ at the switchback point 12.

[When Two Switchback Points are Set]

Figures 31A, 31B:
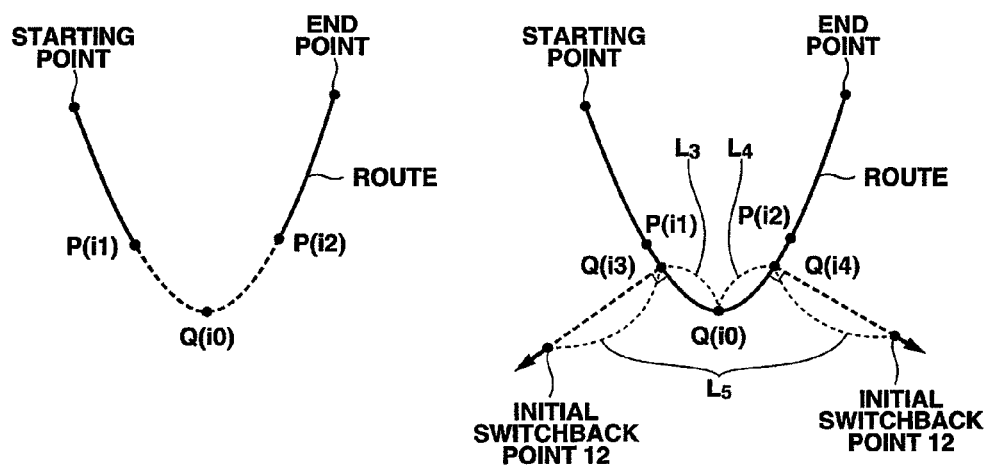
FIGS. 31A and 31B are diagrams for explaining an initial setting method when two switchback points are provided.

As shown in FIG. 31A, the point at which a section of the curved route where the curvature radius does not satisfy the minimum turning radius of the unmanned vehicle 20 (indicated by the dashed line) starts is denoted by P(i1), while the point at which the section where the curvature radius does not satisfy the minimum turning radius of the unmanned vehicle 2 ends, passing a point where the curvature becomes its maximum, is denoted by P(i2). The middle point between the points P(i1) and P(i2) in terms of the parameters i1 and i2 is denoted by Q(i0).

Subsequently, as shown in FIG. 31B, a point on the curve spaced from the point Q(i0) by a certain distance $L_3$ in descending order of the parameter with reference to the point P(i1) is denoted by Q(i3). Likewise, a point spaced from the point Q(i0) by a certain distance $L_4$ in the ascending order of the parameter is denoted by Q(i4). The positions of points moved from the points Q(i3) and Q(i4) thus obtained by a certain distance L5 in directions of normals on the convex side of the curve are set as initial values (x1, y1) and (x2, y2) of the switchback points 12, respectively. The directions of the normals are designated as orientations (θ1) and (θ2) at the switchback points 12 (step 401).

Annealing steps are then performed from the initial temperature T (steps 402 to 407).

Specifically, in each of the steps, the SA heuristic algorithm checks several neighborhood states $s_{new}$ in the vicinity of the current state $s_{old}$ to stochastically determine whether the system should remains in the current state s or should transit to any of the neighborhood states. In this determination, consideration is given so that the system ultimately moves toward a lower energy state. The transition probability is as follows.

[Ex. 43]

$$P = \begin{cases} 1 & \text{when } \Delta E \le 0 \\ e^{\frac{\Delta E}{kT}} & \text{otherwise} \end{cases} \quad (3.41)$$

In the formula (3.41) above,

[Ex. 44]

$$\Delta E = E_{new} - E_{old} \quad (3.42)$$

and k denotes a Boltzmann constant, and T denotes temperature.

The transition condition is represented by:

$$P > R \quad (3.43)$$

where R is a random real number satisfying 0<R<1.

As indicated by the formula (3.41) above, transition always occurs when $E_{new}$ is smaller than $E_{old}$. However, when $E_{new}$ is greater than $E_{old}$, transition is possible depending on probability. This is for preventing the algorithm sticking to a local optimal solution.

The state s (x, y, θ) is varied in dependence on temperature T. The variation of the state s (x, y, θ) can be specifically represented as follows.

[Ex. 45]

$$x_{new}=x_{old}+(T \times rand_x)$$

$$y_{new}=y_{old}+(T \times rand_y)$$

$$\theta_{new}=\theta_{old}+(T \times rand_\theta) \quad (3.44)$$

In the formulae (3.44) above, $$rand_x, rand_y, \quad [\text{Ex. 46}]$$

indicate random numbers, whose maximum values correspond to half values of edge lengths in the respective directions of a bounding box (a square area representing boundary lines) of the route generation range 8.

$$rand_\theta \quad [\text{Ex. 47}]$$

denotes a random number in the range of −π to π.

This annealing step is repeated, while slowly raising the temperature T, until the rate of change of the system energy becomes sufficiently high, for example, until it becomes 10000%, or until the scheduled calculation time is exhausted, for example, until the step is repeated 200 times.

The sequence of processing steps will be described.

In the first step, a random number is obtained by using random digits, the state s (x, y, θ) is varied in dependence on the temperature T, so that the switchback point 12 (position (x, y), and orientation θ) is changed as represented by the formula (3.44) above (step 402).

A basic route is then generated so as to pass the changed switchback point 12. The basic route is generated by using a B-spline curve. The processing of steps 302 to 310 in FIG. 8 described above are performed to generate the basic route passing the switchback point 12 (step 403).

Next, the route geometry cost E of the generated basic route is calculated. Specifically, the cost function E of the formula (3.25) described above is calculated for the generated basic route (step 404).

It is then determined whether or not the transition condition is satisfied or not. As described above, the transition always occurs when the current function value $E_{new}$ of the cost function E is smaller than the old one $E_{old}$, whereas the transition is possible depending on probability when the current function value $E_{new}$ of the cost function E is greater than the old one $E_{old}$ (step 405).

If the transition condition is satisfied, the switchback point 12 (position (x, y), and orientation θ) is updated (step 406).

If the transition condition is not satisfied, the processing proceeds to step 407, where it is determined whether or not the cooling condition is satisfied. As described above, it is determined that the cooling condition is satisfied at the time when the count value exceeds a certain number, or the variation in the cost function E becomes small enough, and the processing proceeds to the next step 408, the cooling step.

Figure 32:
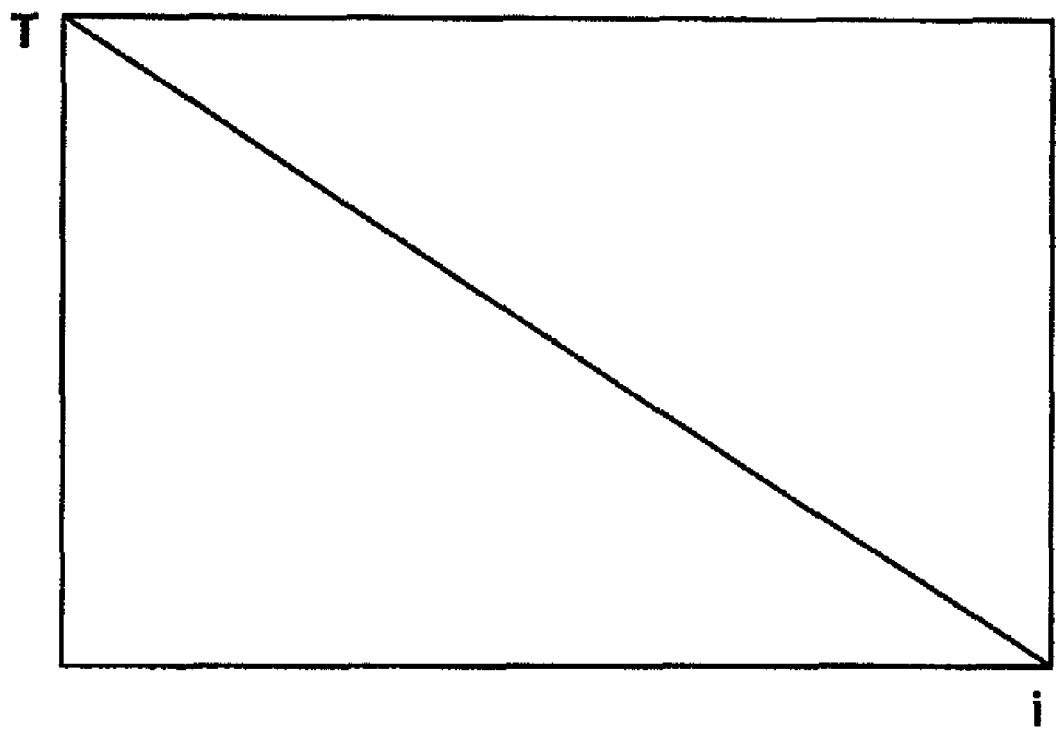
FIG. 32 is a diagram showing an example of cooling schedule.

In the cooling step, the temperature is slowly lowered from the temperature T at the time of the termination of annealing. This causes the system at first to seek an optimal solution in a broad range of the search space, ignoring small changes of energy function E, then to gradually narrow down the search area toward a region with a lower energy, and ultimately to go down to a region with the lowest energy. The cooling may be scheduled in various ways, provided that it ends at the temperature T of 0° C. According to this embodiment of the invention, as shown in FIG. 32, the cooling is performed in accordance with the cooling schedule represented by the following formula:

$$T_i = T_0 - i\frac{T_0 - T_N}{N}(0 \le i \le N) \quad [\text{Ex. 48}]$$

i:cycle where i denotes a cycle (0≦i≦N).

The cooling is performed according to specific sequence of processing steps described below.

The temperature T is updated in accordance with the cooling schedule shown in FIG. 32 (step 408).

It is then determined whether or not the cooling termination condition is satisfied. Specifically, it is determined that the cooling has come to an end when the cooling schedule shown in FIG. 32 is terminated, or the function value of the cost function E becomes smaller than the threshold value (step 409). If the cooling termination condition is satisfied, this switchback point optimizing algorithm is terminated (step 410).

If the cooling termination condition is not satisfied, the processing returns to step 402 and the same processing is repeated.

Examples of the embodiment of this invention will be described.

Methods employed in the examples of this embodiment are roughly classified into "a method of fixing a switchback point once generated" and "a method of reoptimizing a switchback point due to addition of a switchback point".

FIG. 10 shows a flow of "a method of fixing a switchback point once generated".

[Method of Fixing a Switchback Point Once Generated]

In the first step, as shown in FIG. 10, and in the same manner as in step 301 of FIG. 8, a disc having a diameter corresponding to the vehicle width is moved along the boundary of the route generation range 8 and the boundary of the obstacle 9, and a Minkowski sum is calculated (step 501).

It is then determined whether or not insertion of a switchback point 12 is necessary. This determination is made according to the following criteria from among the determination criteria described above (those used for the determination of necessity of switchback):

a) the moving direction when starting from the starting point is reverse and the moving direction when reaching the end point is forward; and b) the moving direction when starting from the starting point is forward and the moving direction when reaching the end point is reverse (step 502).

Accordingly, it is determined that insertion of a switchback point 12 is necessary if the direction at the entrance point 11 is reverse and the direction at the exit point 14 is forward, or if the direction at the entrance point 11 is forward and the direction at the exit point 14 is reverse (YES in step 502), and processing is performed to insert on switchback point 12. This processing in step 503 is performed specifically according to a "switchback position inserting flow" shown in FIG. 11.

Figure 11:
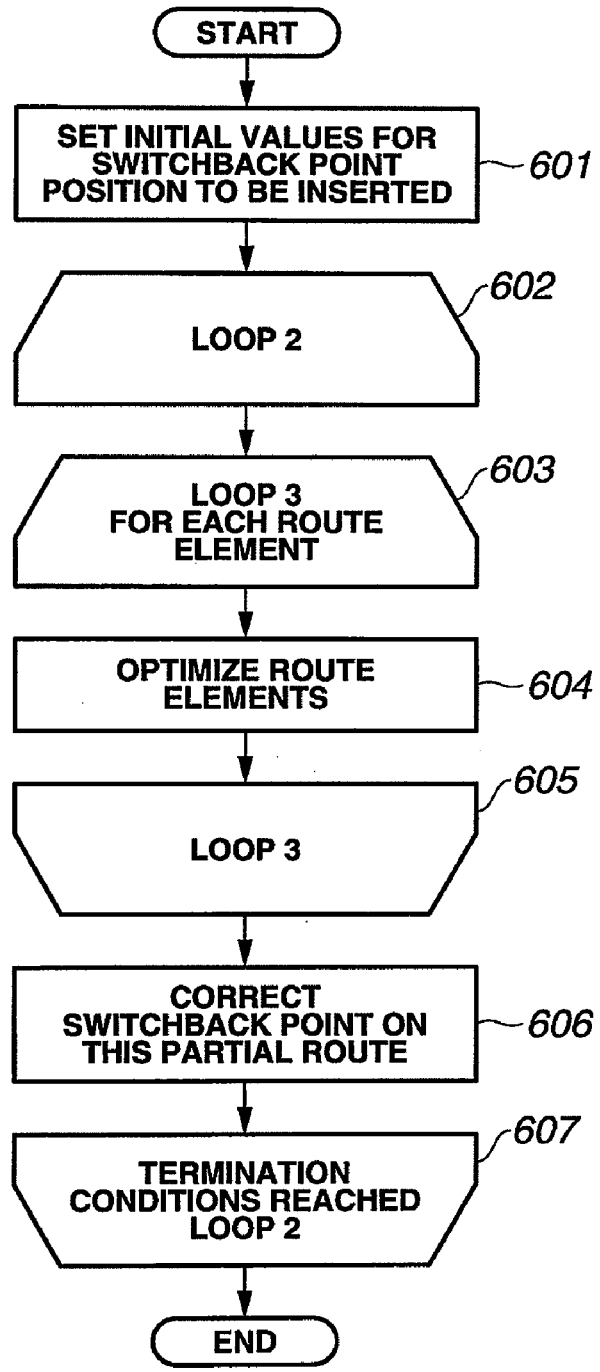
FIG. 11 is a flowchart showing a flow for inserting a switchback point.

In the "switchback position inserting flow", as shown in FIG. 11, initial values of a switchback point 12 to be inserted are set in the same manner as in step 401 of FIG. 9 described above. However, the number of switchback points 12 to be inserted is one in this case. The initial values are set for the one switchback point 12 (step 601).

Subsequently, processing of "loop 2" is started (step 602), and processing of steps 603 to 606 is repeated until the termination condition is reached (step 607). The termination condition for the "loop 2" is, for example, that the number of loops reaches its upper limit, or a predetermined convergence condition is satisfied.

Once the processing of "loop 2" is started, processing of "loop 3" is started first (step 603), and processing of "route element optimization" as described later is performed on each route element (step 604). When the "route element optimization" processing has been performed on all the route elements, the processing of "loop 3" is completed (step 605), and the processing proceeds to the next step 606.

The "route elements" subjected to the processing of "loop 3" are defined as follows:

Specifically, the processing of "loop 3" is performed on:
1) a route element from the entrance point 11 to the first switchback point 12;
2) a route element from the n-th switchback point 12 to the (n+1)-th switchback point; and
3) a route element from the last switchback point 12 before the exit point 14 to the exit point 14.

When one switchback point 12 is inserted in the state where there is no switchback point 12, the route elements is formed by the "route element from the entrance point 11 to the first switchback point 12", and the "route element from the last switchback point 12 before the exit point 14 to the exit point 14".

Figure 12:
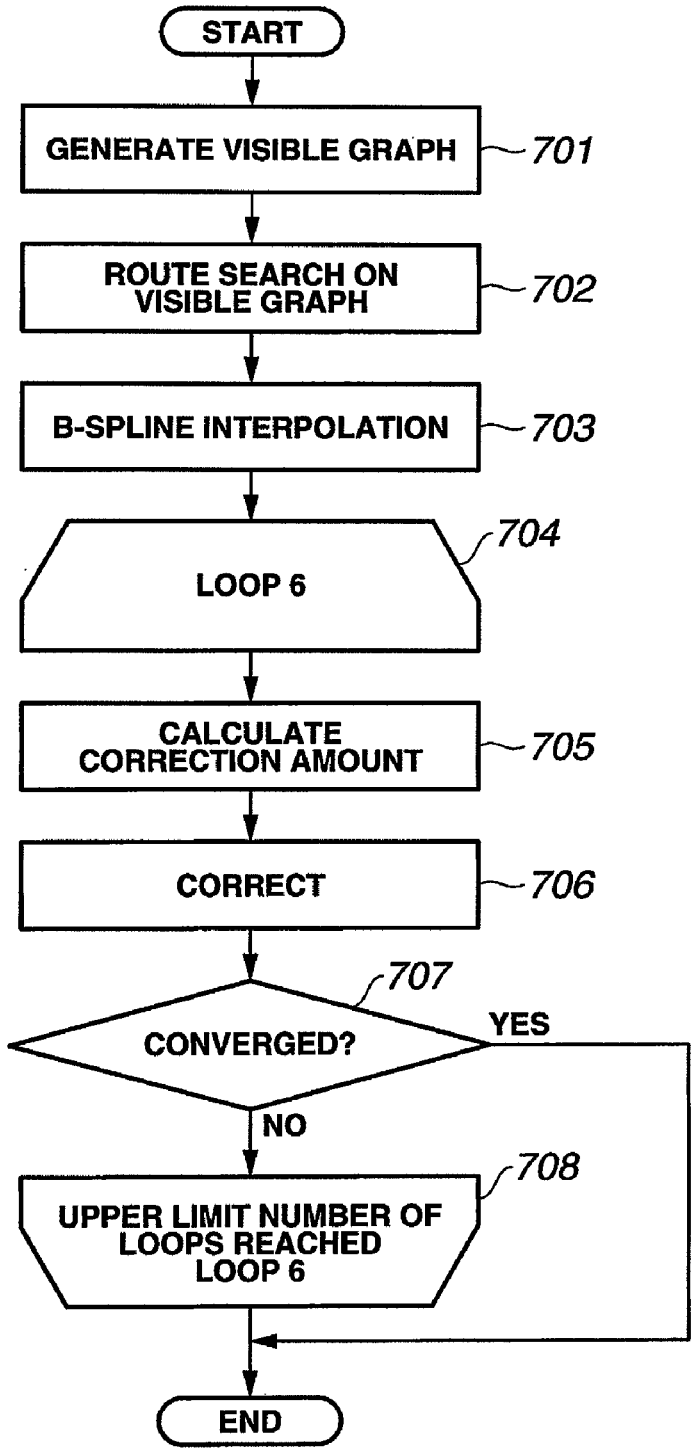
FIG. 12 is a flowchart showing a flow for optimizing route elements.

The "route element optimization" in step 604 is specifically performed according to a "route element optimizing flow" shown in FIG. 12.

In the "route element optimizing flow" shown in FIG. 12, firstly, visibility graphs of the route elements are generated in the same manner as in step 302 of FIG. 8. Specifically, visibility graphs are generated for the "route element from the entrance point 11 of the travel route 10 to the first switchback point 12", and the "route element from the last switchback point 12 before the exit point 14 to the exit point 14" (step 701).

Subsequently, in the same manner as in step 303 of FIG. 8, the improved Dijkstra algorithm is applied to search the visibility graphs for edges to be optimum route candidates (interpolation point candidates) (step 702).

Then, interpolation is performed by using a B-spline curve so as to pass the interpolation point candidate described above (step 703).

Subsequently, processing of "loop 6" is started (step 704), and the processing of "loop 6" is repeated until the number of loops reaches its upper limit (step 708).

Once the processing of "loop 6" is started (step 704), a correction amount for correcting the position of the interpolation point and a correction amount for correcting the curve geometry passing the interpolation point are calculated in the same manner as in steps 305, 306, 307 and 308 of FIG. 8 (step 705), and processing to correct the position of the interpolation point and processing to correct the curve geometry passing the interpolation point are performed (step 706).

When the system is converged under predetermined conditions after the correction processing (YES in step 707), the processing escapes from "loop 6" and all the processing steps of the "route element optimizing flow" of FIG. 12 are terminated. All the processing steps of the "route element optimizing flow" of FIG. 12 are terminated also when the processing of "loop 6" is repeated until the number of loops reaches its upper limit (step 708).

Figure 38:
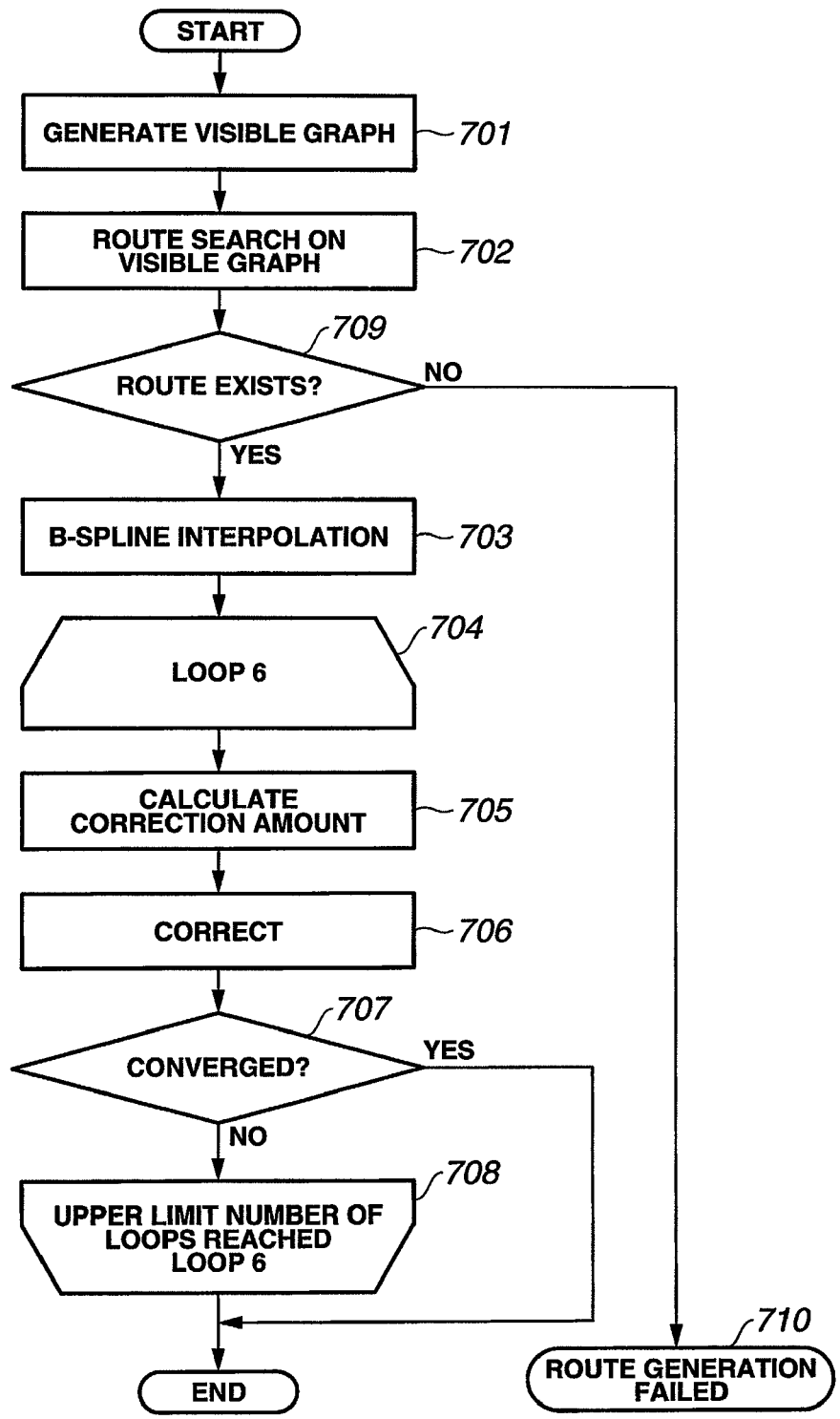
FIG. 38 is a flowchart showing a flow for optimizing route elements to be used in place of the flow for optimizing route elements shown in FIG. 12.

Instead of the "route element optimizing flow" shown in FIG. 12, a "route element optimizing flow" shown in FIG. 38 may be performed. In FIG. 38, the same processing steps as those in FIG. 12 are assigned with the same step numbers (701 to 708). In the flow shown in FIG. 38, when edges to be optimum route candidates can be found as a result of the processing of step 702 described above, in other words, there exists a route (YES in step 709), the processing proceeds to step 703, and from then on, the same processing as in FIG. 12 is performed. However, when no edges to be optimum route candidates can be found, in other words, there exists no route (NO in step 709), the processing is terminated, determining that the route generation has been fatally failed (step 710).

When the processing of the "route element optimization" of step 604 shown in FIG. 1 is completed for all the route elements, namely "the rout element from the entrance point 11 of the travel route 10 to the first switchback point 12" and "the route element from the last switchback point 12 before the exit point 14 to the exit point 14" (step 605), processing is performed to correct the switchback point 12 on these route segments (step 606). This processing to correct the switchback point 12 in step 606 is performed by the "switchback point optimizing algorithm" as shown in FIG. 9 described above.

The "switchback point optimizing algorithm" shown in FIG. 9 is performed until the termination condition described above is satisfied (step 409). When the termination condition of the "loop 2" is satisfied (step 607), all the processing steps of the "switchback point inserting flow" shown in FIG. 11 are terminated.

The processing then proceeds to step 504 shown in FIG. 10, and processing of "loop 1" is started (step 504). Also when it is determined in step 502 that switchback is not necessary (NO in step 502), the processing proceeds to step 504 and the processing of "loop 1" is started (step 504).

Once the processing of "loop 1" is started, processing of the "route generation between route elements" described later is performed on each of the route elements (step 505). The route elements for which this processing of "loop 1" is performed are defined as follows.

A) When there is a switchback, the processing of "loop 1" is performed for:
A-1) a route element from the entrance point 11 to the switchback point 12; and
A-2) a route element from the switchback point 12 to the exit point 14 of the travel route 10.

B) When there is no switchback, the processing of "loop 1" is performed for:
B-1) a route element from the entrance point 11 to the exit point 14.

It is then determined whether or not route generation has been successful for each of the route elements (step 506). The processing of "route generation between route elements" is performed for all the route elements (step 505), and it is determined that the route generation has been successful (YES in step 506), the processing of "loop 1" is terminated (step 507). Thus, a travel route 10 along which the unmanned vehicle 20 is to travel is ultimately obtained, and all the processing steps of the route generating flow shown in FIG. 10 are completed (step 508). If it is determined in step 506 that the route generation has been failed (NO in step 506), the processing escapes from "loop 1". Thus, it is ultimately determined that a travel route 10 along which the unmanned vehicle 20 is to travel has not been obtained, and all the processing steps of the route generating flow shown in FIG. 10 are completed (step 509).

Figure 13:
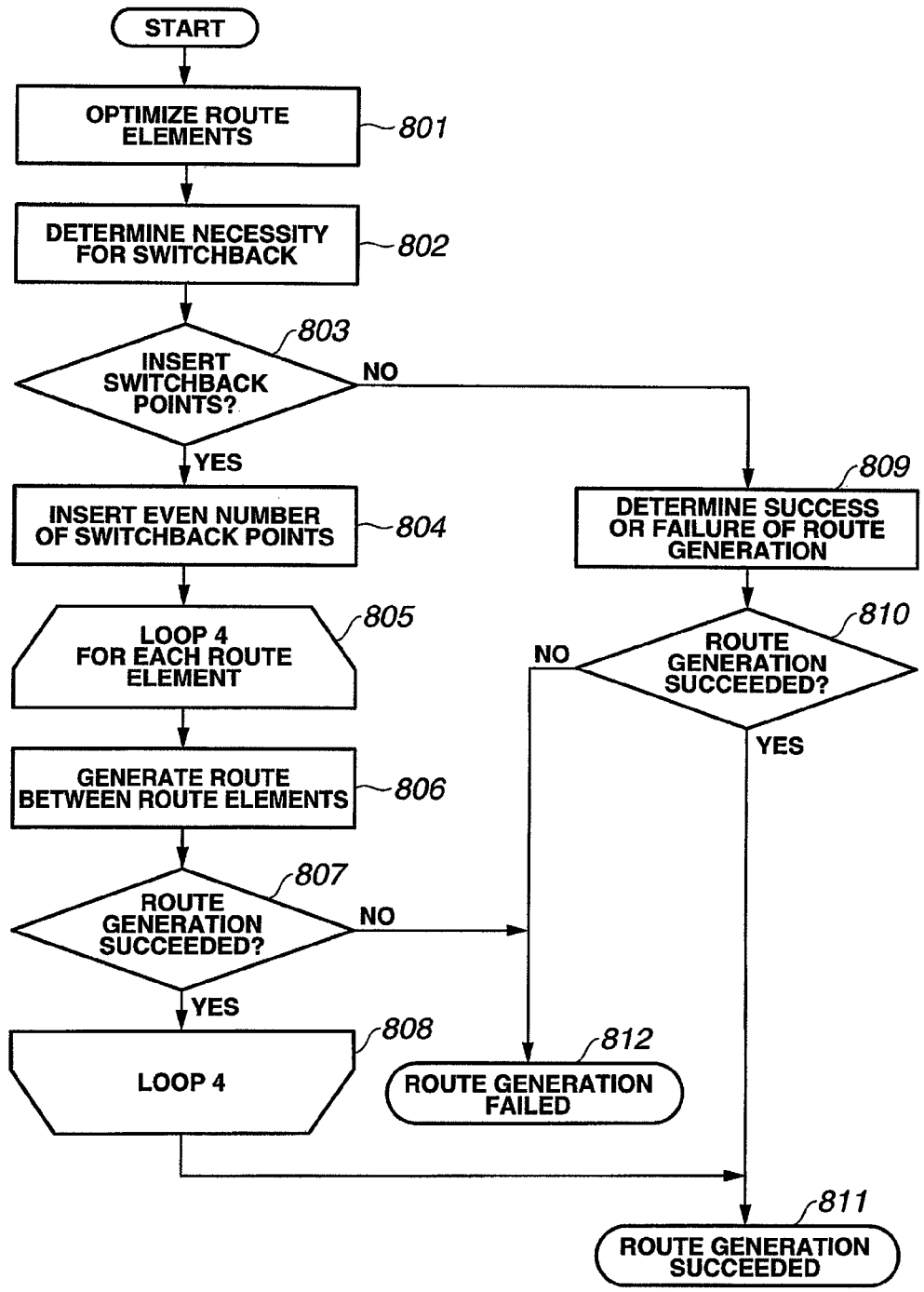
FIG. 13 is a flowchart showing a flow for generating a route between route elements.

The processing of the "route generation between route elements" in step 505 is specifically performed in accordance with the "flow of route generation between route elements" shown in FIG. 13.

In this "flow of route generation between route elements," it is determined whether or not insertion of a switchback point 12 into a route element is necessary for each of the route elements, and a switchback point 12 is inserted if necessary.

More specifically, in the "flow of route generation between route elements" shown in FIG. 13, the "route element optimizing flow" of FIG. 12 described above is implemented on the route elements (step 801).

It is then determined whether or not insertion of a switchback point 12 is necessary. This determination is made according to the following criteria from among the above-described determination criteria (determination of necessity of switchback).

c) The generated route does not satisfy the vehicle constraint conditions, for example, does not satisfy the minimum turning radius.

d) The generated route does not satisfy the geometrical constraint conditions. For example, the route interferes with an obstacle 9.

e) The cost function value is reduced by insertion of switchback point. Specifically, comparison is made between when a switchback point is inserted for optimization and when not inserted, and it is determined that switchback is necessary if the cost function value is reduced by insertion of a switchback point (step 802).

If the determination criteria described above are satisfied, it is determined that a switchback point 12 is to be inserted (YES in step 803), and the processing proceeds to step 804. If the determination criteria are not satisfied, it is determined that a switchback point 12 is not to be inserted (NO in step 803), and the processing proceeds to step 809.

When the processing proceeds to step 809 after it is determined that a switchback point 12 is not to be inserted, it is determined whether or not the route generation has been successful (step 809). If it is determined that the route generation has been successful (YES in step 810), all the processing steps of the "flow of route generation between route elements" shown in FIG. 13 are completed (step 811). In contrast, if it is determined that the route generation has been failed (NO in step 810), all the processing steps of the "flow of route generation between route elements" are terminated (step 812).

When the processing proceeds to step 804 to insert switchback points 12, processing to insert an even number of switchback points 12 is performed. This is in order to prevent the change of the orientations of the starting point and the end point of the route element. When an even number of switchback points 12 (two, four, or six or more in some cases) are inserted, the orientations of the starting point and the end point of the route element are allowed to remain the same as before the insertion of the switchback points 12

The processing to insert an even number of switchback points 12 is performed according to the "switchback point inserting flow" shown in FIG. 11 described above. Whereas the description based on FIG. 11 above has been made on the assumption that a single switchback point 12 is inserted, the processing to insert an even number of switchback points 12 is performed in the same manner but replacing "the single switchback point 12" with "an even number of switchback points 12" (step 804).

Once all the processing steps of the "switchback point inserting flow" shown in FIG. 11 have been completed, the processing proceeds to step 805, and processing of "loop 4" is started (step 805).

Once the processing of "loop 4" is started, the processing of the "route generation between route elements" shown in FIG. 13 is performed on each of the route elements (step 806). The route elements for which the processing of "loop 4" is performed are defined as follows.

Specifically, the processing of "loop 4" is performed on:

1) a route element from the entrance point 11 to the first switchback point 12;

2) a route element from the n-th switchback point 12 to the (n+1)-th switchback point; and 3) a route element from the last switchback point 12 before the exit point 14 to the exit point 14.

It is then determined whether or not the route generation has been successful for each of the route elements (step 807). The processing of the "route generation between route elements" is performed for all the route elements (step 806), and if it is determined the route generation has been successful (YES in step 807), the processing of "loop 4" is terminated. All the processing steps of the "flow of route generation between route elements" shown in FIG. 13 are completed based on the determination that the route generation has been successful (step 811). In contrast, if it is determined that the route generation was failed (NO in step 807), the processing escapes from "loop 4", and all the processing steps of the "flow of route generation between route elements" shown in FIG. 13 are terminated based on the determination of the failure of route generation (step 812).

Figure 39:
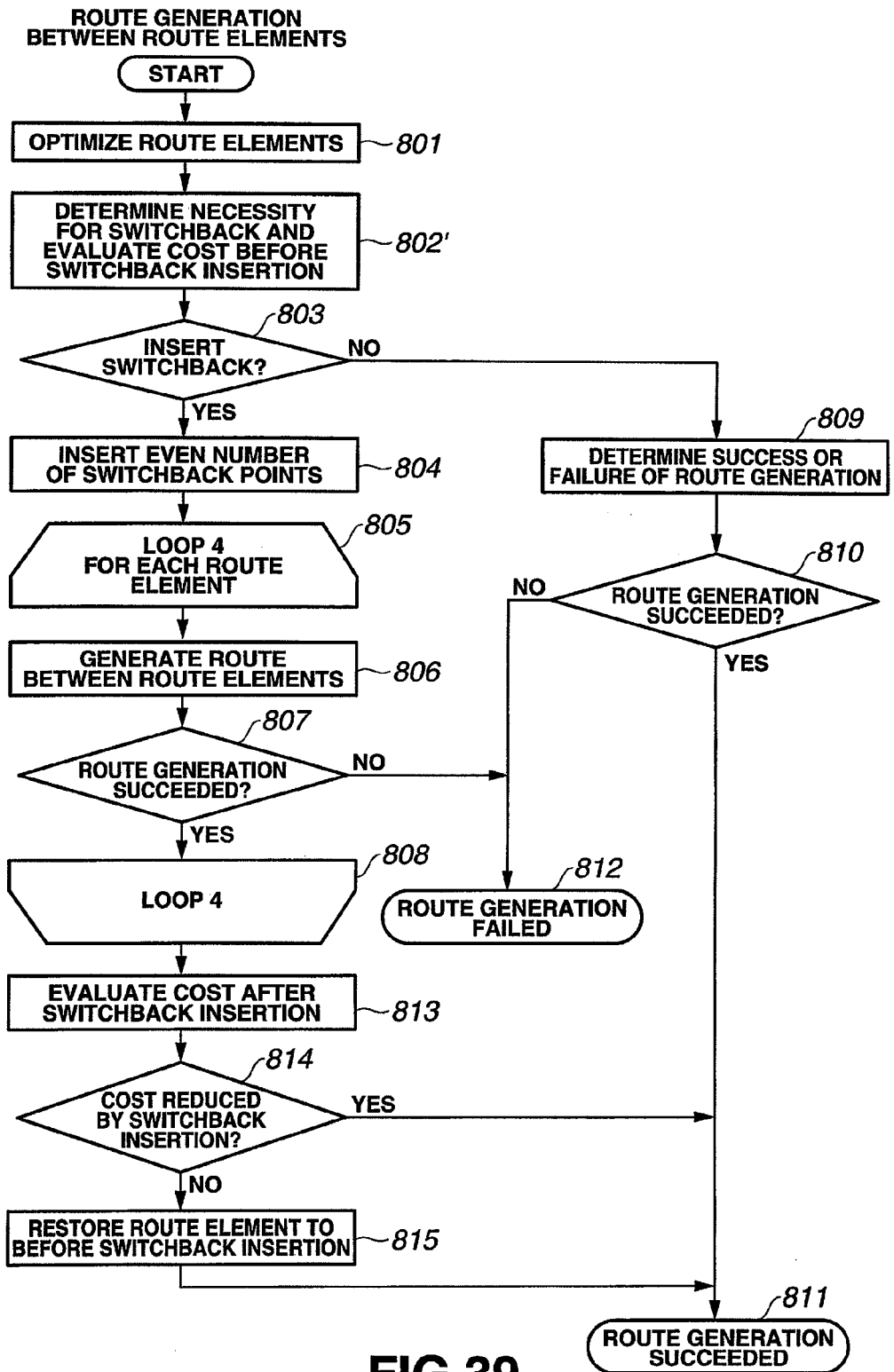
FIG. 39 is a flowchart showing a flow for generating a route between route elements to be used in place of the flow for generating a route between route elements shown in FIG. 13.

In place of the "flow of route generation between route elements" shown in FIG. 13, a "flow of route generation between route elements" shown in FIG. 39 may be implemented. In FIG. 39, the same processing steps as those in FIG. 13 are assigned with the same step numbers (steps 801, and 803 to 812).

According to the processing in step 802 in the flow shown in FIG. 13, comparison is made, previously before insertion of switchback points, between a route cost when the switchback points are inserted and a route cost when not inserted. It is determined that the switchback is necessary if the value of the cost function is smaller when the switchback points are inserted, and a route is generated with the switchback points being inserted therein.

In the flow shown in FIG. 39, comparison is made between a route cost before switchback points are inserted and a route cost when switchback points are actually inserted, and a route having switchback points inserted therein is employed if the route cost when the switchback points are actually inserted is lower than the route cost before insertion of the switchback points. If the route cost when the switchback points are actually inserted is higher than the route cost before insertion of the switchback points, the route is restored to the one before insertion of the switchback points, and the route before insertion of the switchback points is employed.

Description will be made on particulars of the processing in step 802' which is different from step 802 in FIG. 13 and the processing in added steps 813, 814, and 815.

[Processing in Step 802']

Processing of step 802' is performed in place of the processing of step 802 of FIG. 13.

In step 802', it is determined whether or not a switchback point 12 is necessary, and a route cost before insertion of the switchback point 12 is evaluated.

Determination whether or not insertion of a switchback point 12 is necessary is made on the basis of the determination criteria as described below.

f) The number of switchback points 12 after insertion of new ones does not reach the upper limit of addable switchback points.

g) The route generation has not been fatally failed for such a reason that no route exists on the visibility graphs.

h) The value of the cost function can be reduced by inserting a switchback point 12. The reduction of the cost function value is possible, for example, when the route generation has been failed but not fatally, or when there is a large curve having a turning angle of more than 180 degrees.

Then, the route cost function value before insertion of the switchback point 12 is obtained. In other words, the route cost before insertion of the switchback point is evaluated.

[Processing in Step 813]

In step 813, the route cost function value after actual insertion of the switchback points 12 is obtained. This means that the cost after insertion of the switchback points is evaluated.

[Processing in Steps 814 and 815]

In step 814, comparison is made between the cost function value obtained by the cost evaluation before insertion of the switchback points and the cost function value obtained by the cost evaluation after insertion of the switchback points. If it is determined as a result of this comparison that the route cost after the actual insertion of the switchback points 12 is lower than the route cost before the insertion of the switchback points 12 (YES in step 814), the route after the insertion of the switchback points 12 is employed and the route generation is decided to be successful (step 811). In contrast, if the route cost after the actual insertion of the switchback points 12 is higher than the one before the insertion of the switchback points 12 (NO in step 814), the route is restored to the one before the insertion of the switchback points 12 (step 815), and this route before the insertion of the switchback points 12 is employed, and the route generation is decided to be successful (step 811).

The processing of the route generating flow shown in FIG. 1 is performed as described above.

Next, description will be made on a "method of reoptimizing switchback points due to addition of switchback points".

Figure 14:
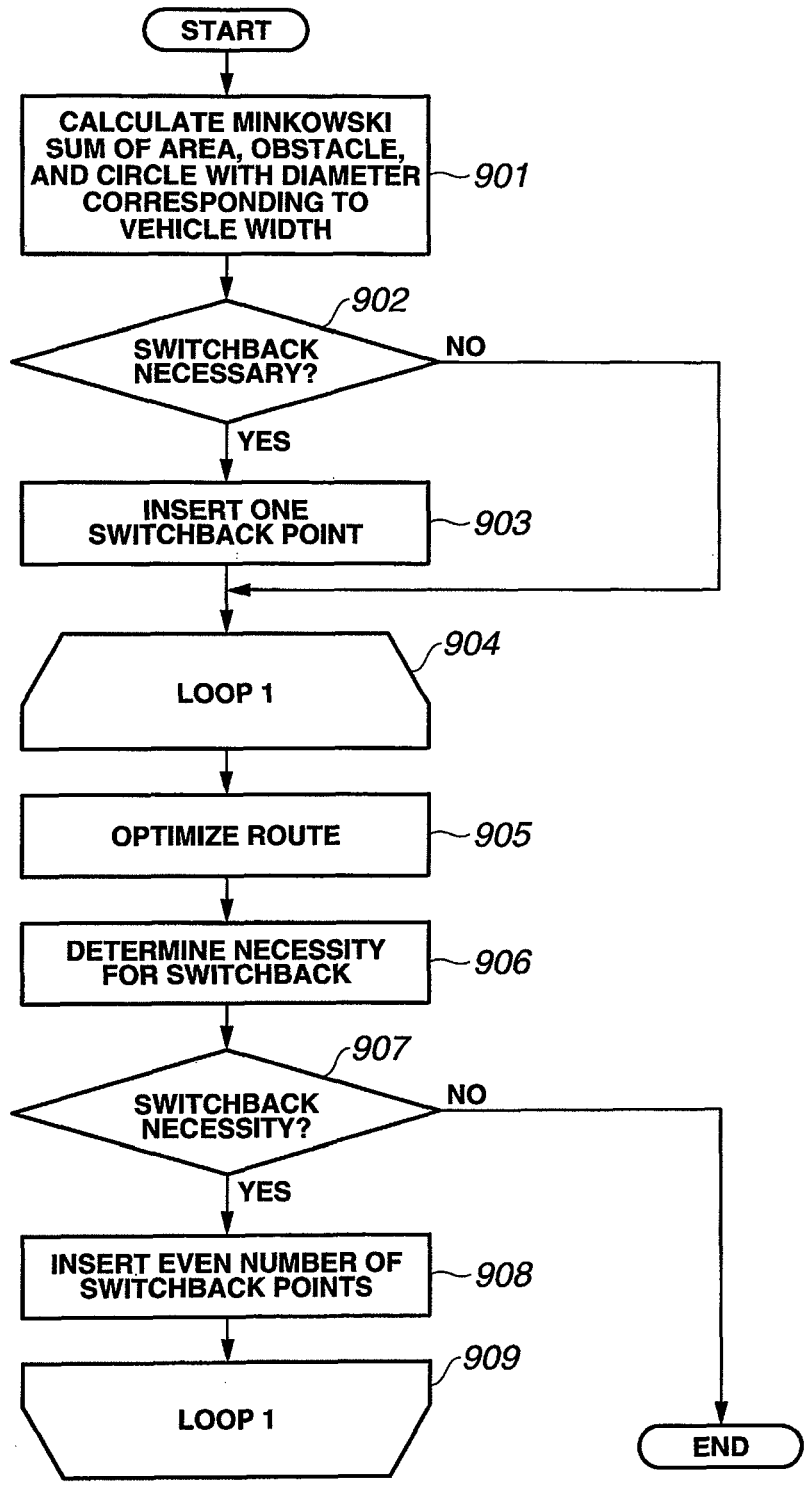
FIG. 14 is a flowchart showing a route generating flow for explaining a "method of reoptimizing a switchback point due to addition of a switchback point"

FIG. 14 shows a "method of reoptimizing switchback points due to addition of switchback points".

[Method of Reoptimizing Switchback Points Due to Addition of Switchback Points]

As shown in FIG. 14, the same processing as in steps 501 to 503 of FIG. 10 is performed in steps 901 to 903.

The processing then starts "loop 1" (step 904), and the processing of steps 905 to 908 is repeated.

Figure 15:
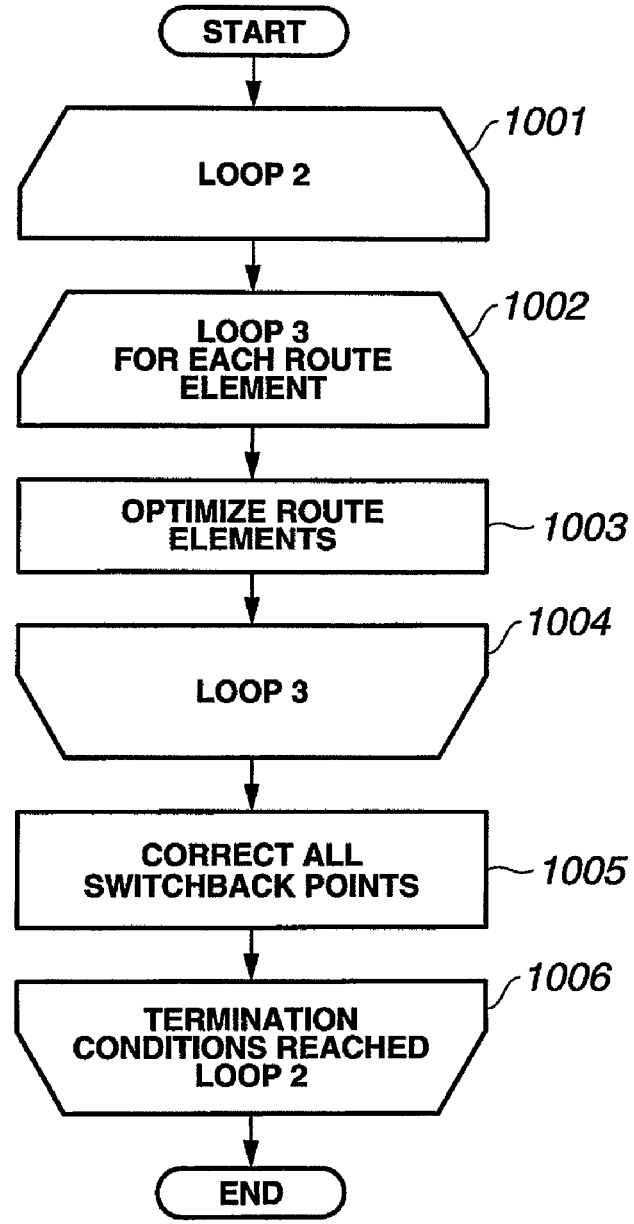
FIG. 15 is a flowchart showing a flow for optimizing a route.

In step 905, the "route optimizing flow" shown in FIG. 15 is implemented.

In the "route optimizing flow" shown in FIG. 15, the processing starts "loop 2" at first (step 1001), and the processing "loop 2" is repeated until the termination condition is satisfied. This termination condition is determined to be satisfied when the number of loops has reached its upper limit, or when a predetermined convergence condition is satisfied (step 1006).

Upon starting "loop 2", the processing then starts "loop 3" (step 1002), in which the "route element optimizing flow" shown in FIG. 12 described above is implemented for each route element. The route elements subjected to the processing of "loop 3" are defined as follows.

A) When there is a switchback, the processing of "loop 3" is performed for:

A-1) a route element from the entrance point 11 to the switchback point 12; and A-2) a route element from the switchback point 12 to the exit point 14 of the travel route 10.

B) When there is no switchback, the processing of "loop 3" is performed for:

B-1) a route element from the entrance point 11 to the exit point 14.

Once the "route element optimization" processing has been performed on all the route elements, the processing of "loop 3" is terminated (step 1004).

Subsequently, processing is performed on all the switchback points 12 to correct their positions and directions (step 1005).

This correction processing for all the switchback points 12 in step 1005 is performed by using the "switchback point optimizing algorithm" shown in FIG. 9 described above.

The "switchback point optimizing algorithm" shown in FIG. 9 is performed until the above-described termination condition (step 409) is satisfied. Once the termination condition of "loop 2" is satisfied (step 1006), all the processing steps of the "route optimizing flow" shown in FIG. 15 are terminated.

The processing then returns to step 906 of FIG. 14, and it is determined whether or not a switchback point 12 is necessary. This determination is made according to the following criteria from among the determination criteria described above (those used for the determination of necessity of switchback).

c) The generated route does not satisfy the vehicle constraint conditions, for example, does not satisfy the minimum turning radius.

d) The generated route does not satisfy the geometrical constraint conditions. For example, the route interferes with the obstacle 9.

e) The cost function value is reduced by inserting a switchback point. Specifically, comparison is made between when a switchback point is inserted for optimization and when not inserted, and it is determined that switchback is necessary if the cost function value is reduced by inserting a switchback point (step 906).

If it is determined that the determination criteria are satisfied and the switchback points 12 are to be inserted (YES in step 907), the processing proceeds to step 908. In contrast, if it is determined that the determination criteria are not satisfied and the switchback points 12 are not to be inserted (NO in step 907), the processing escapes from "loop 1," and all the processing steps of the "route generating flow" shown in FIG. 14 are terminated.

The processing proceeds to step 908 after determining that switchback points 12 are to be inserted, and processing is performed to insert an even number of switchback points 12.

The processing to insert an even number of switchback points 12 is performed according to the "switchback point inserting flow" shown in FIG. 11 described above. Although the description of the FIG. 11 above has been made on the assumption that a single switchback point 12 is to be inserted, the processing here is performed in the same manner but replacing "a single switchback point 12" with "an even number of switchback points 12" (step 908).

When the termination condition of "loop 1" is satisfied, all the processing steps of the "route generating flow" shown in FIG. 14 are terminated.

Here are route generation examples of the travel route 10 generated in the embodiment examples described above.

Route Generation Example 1

Figure 33A:
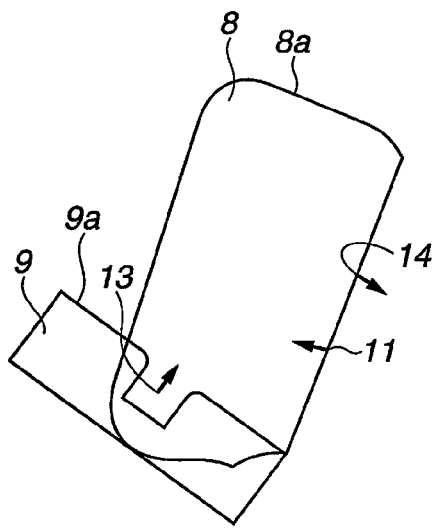
FIGS. 33A to 33D are diagrams used for explaining a route generation example 1.

FIG. 33A shows geometrical conditions given in the route generation example 1. In FIG. 33A, the reference numeral 8*a* denotes the outline of a route generation range 8, 9*a* denotes the outline of an obstacle 9. The directions at the entrance point 11, the exit point 14, and the halt point 13 are indicated by the arrows. The halt point 13 in the route generation example 1 is a place to discharge soil, and thus the unmanned vehicle 20 must reach the halt point 13 in its reverse traveling state.

Figure 33B:
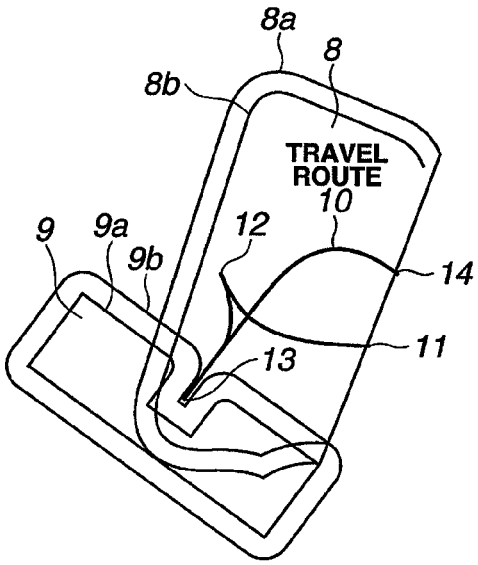

FIG. 33B shows the outline 8*b* of the route generation range 8 and the outline 9*b* of the obstacle 9 as obtained by Minkowski-summing the outline 8*a* of the route generation range 8, the outline 9*a* of the obstacle 9 and the disc.

Figure 33C:
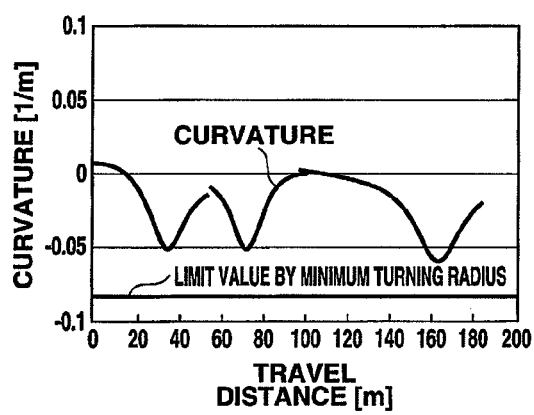

FIG. 33C shows distribution of curvature of the travel route 10 and limit values based on minimum turning radii by plotting along the horizontal axis the travel distances from the entrance point 11 as the origin. As shown in FIG. 33C, the sections from the entrance point 11 to the switchback point 12, from the switchback point 12 to the halt point 13, and from the halt point 13 to the exit point 14 are represented by separate curves, respectively. Therefore, the curves are not continuous to each other at the joints thereof. Although steering is theoretically possible at the point where the unmanned vehicle 20 is stationary, the stationary steering is not desirable in practice because a significant level of steering is not possible depending on road surface condition or weight of load, or because heavy load is applied to the tires. However, it is made possible to effectively drive the unmanned vehicle 20 with a greater turning radius than the minimum turning radius by increasing the weight near the starting point and end point of the cost function E represented by the formula (3.16), or by using a function to reduce the variation of curvature before and after the switchback point 12 in the cost function E (formula (3.25)) for calculation of the switchback point.

Figure 33D:
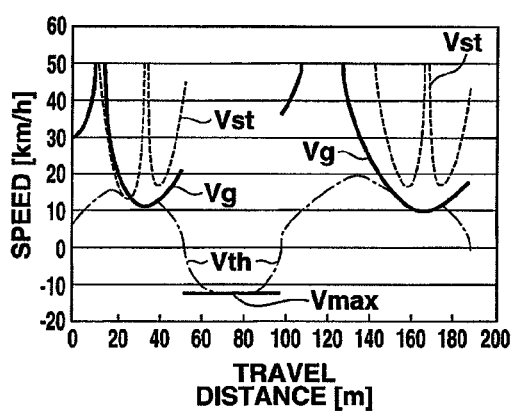
Figures 35A, 35B, 35C, 35D:
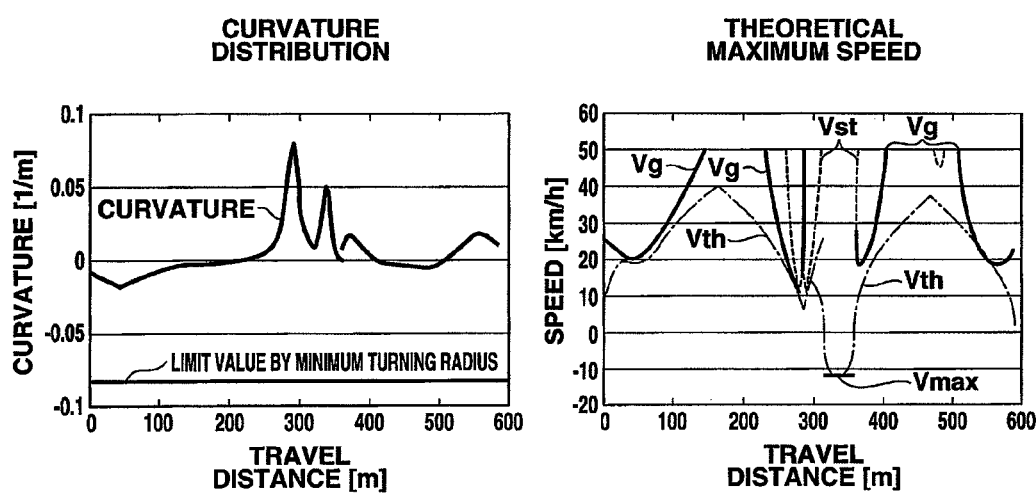
FIGS. 35A to 35D are diagrams used for explaining a route generation example 3.

FIG. 33D shows theoretical maximum speed Vth by plotting, along the horizontal axis, the travel distances from the entrance point 11 as the origin. In FIG. 33D, Vg indicates limits based on curvature radius ρ of the travel route 10, and is obtained by the following equation:

$$Vg=\sqrt{(\alpha\rho)}$$

where α denotes a maximum allowable reverse acceleration. In FIG. 33D, Vst indicates limits based on steering operation amount, and is obtained by the following equation:

$$Vst=\beta/\gamma$$

where β denotes a maximum steering operation amount per unit time, and γ denotes a steering operation amount per unit distance. In FIG. 33D, Vmax indicates maximum forward (reverse) travel speed of the unmanned vehicle 20. A theoretical maximum speed Vth is obtained under these limits only by acceleration and deceleration based on the maximum acceleration/deceleration. A theoretical maximum speed Vth is desirably not affected by the turning radius or steering operation amount. This means that the travel route 10 desirably has a large turning radius and a small steering operation amount per unit distance. According to this embodiment of the invention, the travel route 10 is obtained such that the cost value of the cost elements comprising the turning radius and the steering operation amount per unit distance is minimized. As a result, an appropriate theoretical maximum speed Vth as shown in FIG. 33D can be obtained.

Route Generation Example 2

FIGS. 34A, 34B, 34C, and 34D are diagrams showing route generation example 2, corresponding to FIGS. 33A, 33B, 33C, and 33D of the route generation example 1 described above.

In the route generation example 2, the unmanned vehicle 20 reaches the halt point 13 in its reverse traveling state to be loaded there. It is normally desirable that the switchback point 12 is located close to the halt point 13 so that the reverse travel distance is short. However, in this route generation example 2, there is an obstacle 9 near the halt point 13. Under this condition, there is no switchback point 12 satisfying the vehicle constraint conditions. Since the SA (global search) algorithm is employed in this embodiment, an optimal switchback point 12 can be searched for as shown in FIG. 34B.

Route Generation Example 3

FIGS. 35A, 35B, 35C, and 35D are diagrams showing route generation example 3, corresponding to FIGS. 33A, 33B, 33C, and 33D showing the route generation example 1 described above.

In the route generation example 3, the unmanned vehicle 20 enters the halt point 13 in its reverse traveling state to discharge soil there. Although there are a large number of obstacles 9 in the route generation range 8 of the route generation example 3, optimal travel route 10 can be generated, avoiding these obstacles 9.

Route Generation Example 4

FIGS. 36A, 36B, 36C, and 36D are diagrams showing route generation example 4, corresponding to FIGS. 33A, 33B, 33C, and 33D showing the route generation example 1 described above.

In the route generation example 4, the unmanned vehicle 20 reaches the halt point 13 in its reverse traveling state to discharge soil there. In the route generation example 4, it is assumed that the unmanned vehicle 20 has a minimum turning radius of 12 m. As shown in FIG. 36B, only one switchback point 12 is required in the entire travel route 10. In the route element 10*a* leading to the exit point 14, the curvature assumes a large value in accordance with the minimum turning radius of 12 m.

Route Generation Example 5

FIGS. 37A, 37B, 37C, and 37D are diagrams showing route generation example 5, corresponding to FIGS. 33A, 33B, 33C, and 33D showing the route generation example 1 described above.

Figure 36A:
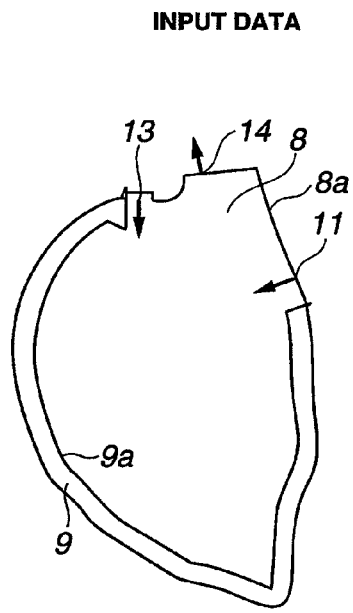
FIGS. 36A to 36D are diagrams used for explaining a route generation example 4.
Figure 36B:
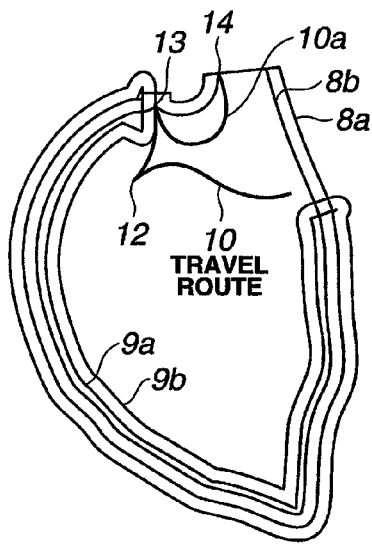
Figure 36C:
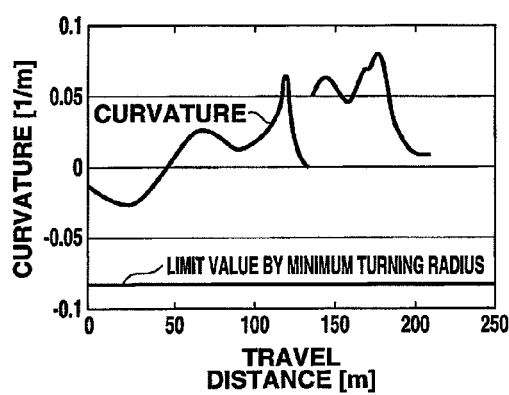
Figure 36D:
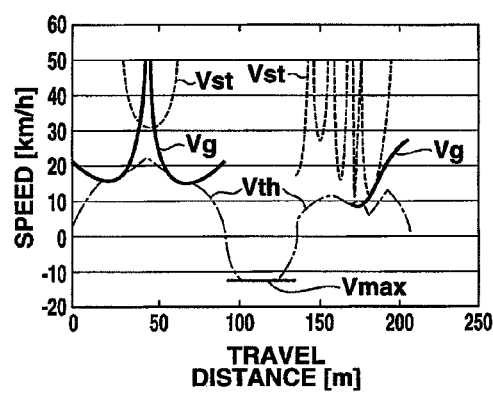

Geometrical conditions of the route generation example 5 (FIG. 37A) are the same as those of the route generation example 4 (FIG. 36A).

The vehicle constraint conditions differ according to muddiness of the ground or carrying load of the unmanned vehicle 20. In the route generation example 5, it is assumed that the unmanned vehicle 20 has a minimum turning radius of 20 m, which is greater than the minimum turning radius of 12 m in the route generation example 4. As seen from FIG. 37B, the curvature of the route element 10*a* to the exit point 14 is smaller than of the route generation example 4. However, three switchback points 12 are required in the travel route 10 as a whole.

According to the embodiment, as described above, a travel route 10 can be generated flexibly and adequately in accordance with any change in the vehicle constraint conditions.

In the description of the embodiment above, the interpolation point searching step of step 231 in FIG. 5D, or the step of searching for interpolation points in the travel route 10 along which the unmanned vehicle 20 is to travel has been described as comprising the following steps, as shown in FIG. 8:

step of calculating a Minkowski sum (step 301);
step of generating visibility graphs (step 302); and
step of searching for an optimum improved route candidate edge (interpolation point candidate) by using the improved Dijkstra algorithm (step 303).

Further, the interpolation step of the step 232 in FIG. 5D, or the step of interpolating interpolation points in the route passing from the entrance point 11 via the interpolation points to the exit point 14 has been described as including the step of performing interpolation using a B-spline curve (step 304), as shown in FIG. 8.

It should be understood, however, that the foregoing description is to be taken as a preferred example of the invention. It is also possible to employ other search methods to search for interpolation points, or other interpolation algorithms to interpolate interpolation points. For example, a Clothoid curve may be used to interpolate the interpolation points. A cubic function curve may be used to interpolate the interpolation points. A sine half wavelength diminishing tangent curve may be used to interpolate the interpolation points.

Further, according to the embodiment, processing is performed so as to minimize the cost function value when searching for interpolation points in the interpolation point searching step and when interpolating the interpolation points in the interpolation step. Specifically, in step 303 of FIG. 8, a combination of route candidate edges (interpolation point candidate) is searched for so as to minimize the cost function value. In step 307 of FIG. 8, the magnitudes of the direction vectors $\alpha$ and $\beta$ are adjusted to minimize the cost function value and to obtain an optimum curvature for the curve to be interpolated. However, this invention is not limited to this. The processing may be performed to minimize the cost function value only when the interpolation points are searched for in the interpolation point searching step, or the processing may be performed to minimize the cost function value only when the interpolation points are interpolated in the interpolation step.

What is claimed is:

1. A travel route generating method for an unmanned vehicle, comprising:
   a condition input step of inputting a vehicle constraint condition including a vehicle width and a minimum turning radius of the unmanned vehicle, and a geometrical constraint condition including a travel route generation range in which the unmanned vehicle is to travel, an obstacle to avoid, and positions and directions of an entrance point and an exit point; and
   a travel route generating step of generating a travel route such that the vehicle constraint condition and the geometrical constraint condition are satisfied, and such that a function value of a cost function is minimized, the cost function being composed of at least:
   a first term for reducing a turning radius of the unmanned vehicle by reducing curvature of the travel route,
   a second term for reducing a steering operation amount per unit distance by reducing a rate of change of curvature of the travel route, and
   a third term for shortening a travel distance of the travel route, wherein the first term is obtained by integrating, along the travel route, the curvature of the travel route or a steering angle of the unmanned vehicle regarding micro section of the travel route,
   the second term is obtained by integrating, along the travel route, the rate of change of the curvature of the travel route or the steering operation amount of the unmanned vehicle regarding the micro section of the travel route, and
   the third term is obtained by integrating, along the travel route, the travel distance of the travel route regarding the micro section of the travel route.

2. The travel route generating method for an unmanned vehicle as claimed in claim 1, wherein
   the cost function further includes a fourth term for reducing a stationary steering cost at a switchback point on the travel route, the fourth term being obtained by integrating, along the travel route before and after the switchback point, the steering operation amount of the unmanned vehicle or the rate of change of the curvature of the travel route regarding the micro section of the travel route before and after the switchback point, and
   the travel route generating step comprises a step of generating the travel route for the unmanned vehicle with the switchback point introduced therein, and
   the switchback point is determined so as to minimize the function value of the cost function.

3. The travel route generating method for an unmanned vehicle as claimed in claim 1, wherein
   the cost function further includes a fourth term for reducing a stationary steering cost at a switchback point on the travel route, the fourth term being obtained by integrating along the travel route before and after the switchback point the steering operation amount of the unmanned vehicle or the rate of change of the curvature of the travel route regarding the micro section of the travel route before and after the switchback point, and
   the travel route generating step comprises:
   a step of determining whether or not the generated travel route satisfies the vehicle constrain condition and/or the geometrical constraint condition, or whether or not the function value of the cost function is reduced by introduction of the switchback point; and
   a step of, when it is determined that the generated travel route does not satisfy the vehicle constraint condition and/or the geometrical constraint condition, or it is determined that the function value of the cost function is reduced by introduction of the switchback point, generating the travel route for the unmanned vehicle with the switchback point introduced therein, and wherein
   the switchback point is determined so as to minimize the function value of the cost function.

4. The travel route generating method for an unmanned vehicle, comprising
   a condition input step of inputting a vehicle constraint condition including a vehicle width and a minimum turning radius of the unmanned vehicle, and a geometrical constraint condition including a travel route generation range in which the unmanned vehicle is to travel, an obstacle to avoid, and positions and directions of an entrance point and an exit point; and
   a travel route generating step of generating a travel route such that the vehicle constraint condition and the geometrical constraint condition are satisfied, and such that a function value of a cost function having at least a magnitude of a curve and/or a rate of change in the curve as a cost element is minimized, wherein the travel route generating step further comprises:

an interpolation point searching step of searching for an interpolation point of the travel route along which the unmanned vehicle is to travel; and an interpolation step of interpolating the interpolation point in the route passing from the entrance point via the interpolation point to the exit point, and wherein the search in the interpolation point searching step and/or the interpolation in the interpolation step are/is performed so as to minimize the function value of the cost function.

5. The travel route generating method for an unmanned vehicle as claimed in claim 4, wherein the interpolation in the interpolation step is performed by using a B-spline curve.

* * * * *